(12) United States Patent
Yamaguchi et al.

(10) Patent No.: US 7,346,255 B2
(45) Date of Patent: Mar. 18, 2008

(54) TOOL FOR OPTICAL CONNECTOR AND TOOL EQUIPPED OPTICAL CONNECTOR

(75) Inventors: Takashi Yamaguchi, Sakura (JP); Kazuhiro Takizawa, Sakura (JP); Daigo Saito, Sakura (JP); Hiroshi Furukawa, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 11/271,818

(22) Filed: Nov. 14, 2005

(65) Prior Publication Data

US 2006/0104590 A1    May 18, 2006

(30) Foreign Application Priority Data

| Nov. 15, 2004 | (JP) | ............................... 2004-330993 |
| Jan. 18, 2005 | (JP) | ............................... 2005-010856 |
| Sep. 8, 2005 | (JP) | ............................... 2005-260253 |

(51) Int. Cl.
        *G02B 6/00*    (2006.01)
(52) U.S. Cl. ........................ 385/136; 385/134; 385/147
(58) Field of Classification Search ................ 385/114, 385/106, 136, 134, 147
        See application file for complete search history.

(56) References Cited

U.S. PATENT DOCUMENTS

| 4,327,964 A | * | 5/1982 | Haesly et al. .................. 385/78 |
| 5,052,768 A | * | 10/1991 | Matumoto et al. ............. 385/76 |
| 5,078,467 A | * | 1/1992 | Blomgren et al. ............. 385/56 |
| 5,761,360 A | * | 6/1998 | Grois et al. .................... 385/81 |
| 6,940,405 B2 | * | 9/2005 | Script et al. ............. 340/545.1 |
| 2005/0097691 A1 | * | 5/2005 | Tsuchiya et al. ............ 15/144.4 |

FOREIGN PATENT DOCUMENTS

| JP | 2002-023006 A | 1/2002 |
| JP | 2002-055259 A | 2/2002 |

* cited by examiner

*Primary Examiner*—Ellen E. Kim
(74) *Attorney, Agent, or Firm*—Sughrue Mion, PLLC

(57) ABSTRACT

A tool for an optical connector including a clamping portion for clamping an optical fiber between clamping elements, the tool including: first and second insertion members, respectively including separately extractable first and second distal ends, wherein the first and second distal ends maintain the clamping elements in an open state by being wedged therebetween from outside the clamping portion, so that the optical fiber is movable between the clamping elements; first and second insertion member operating portions, respectively separately connected to proximal ends of the first and second insertion members, that individually extract the first and second distal ends of the first and second insertion members from between the clamping elements; and a stopper portion against which the optical connector is pressed when the first and second insertion members are extracted from between the clamping elements.

27 Claims, 21 Drawing Sheets

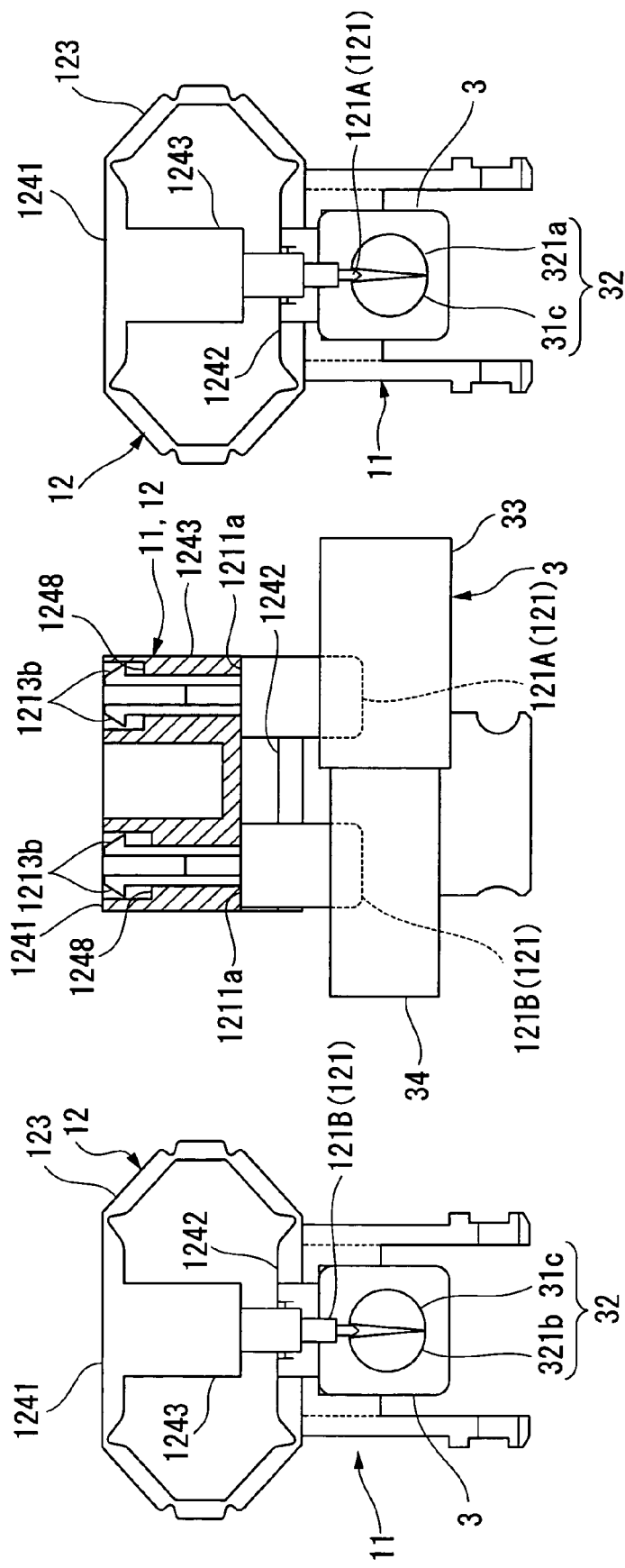

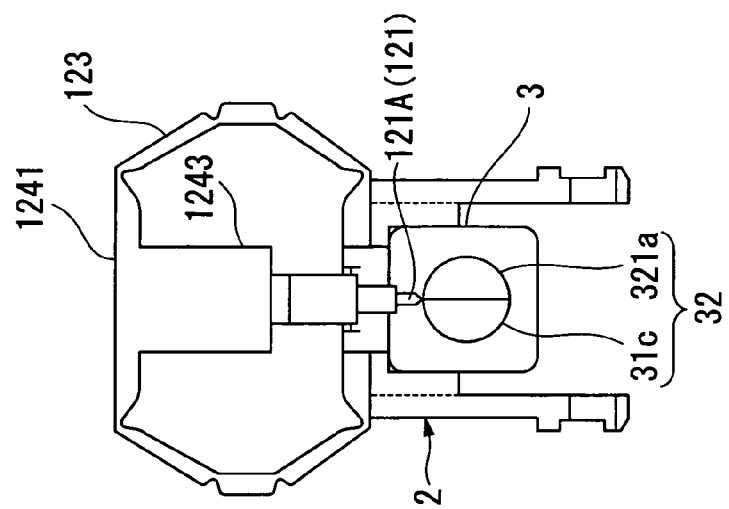
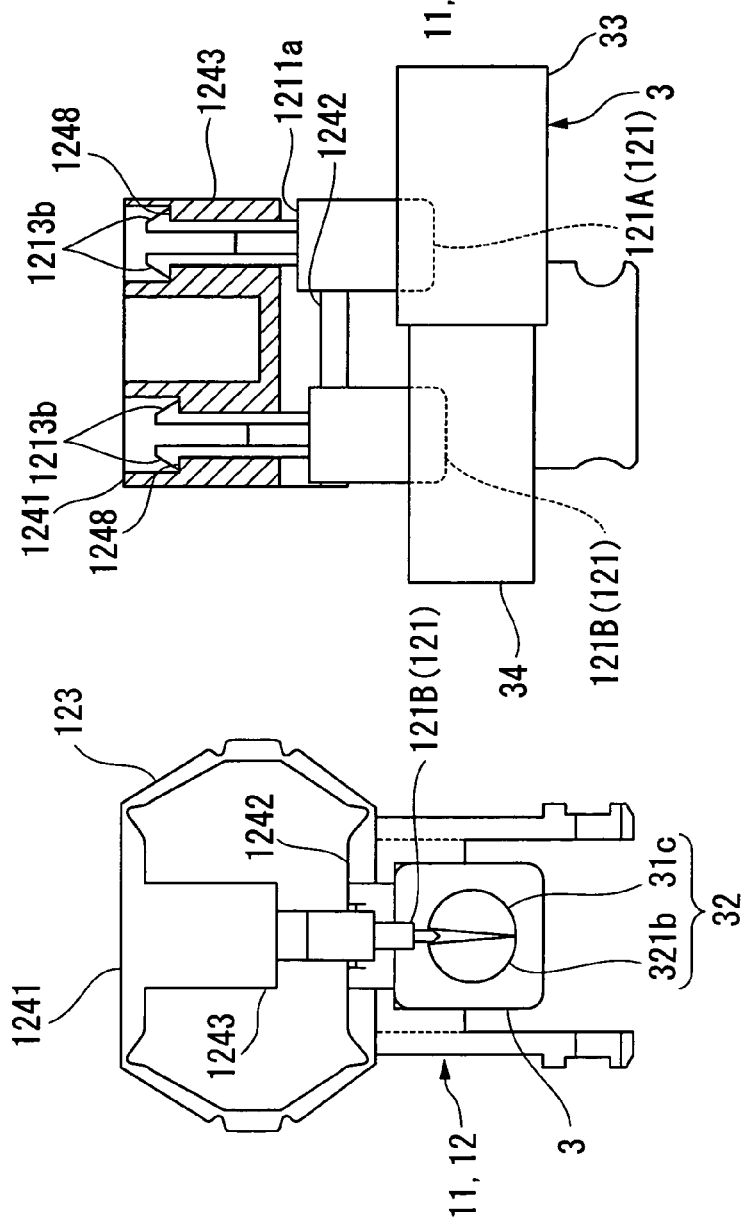

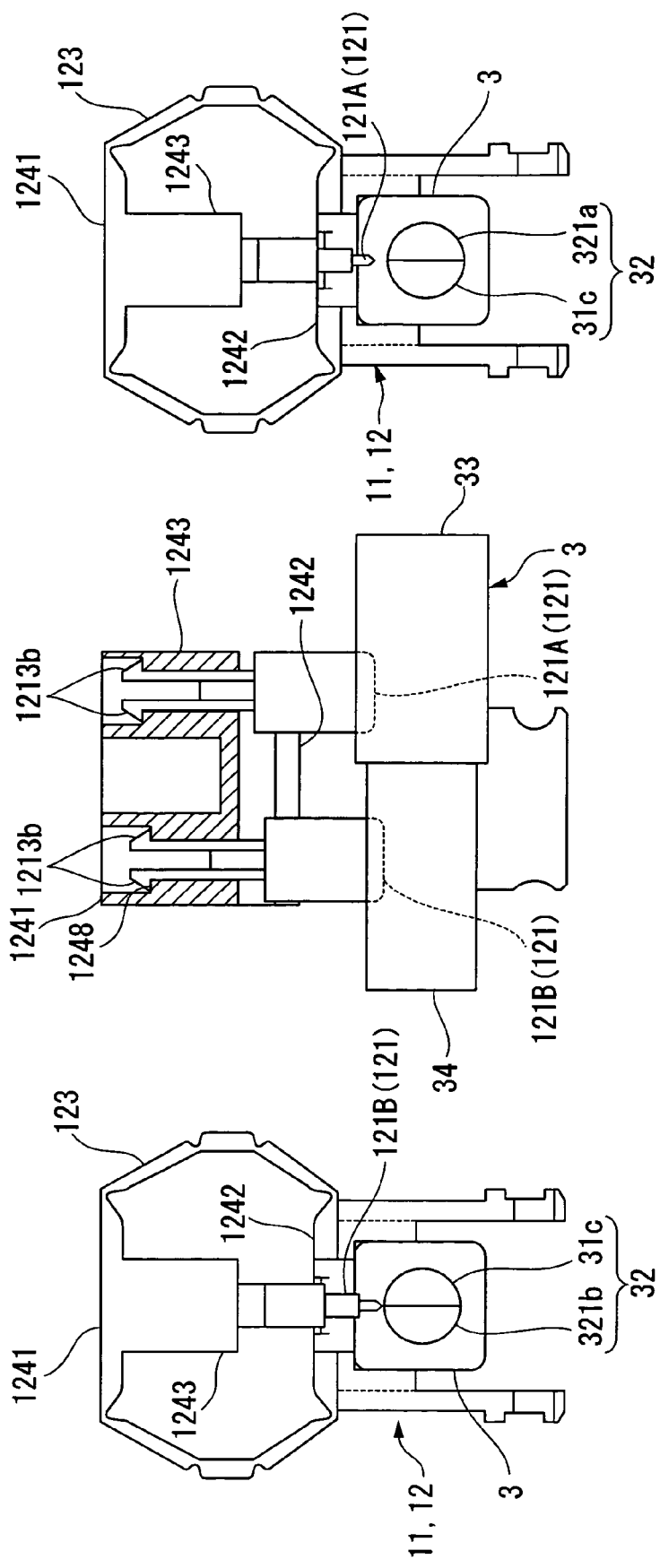

TOOL FOR OPTICAL CONNECTOR AND TOOL EQUIPPED OPTICAL CONNECTOR

CROSS-REFERENCE TO RELATED APPLICATIONS

This Application is based upon and claims the benefit of priority from: Japanese Patent Application No. 2004-330993, filed Nov. 15, 2004; Japanese Patent Application No. 2005-10856, filed Jan. 18, 2005; and Japanese Patent Application No. 2005-260253, filed Sep. 8, 2005, the contents of each of which are incorporated herein in their entirety by reference.

BACKGROUND OF THE INVENTION

1. Field of the Invention

The invention relates to a tool for an optical connector that is used in an optical connector having a mechanism for holding a pair of optical fibers in an abutted and optically connected state by clamping the optical fibers.

2. Description of the Related Art

In recent years, an optical connector that allows carrying out the operation of the attachment of distal ends of optical fibers at a connection site outside a factory has been known. For example, there is an optical connector that includes a ferrule in which an optical fiber is housed in advance and polished at a distal end surface thereof, and a clamping portion disposed at the back (the position opposite to the distal end surface) of the ferrule. The optical fiber housed in the ferrule and another optical fiber to be connected are abutment connected in the clamping portion by clamping these optical fibers in half split elements of the clamping portion to maintain the abutment connected state, and enabling the assembly of the optical connector in a short time. Because the size of the clamping portion is small, a dedicated tool that carries out the opening and closing of the elements (an optical connector assembling tool) has been proposed (refer, for example, to Japanese Unexamined Patent Application, First Publication No. 2002-23006 and Japanese Unexamined Patent Application, First Publication No. 2002-55259).

However, it is necessary that the optical connector attachment tool having the structure described above be precisely formed so that a wedge that has undergone high precision processing can be correctly inserted and released between the small-sized elements in order to realize the operation of the clamping portion of the optical connector, and thus there is a problem in that cost reductions are difficult. In addition, in the clamping portion described above, a comparatively great effort is required in both the insertion and release of the wedge in the elements due to the clamping force of a spring that imparts a clamping force to the elements, and thus there are problems in that downsizing and cost reductions are difficult. With regard to size, the optical connector assembling tool described above may also encounter a problem in that the optical connector assembling tool cannot be inserted in a narrow operation space such as a device casing. In addition, when a connector is to be attached to a distal end of an optical fiber using the optical connector assembling tool disposed outside a device casing, there may be disadvantage in that it is necessary that the extra extraction length for extracting the optical fiber from the device casing be guaranteed.

SUMMARY OF THE INVENTION

In consideration of the above problems, an object of the invention is to provide a tool for an optical connector which enables the operation of attaching an optical connector to a distal end of an optical fiber at low cost.

In order to solve the problems described above, the invention provides a tool for an optical connector including a clamping portion for clamping an optical fiber between clamping elements, the tool including: first and second insertion members, respectively including separately extractable first and second distal ends, wherein the first and second distal ends maintain the clamping elements in an open state by being wedged therebetween from outside the clamping portion, so that the optical fiber is movable between the clamping elements; first and second insertion member operating portions, respectively separately connected to proximal ends of the first and second insertion members, that individually extract the first and second distal ends of the first and second insertion members from between the clamping elements; and a stopper portion against which the optical connector is pressed when the first and second insertion members are extracted from between the clamping elements.

The tool for an optical connector described above may be structured such that the first and second distal ends are separated in an axial direction of the optical connector.

The tool for an optical connector described above may be structured such that the first and second insertion member operating portions respectively comprise first and second movable end portions respectively supporting the first and second insertion members; the first and second movable end portions are positioned on a side of the stopper portion opposite to the optical connector; and the first and second insertion member operating portions are deformable by applying pressure thereto so that the distance between the stopper portion and the movable end portion increases, which provides the individual extraction of the first and second distal ends of the first and second insertion members from the clamping members.

The tool for an optical connector described above may be structured such that the stopper member comprises at least one insertion member window through which the first and/or second insertion members extend.

The tool for an optical connector described above may be structured such that the first and second insertion members extend in a radial direction of the optical connector The tool for an optical connector described above may be structured such that the second insertion member operating portion is wider in the axial direction of the optical connector than the first insertion member operating portion.

The tool for an optical connector described above may be structured so that the optical connector comprises a connection point at which the optical fiber is abutted to another optical fiber or element therein; the first distal end of the first insertion member is wedged between the clamping elements at the connection point; and the second distal end of the second insertion member is wedged between the clamping elements at a second point spaced apart from the connection point in the axial direction of the optical fiber and connector.

The tool for an optical connector described above may be structured so that the the optical connector further comprises a ferrule including a distal end surface; the clamping portion is attached to the ferrule at a second end opposite to the distal end surface, and comprises a spring portion; and the clamping portion maintains an abutment connection between the optical fiber and a second optical fiber that is housed and fastened therein by using elasticity of the spring portion, when the first and second distal ends of the first and second insertion members are extracted from between the clamping elements.

The tool for an optical connector described above may be structured so that the clamping elements comprise, on one half, a base side element, and on an opposing half, first and second lid side elements, which sandwich the optical fiber with the base side element; the first distal end of the first insertion member is wedged between the base side element and the first lid side element; and the second distal end of the second insertion member is wedged between base side element and the second lid side element.

The tool for an optical connector described above may be structured so that the first and second insertion member operating portions respectively comprise: first and second movable end portions respectively supporting the first and second insertion members; first and second pairs of deformable joining wall portions connected between the stopper portion and the respective first and second movable end portions.

The tool for an optical connector described above may be structured so as to when either the first or second pairs of deformable joining wall portions are deformed, the respective first or second insertion members are moved away from the optical connector so that the first or second distal ends of the first or second insertion members are extracted from between the clamping elements.

The tool for an optical connector described above may be structured so that the first and second pairs of deformable joining wall portions each comprise two connecting plates joined by a hinge portion; and the first and second pairs of deformable joining wall portions have a symmetrical shape with respect to the first and second insertion members.

The tool for an optical connector described above may be structured such that the first and second pairs of deformable joining wall portions each comprise three connecting plates joined by two hinge portions; and the first and second pairs of deformable joining wall portions have a symmetrical shape with respect to the first and second insertion members.

The tool for an optical connector described above may be structured such that it also includes a groove-shaped accommodating recess, extending in the axial direction of the optical connector, that accommodates the optical connector; and a connector holder portion that forms the stopper portion.

The tool for an optical connector described above may be structured such that it includes a retainer engaging portion, to which a removable retainer is mounted to hold the optical connector between the stopper portion and the retainer.

The tool for an optical connector described above may be structured such that the first and second insertion member operating portions form a staggered extraction mechanism, so that the first insertion member can be individually extracted before the second insertion member.

The tool for an optical connector described above may be structured such that the first and second insertion members respectively comprise first and second proximal end portions with respective first and second elastic portions and respective first and second catch portions; the first and second movable end portions respectively comprise first and second proximal end portion accommodating portions with first and second proximal end portion accommodating holes therein; and the first and second proximal end portion accommodating holes respectively comprise a first and second enlarged hole that respectively engage with the first and second catch portions on the first and second proximal end portions of the first and second insertion members.

The tool for an optical connector described above may be structured such that the first and second catch portions project from the sides of the first and second proximal end portions of the first and second insertion members; the first and second proximal end portion accommodating holes comprise first and second extraction engaging portions forming a first and second step between the first and second proximal end portion accommodating holes and the first and second enlarged holes; the first and second catch portions have respective first and second clearances to the first and second extraction engaging portions; and when the first and second distal ends of the first and second insertion members are wedged between the clamping elements, the first clearance is larger than the second clearance.

The tool for an optical connector described above may be structured such that it also includes a motion detecting mechanism that detects positions of the first and second insertion members, relative to preset positions, and produces a detection signal.

The tool for an optical connector described above may be structured such that the motion detecting mechanism includes: first and second contact projection that respectively project from side portions of the first and second insertion members; and a contact member, formed on the tool and projecting therefrom releasably contacts the first and second contact projections; and the first and second contact projections, and/or contact member, is an elastic member that produces a sound that serves as a detection signal when the releasable contact therebetween has been released after the first and second contact projections and/or contact member have elastically deformed due to contacting each other because of the movement of the first and second insertion members.

The tool for an optical connector described above may be structured such that the detection signal is produced when the first or second insertion member is extracted from between the clamping elements.

The tool for an optical connector described above may be structured such that the first and second distal ends of the first and second insertion members are formed of a different material than other portions of the first and second insertion members.

The tool for an optical connector described above may be structured such that the first and second distal ends of the first and second insertion members are formed of a different material than the first and second movable end portions.

The tool for an optical connector described above may be structured such that the first distal end of the first insertion member is rounded.

The tool for an optical connector described above may be structured such that the first distal end of the first insertion member is triangular.

The tool for an optical connector described above may be structured such that the first distal end of the first insertion member is chamfered.

The tool for an optical connector described above may be structured such that the first distal end of the first insertion member is removably attached to the first insertion member.

In the invention, in comparison to a conventional dedicated tool, it is possible to realize a connection between optical fibers in the clamping portion that does not use a conventional dedicated tool by using an optical fiber connecting tool having a structure that is extremely simple and can be downscaled. Thereby, it is possible to realize the attachment of the optical connector to the distal end of the optical fiber easily. In addition, the tool for an optical connector has an extremely simple structure, and furthermore can be fabricated inexpensively. Thus, in comparison to using a dedicated tool having a conventional structure, it is possible to realize significant reductions in cost. Furthermore, the optical fiber connecting tool (including one in which the tool for an optical connector is attached to the optical connector in the field, for example) can realize the attachment of the optical connector to the distal end of the optical fiber simply by extracting the insertion members from the clamping portion by operating the insertion member operating portion after inserting the optical fiber into the clamping portion, and thus the operation of carrying out precision positioning and support by fitting the optical connector into the holder portion, which requires using a conventional dedicated tool, becomes unnecessary, and thus the attachment operation becomes extremely simple.

In addition, in the invention, the distance between the movable end portion and the stopper portion is increased by applying a lateral pressure from both opposing sides to the portion of the insertion member operating portion positioned between the movable end portion and the stopper portion (below referred to as the side portion; there is a pair of side portions on the ring-shaped insertion member operating portion positioned between the movable end portion and the stopper portion) and elastically deforming the insertion member operating portion such that the side portions on both sides thereof approach each other. Thereby, the insertion member operating portion functions as a torque mechanism that increases the pressure (increases the force) and converts the resulting lateral pressure acting on the insertion member operating portion to a force in a direction orthogonal to the lateral pressure (that is, a force that extracts the insertion members from between the half split elements). Thereby, the extraction of the insertion members from between the clamping elements using a weak force can be carried out simply and comfortably. In addition, the insertion member operating portion has an extremely simple structure, and thus the tool for an optical connector, and a tool equipped optical connector can be downscaled.

Furthermore, according to the tool for an optical connector of the invention, by operating the insertion member operating portion, among the insertion members wedged between the clamping elements, it is possible to extract from between the clamping elements the insertion members in sequence starting from the insertion member closest to a connecting point and proceeding to the insertion members that are the far from the connecting point staggered in time. Thereby, unnecessary flexure, stress, and the like are not applied to the optical fibers, and it is possible to realize a clamping and fastening of the optical fibers in the clamping portion. As a result, it is possible to realize the stable maintenance of the optical characteristics of the optical fibers themselves that are clamped in the clamping portion and the characteristics such as connection loss between the optical fibers that are abutment connected in the clamping portion, and thereby it is possible to improve the long-term reliability.

In addition, in the invention, because the insertion member operating portion is elastically deformed such that both side portions of the insertion member operating portion approach each other due to a lateral pressure that is applied from both opposing sides, the distance between the movable end portion and the stopperportion increases. The insertion member operating portion functions as a torque mechanism that increases the pressure (increases the force) and converts the resulting lateral pressure acting on the insertion member operating portion into a force in a direction orthogonal to the lateral pressure (that is, a force that extracts the insertion members from between the half split elements), and thereby in comparison to directly extracting the insertion members from between the half split elements, the extraction of the insertion members from between the half split elements can be carried out comfortably with a weak force. In addition, because the insertion member operating portion has an extremely simple structure, the tool for an optical connector and the tool equipped optical connector can be downscaled.

It is possible to time stagger the extraction of a plurality of insertion members from between the half split elements of the clamping portion simply by deforming the insertion member operating portion by using lateral pressure applied from both sides. When the insertion member operating portion is deformed due to the application of lateral pressure from both sides, there are the advantages that it is not necessary to carry out a special operation to realize the time staggered extraction and it is possible to realize time staggered extraction by an extremely simple operation.

BRIEF DESCRIPTION OF THE DRAWINGS

The above and other objects, features and advantages of the invention will become more apparent by describing in detail exemplary embodiments thereof with reference to the attached drawings in which:

FIGS. 21A to 21C are drawings showing the tool equipped optical connector, where FIG. 21A is a drawing that schematically shows, among the two insertion members of the tool for an optical connector, the relationship between the insertion member on the side distant from the connecting point between the ferrule-side optical fiber and the other optical fiber and the clamping portion of the optical connector, FIG. 21B is a drawing showing the relationship between the two insertion members of the tool for an optical connector and the proximal end portion accommodating portion of the insertion member operating portion, and FIG. 21C is a drawing that schematically shows, among the two insertion members of the tool for an optical connector, the relationship between the insertion member on the side close to the connecting point between the ferrule-side optical fiber and the other optical fiber and the clamping portion of the optical connector;

FIGS. 23A to 23C are drawings showing the state in which, among the two insertion members of the tool for an optical connector, the extraction engaging portion of the proximal end portion accommodating portion of the insertion member operating portion is engaged on the engagement receiving portion of the insertion member on the side distant from the connecting point after the extraction of the insertion members on the side close to the connecting point between the ferrule-side optical fiber and the other optical fiber from the clamping portion of the optical connector has been completed due to the deforming operation of the insertion member operating portion of the optical fiber tool of the tool equipped optical connector;

FIGS. 24A to 24C are drawings showing the state in which, among the two insertion members of the tool for an optical connector, the insertion member distant from the connecting point between the ferrule-side optical fiber and the other optical fiber has been extracted from the clamping portion of the optical connector due to the deforming operation of the insertion member operating portion of the optical fiber tool of the tool equipped optical connector;

DETAILED DESCRIPTION OF EXEMPLARY EMBODIMENTS OF THE INVENTION

Exemplary embodiments of the invention will now be described by reference to the attached Figures. The described exemplary embodiments are intended to assist the understanding of the invention, and are not intended to limit the scope of the invention in any way.

A first exemplary embodiment of the invention will be explained below with reference to the appended drawings.

Figure 1:
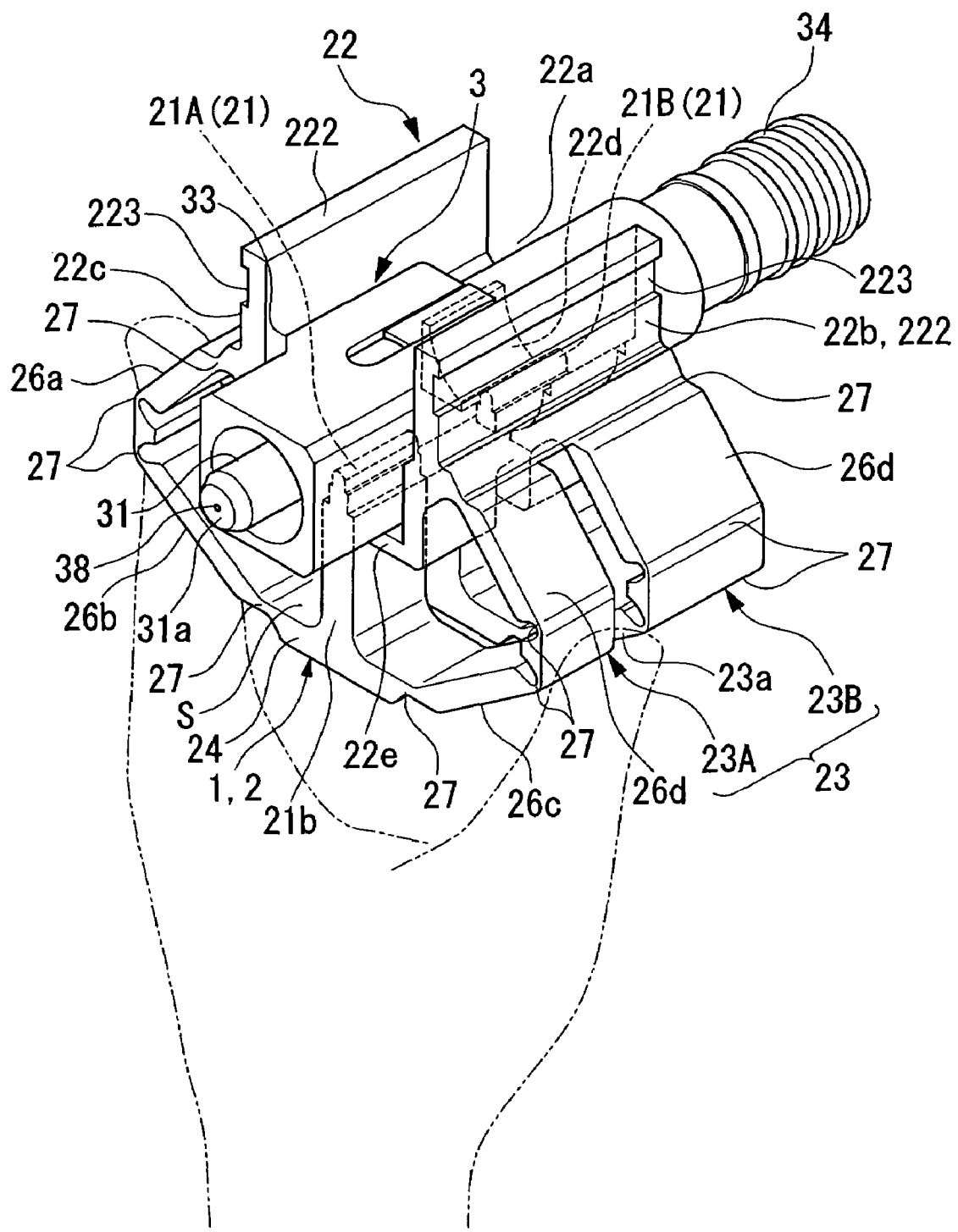
FIG. 1 is a perspective view showing the tool equipped optical connector and the tool for an optical connector according to a first exemplary embodiment of the invention.
Figure 2:
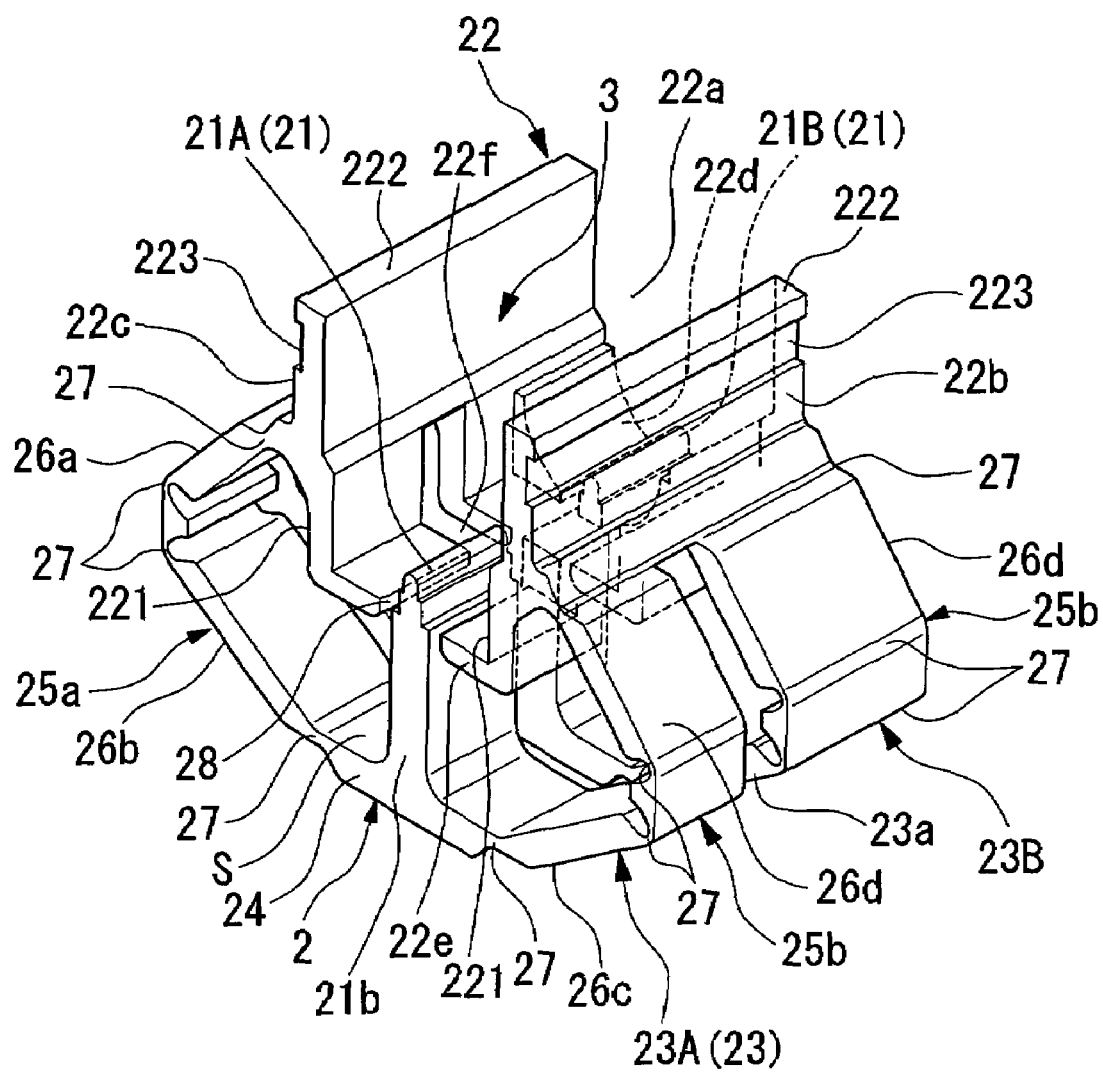
FIG. 2 is a perspective view showing the tool for an optical connector in FIG. 1.
Figure 3:
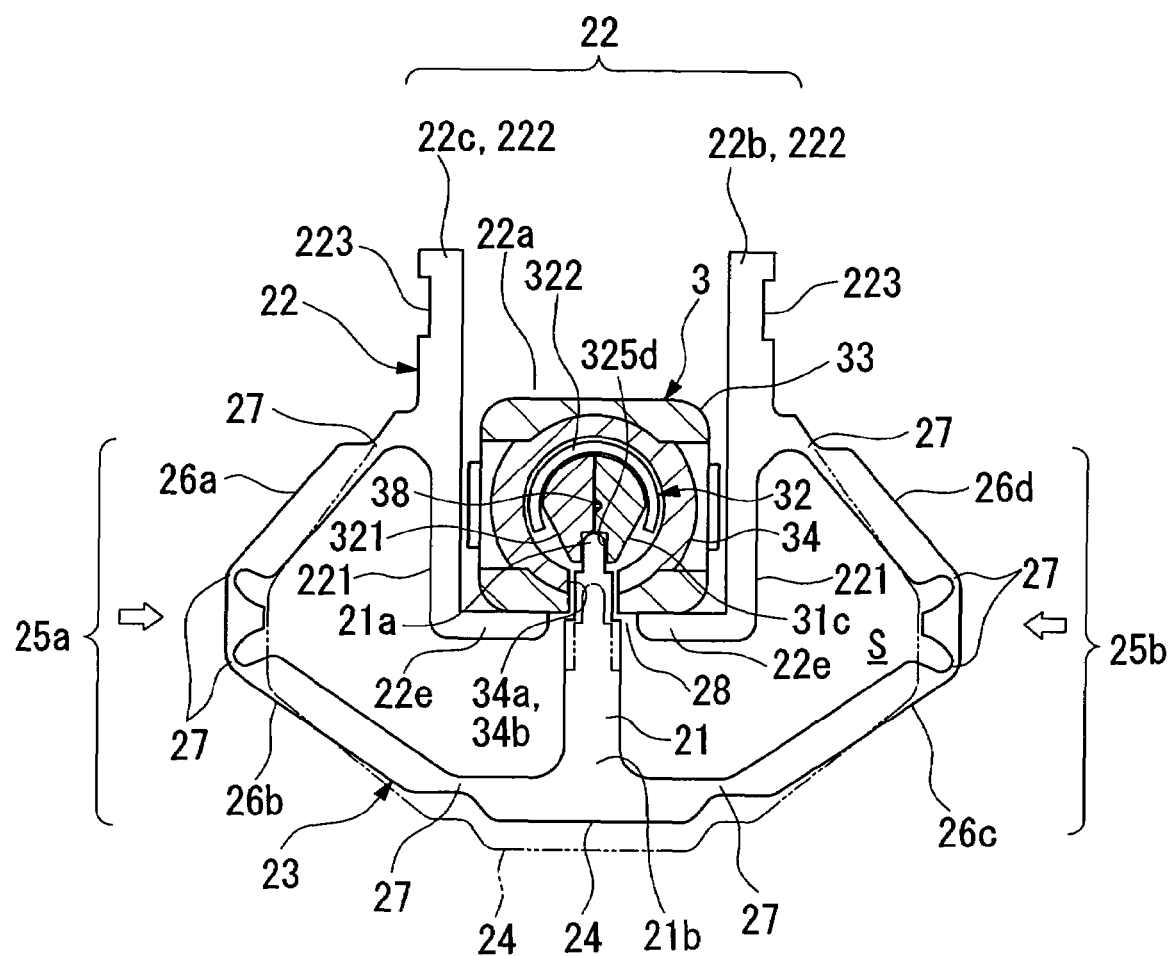
FIG. 3 is a partially exploded front view showing the tool equipped optical connector and the optical connector in FIG. 1.
Figure 4:
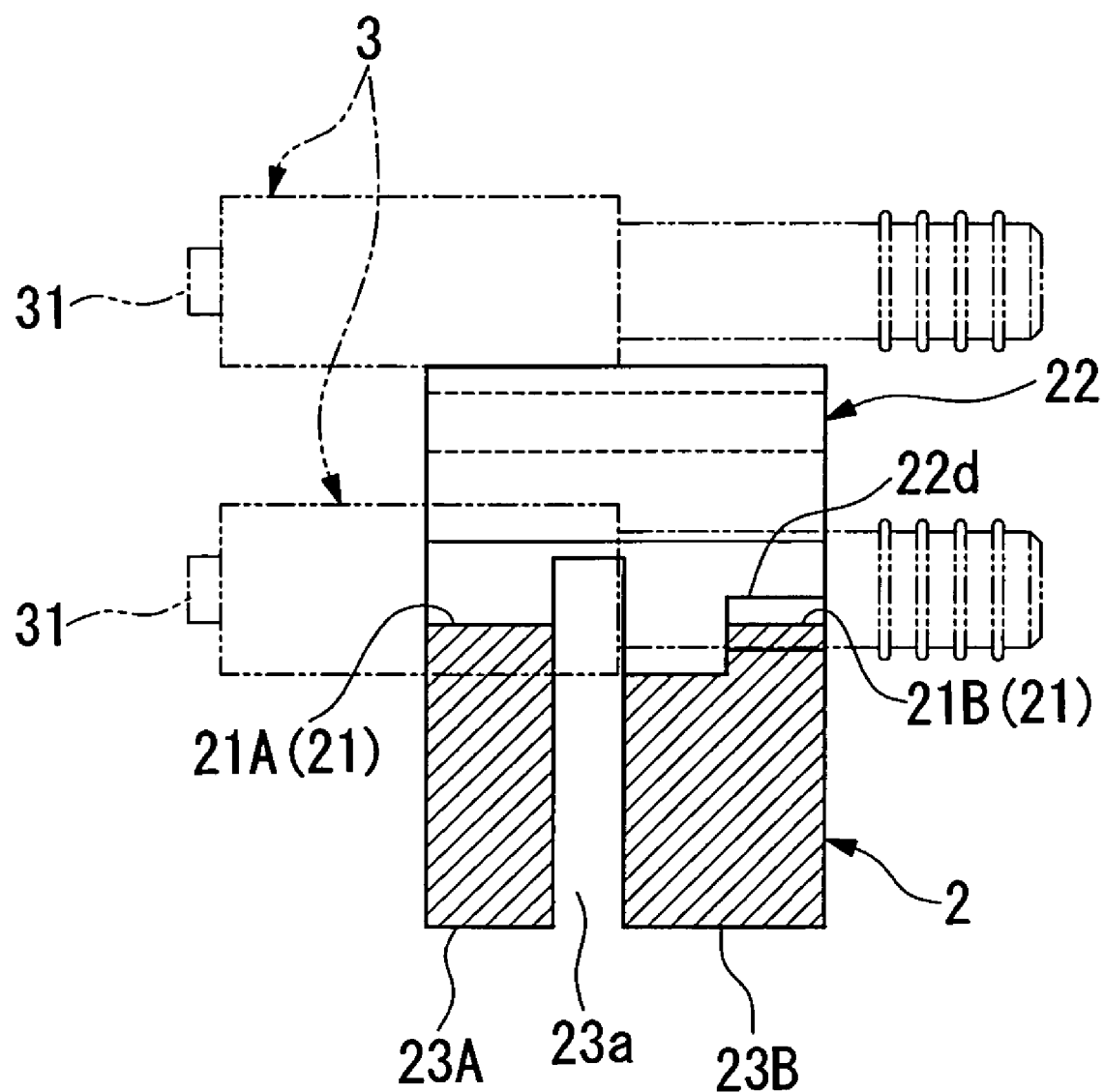
FIG. 4 is a side cross-sectional view showing the relation between the two insertion members and the optical connector (optical connector plug) of the tool for an optical connector in FIG. 1.
Figure 5C:
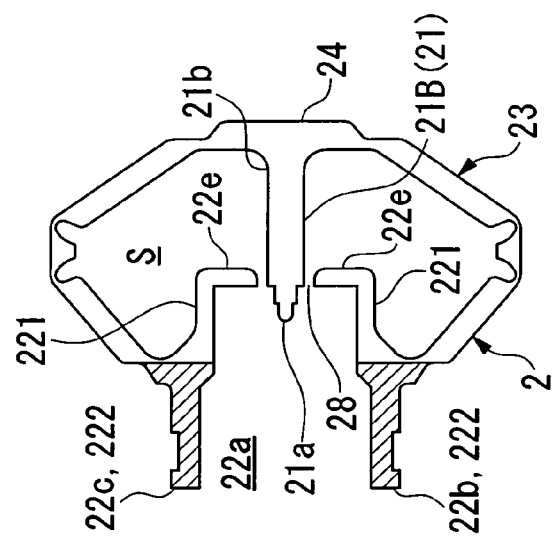
FIG. 5C is a cross-sectional view along the line A-A in FIG. 5A.
Figure 5B:
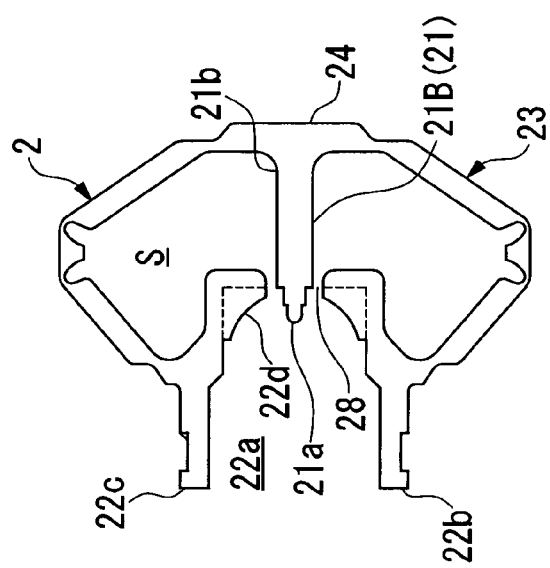
FIG. 5B is a back view showing the same structure.
Figure 5A:
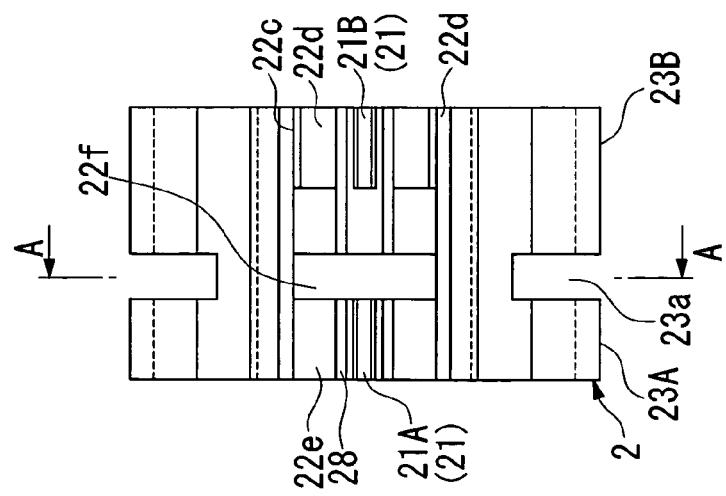
FIG. 5A is a plan view showing the structure of the tool for an optical connector in FIG. 1.
Figure 6:
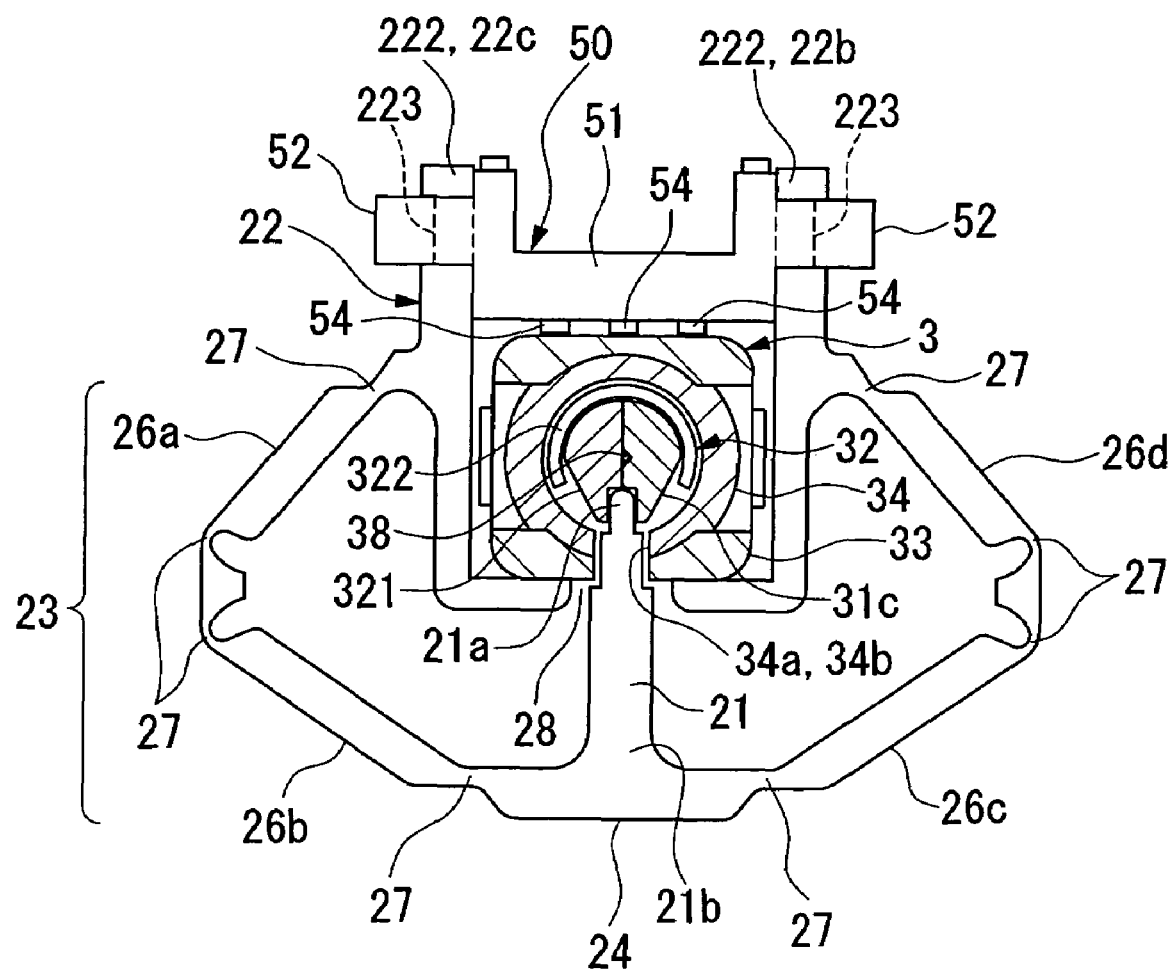
FIG. 6 is a partially exploded front view showing the state in which the retainer is installed in the tool equipped optical connector.

FIG. 1 is a perspective view showing the tool equipped optical connector 1 and an optical fiber connector tool 2 according to a first embodiment of the invention; FIG. 2 is a perspective view showing an optical connector tool (a tool for an optical connector) 2; FIG. 3 is a front view showing a partial cross-section of the tool equipped optical connector 1; and FIG. 4 is a side cross-sectional view showing the positional relationship between the two insertion members (21A and 21B) of the optical connector tool 2 and the optical connector 3 (optical connector plug); FIGS. 5A to 5C are drawings showing the structure of the optical connector tool in FIG. 1, where FIG. 5A is a plan view, FIG. 5B is a back view, and FIG. 5C a cross-sectional view along ling A-A in FIG. 5A; and FIG. 6 is a front view showing the state in which the retainer is installed on the tool equipped optical connector 1.

As shown in FIG. 1 to FIG. 3, the tool equipped optical connector 1 is formed by mounting the connector holder 2 on the outside of the optical connector 3, which is an optical connection plug. The optical connector plug 3 in the illustrated example is what is termed SC2 type optical connector. The latch mounted on the outside of the plug frame 33 (refer to FIG. 9 and FIG. 13) of the SC type optical connector is omitted from the SC type optical connector (SC: single fiber coupling optical fiber connector, such as an F04 type optical connector (optical connector plug) defined in the JIS C 5973). Note that the optical connector 3 is not limited to the SC2 type optical connector described above, but various optical connector plugs such as a single core type optical connector plug, a multiple-core type optical connector plug, or the like may be used.

First, the optical connector 3 will be explained.

Figure 9:
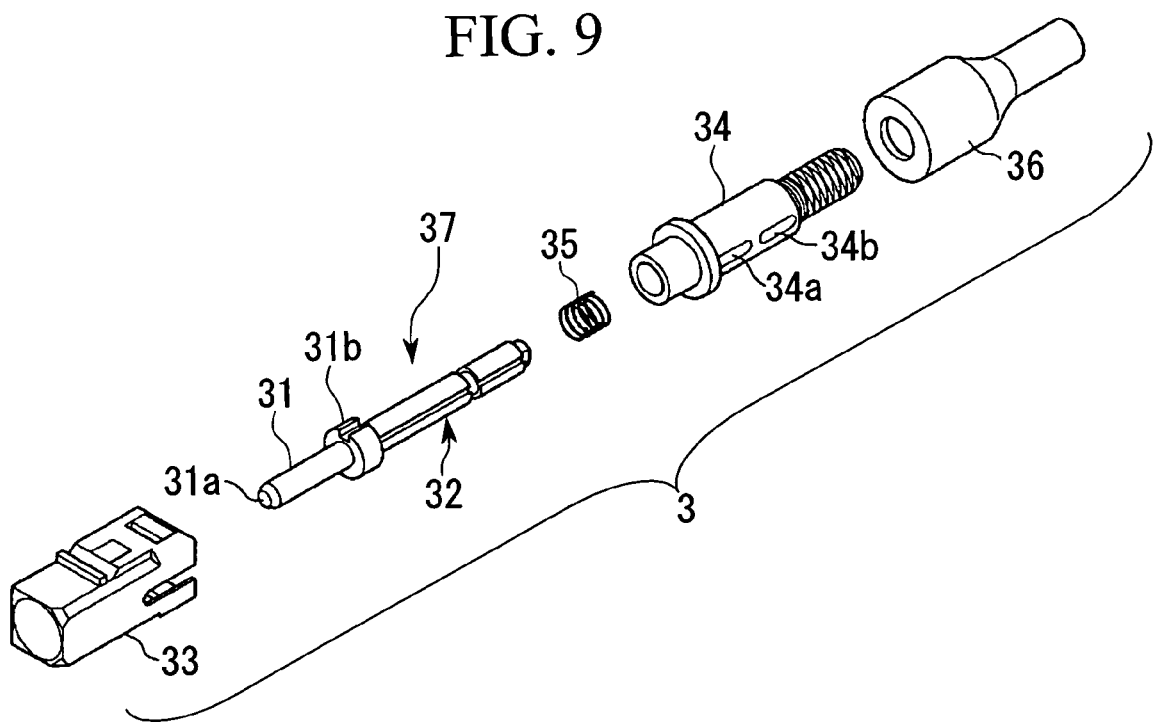
FIG. 9 is an exploded perspective view of the optical connector (optical connector plug) that forms the tool equipped optical connector in FIG. 1.
Figure 10:
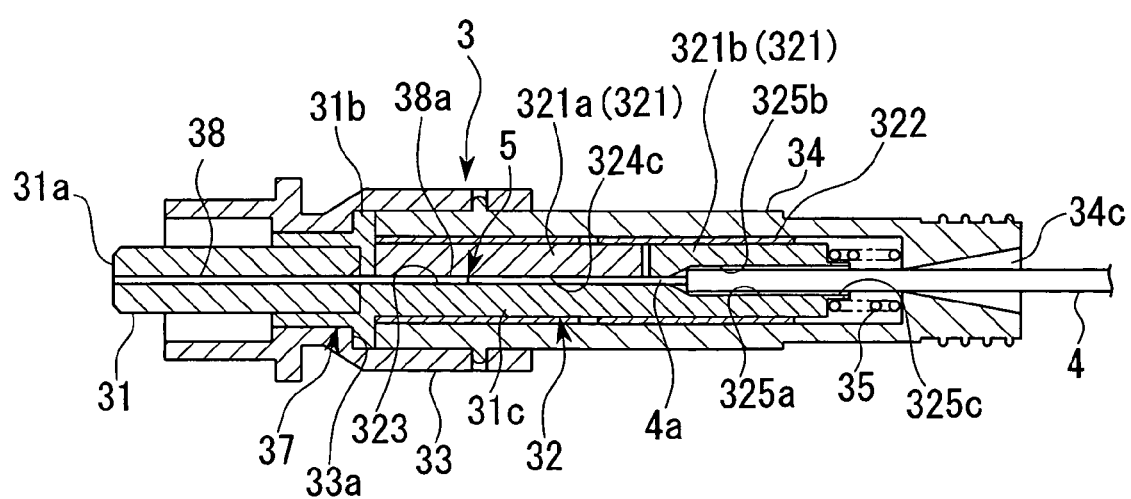
FIG. 10 is a cross-sectional view showing the optical connector (optical connector plug) in FIG. 9.

FIG. 9 and FIG. 10 are drawings showing the structure of the optical connector 3, in particular, FIG. 9 is an exploded perspective view and FIG. 10 is a cross-sectional view. In FIGS. 9 and 10, the optical connector 3 includes a ferrule 31; a clamping portion 32 that is disposed at the back end side opposite to the connection surface end (reference symbol 31a; the distal end surface) of the ferrule 31; a sleeve-shaped plug frame 33 that is mounted outside the ferrule 31 so as to accommodate the ferrule 31 while restraining rotation of the ferrule 31 about the axis thereof; a stop ring 34 that is attached by engagement to the back end (right side in FIG. 10) of the plug frame 33 and accommodates the clamping portion 32; and a spring 35 that is mounted inside the stop ring 34.

Note that reference symbols 34a and 34b denote the insertion opening into which the insertion members 21 (refer to FIG. 1 and FIG. 3 and the like) of the connector holder 2 are inserted and that accommodates the clamping portion 32.

Reference symbol 36 denotes boot mounted on the back end of the stop ring 34. However, when the optical fiber 4 is inserted into the clamping portion 32 from the back end side (the right side in FIG. 10) of the optical connector 3, after the optical fiber 4 is passed through the boot 36, the boot 36 is mounted on the stop ring 34 after the insertion of the optical fiber 4 into the clamping portion 32 has been completed.

The clamping portion 32 is formed by attaching plural members to an extended portion 31c that extends from a flange portion 31b of the ferrule 31 towards the back end side of the optical connector 3. The clamping portion 32 is integrally formed with the ferrule 31, and hereinafter, the ferrule 31 to which the clamping portion 32 is attached may be referred to as a "clamping portion equipped ferrule 37".

The clamping portion 32 of the clamping portion equipped ferrule 37 is accommodated in the stop ring 34 while being allowed to move freely in the axial direction of the sleeve-shaped stop ring 34. The spring 35 receives a reaction force from the back end side of the stop ring 34 to press the clamping portion 32 against the distal end side (the left side in FIG. 10) of the optical connector 3, and thereby the entire clamping portion equipped ferrule 37 is urged towards the back end side of the optical connector 3. For example, when the optical connector 3 is connected to a separate optical connector by being inserted into an optical connector adaptor or the like, the spring 35 functions to impart an abutment force between the optical connector 3 and the optical connector on the connection partnering side at the ferrule 31.

Note that further movement (the movement relative to the stop ring 34) of the clamping portion equipped ferrule 37 towards the back end side of the optical connector 3 with respect to the stop ring 34 is restrained by the flange portion 31b of the ferrule 31 abutting the stopper projection 33a that projects into the plug frame 33.

Figure 11:
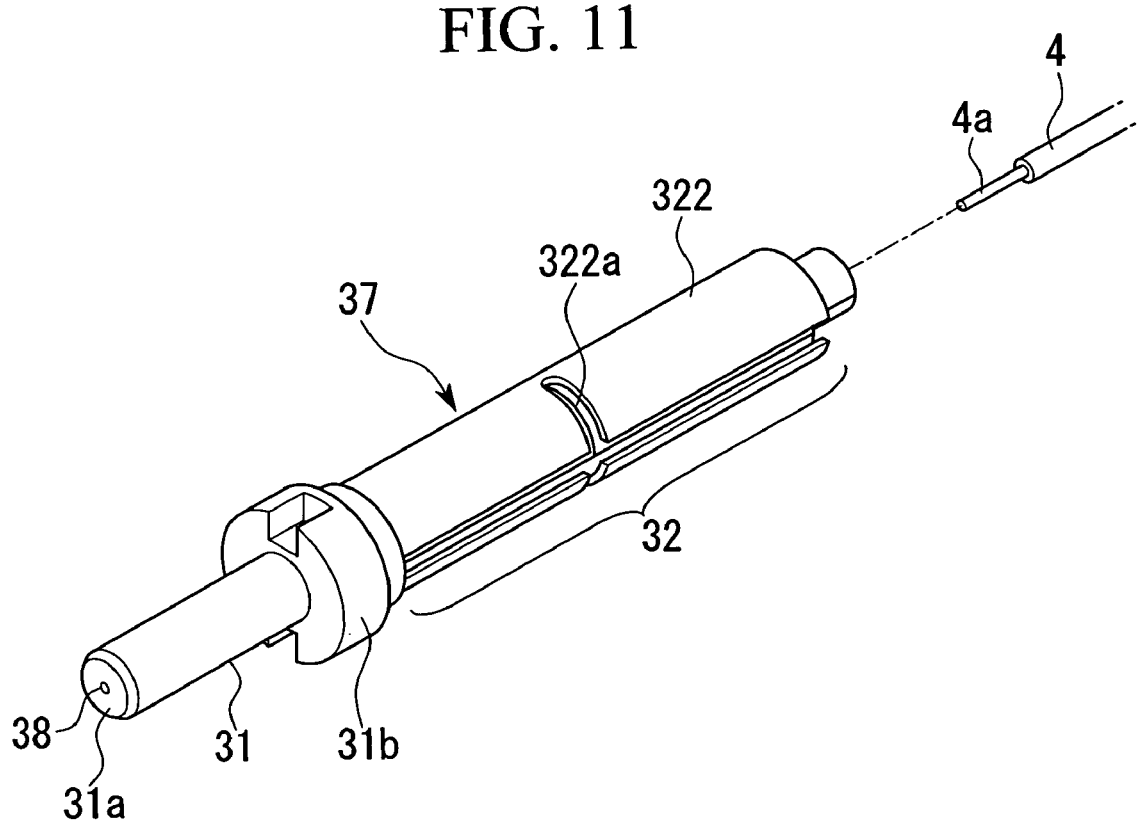
FIG. 11 is a perspective view showing the ferrule attached to the clamping portion that is built-in to the optical connector in FIG. 9.
Figure 12:
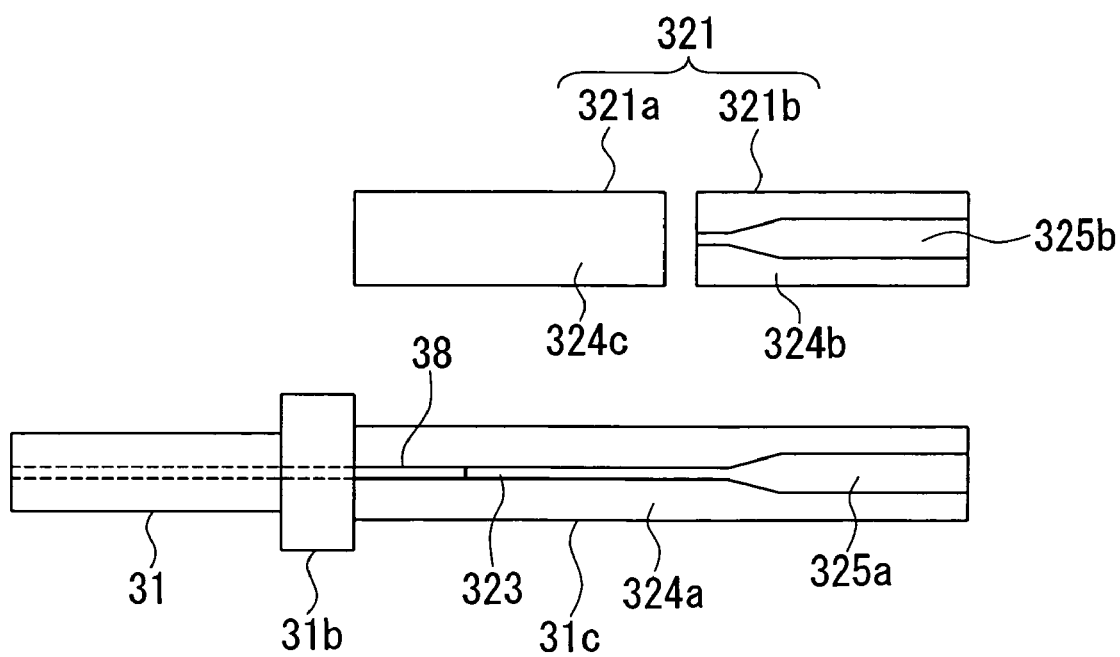
FIG. 12 is a drawing showing the abutment faces of each of the elements that forms the clamping portion of the ferrule attached to the clamping portion in FIG. 11.

FIG. 11 is a perspective view showing the clamp equipped ferrule 37, and FIG. 12 is a drawing showing abutment surfaces of the two lid side elements 321a and 321b and the base side element (extended portion 31c) that form the clamping portion 32 of the clamp equipped ferrule 37.

As shown in FIG. 10 to FIG. 12, the clamping portion 32 is formed by accommodating the extended portion 31c that extends from the flange portion 31b of the ferrule 31 and the lid side elements 321a and 321b that are disposed on an abutment surface 324a of the extended portion 31c inside of the sleeve-shaped spring 322 having a C-shaped cross-section (C-shaped spring). The extended portion 31c forms one of half split elements (hereinafter sometimes referred to as an element 31a) that form the clamping portion 32, and the two lid side elements 321a and 321b form the other (element 321) of the half split elements that forms the clamping portion 32. The clamping portion 32 has a structure in which an optical fiber is clamped between the pair of half split elements 31a and 321. The two lid side elements 321a and 321b are arranged along the optical connector 3 (left to right in the FIG. 10) such that one (the element 321a) is closer to the ferrule 31 side than the other (the element 321b). The spring 322 is configured such that elasticity of the spring 322 acts separately on the two lid side elements 321a and 321b by the slit 322a formed in the spring 322 in proximity to the border between the two lid side elements 321a and 321b. Accordingly, one set consisting of the lid element 31a and the extended portion 31c and the other set consisting of lid element 321b and the extended portion 31c each can function as an independent clamping portion.

Note that any type of shape, such as a U-shape in cross-section, can be used for the spring 322.

Next, the optical connector tool 2 will be explained with reference to FIG. 1 to FIG. 5C.

As shown in FIG. 1 to FIG. 5C, the optical connector tool 2 includes a connector holder body 22 that is attached outside the optical connector 3; a ring-shaped insertion member operating portion 23 that is provided on a peripheral portion of the connector holder portion 22; and, in the insertion member operating portion 23, insertion members 21 that project from the movable end portion 24, which is an end portion on the side opposite to the connector holder body 22, towards the connector holder portion.

The optical connector tool 2 is an integral element made of a synthetic resin; however, in the invention, this is not limiting, and the optical connector tool 2 may be formed by a plurality of elements. For example, an insertion member 21 may be a member that is separate from an insertion member operating portion 23.

The connector holder body 22 is formed having a U-shape in cross-section, and the inside thereof forms a groove-shaped accommodating recess 22a that accommodates the optical connector 3 so that it can be extracted. Specifically, the connector holder body 22 includes a bottom wall 22e, and side walls 22b and 22c erected on this bottom wall 22e and disposed on both sides thereof via the accommodating recess 22a Note that in the tool equipped optical connector 1, the optical connector tool 2 accommodates the optical connector 3 in the accommodating recess 22a, and furthermore, by wedging the insertion members 21 between the elements 31c and 321 of the clamping portion 32, it becomes attached to the optical connector 3 to form a portion of the tool equipped optical connector 1.

Specifically, in the tool equipped optical connector 1 according to the invention, the distal end portion 21a of an insertion member 21 of the insertion member operating portion 23, where insertion member 21 extends from the movable end portion 24, projects from the insertion member window (for example, the slit 28 described below) that is opened in the bottom wall 22e of the connector holder portion 22 (described below) into the accommodating recess 22a. In addition, in the tool equipped optical connector 1, the distal end portion 21a (refer to FIG. 1 and FIG. 3) of two insertion members 21 (21A and 21B), which project from the movable end portion 24 of the optical connector tool 2, are wedged between a pair of elements 31c and 32c (specifically, between the abutment surface of the extended portion 31c opposite the element 321 and the abutment surface of the lid side elements 321 and 322 opposite the element 31c) via the insertion openings 34a and 34c of the stop ring 34 from outside the optical connector 3. Thereby, in the tool equipped optical connector 1, the pair of elements 31c and 321 is pushed only slightly open by the insertion members 21 due to elasticity of the spring 322. In addition, the two insertion openings 34a and 34b of the stop ring 34 open at a position that corresponds to the two clamping portions that correspond to the two lid side elements 321. Two insertion members 21 (21A and 21B) of the optical connector tool 2 are respectively inserted into the space between the element 31c and the element 321a and the space between the element 31c and the element 321b via the two insertion openings 34a and 34b of the spring stop 34.

However, the optical connector tool 2 can be supplied to the work site separated from the optical connector 3, or as necessary, installed on the optical connector 3, and can be used to attach the optical connector 3 to the distal end of an optical fiber. In addition, the optical connector tool 2 can be installed on an optical connector that is already attached to the distal end of an optical fiber, and can be used in the operation of releasing the optical connector from the optical fiber.

Figure 14A:
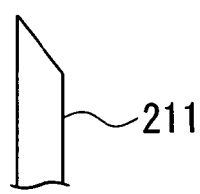
FIG. 14A and FIG. 14B are side views showing separate exemplary embodiments of the shapes of the distal end of the insertion members.
Figure 14B:
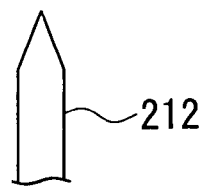

The distal end 21*a* (inserted distal end) of an insertion member 21 is formed so as to be thinner than other portions of the plate-shaped insertion members 21. However, as shown in FIG. 3, the distal end portion of the insertion members 21 in the present embodiment are formed in a shape that has a curved surface. The shape of the distal end of an insertion member 21 is not limited thereby, and any other shape, such as a pin shape, may be used if the pair of elements 31*c* and 321 is maintained in a only slightly open state due to the elasticity of the spring 322 by wedging the insertion members 21 into the space between the pair of elements 31*c* and 321. In addition, the insertion members 21 in the present embodiment are plate-shaped projections that project from the movable end portion 24 of the ring-shaped insertion member operating portion 23 (described below) of the optical connector tool 2. However, this is not limiting, and for example, one whose body as a whole has a pin shape may be used. Refer to FIG. 14A and FIG. 14B for other examples of the shape of the insertion members that are described below.

The bottom wall 22*e* of the connector holder body 22 is divided into two parts by the slit 28 (refer to FIG. 5A), which extends along the longitudinal direction of the connector holder body 22 (the direction along the direction of the extension of the groove-shaped accommodating recess 22*a*). The insertion members 21 have a distal end portion 21*a* that extends from the proximal end portion 21*b* connected to the movable end portion 24 towards the bottom wall 22*e* so as to traverse the insertion member operating portion 23, passes through the slit 28 formed in the bottom wall 22*e*, and is inserted between the elements at a portion that projects outside the insertion member operating portion 23 beyond the bottom wall 22*e*. The distal end portion 21*a* projects into the accommodating recess 22*a* through the slit 28. However, the structure (insertion member window) for allowing the insertion members 21 to project into the accommodating recess 22*a* from the insertion member operating portion 23 is not limited to the slit 28 that divides the bottom wall 22*e* into two parts. For example, a small hole may be bored into the bottom wall 22*e* having a structure that connects both side walls 22*b* and 22*c* of the connector holder portion 22. The insertion members 21 are disposed so as to pass through the insertion member window, but the insertion member window does not hinder the movement of the insertion members 21 caused by the deformation of the insertion member operating portion 23 described below.

The bottom wall 22*e* functions as a stopper wall that is abutted by the optical connector 3 when an insertion member 21 is extracted from the clamping portion 32 of the optical connector 3. In addition, the connector holder portion 22 that includes this bottom wall 22*e* is formed on a peripheral portion of the ring-shaped insertion member operating portion 23, and functions as a stopper portion that is abutted by the optical connector 3 when an insertion member 21 is extracted from the clamping portion 23 of the optical connector 3. The term bottom wall 22*e* can also replace "stopper portion". The term slit 28 can replace "insertion member window".

A "stopper portion" according to the invention prevents the optical connector from moving along with an insertion member when extracting the insertion member from between the elements of the clamping portion of the optical connector by operating the insertion member operating portion (deforming the insertion member operating portion such that the distance between the stopper portion and the movable end portion increases due to the application of the lateral pressure from both sides), and thereby functions to realize the smooth extraction of an insertion member from between the elements.

A "connector holder portion" according to the invention has a function identical to that of the stopper portion described above on the point of having a stopper wall that is abutted by the optical connector when an insertion member is extracted from the clamping portion of the optical connector. In the present specification, the term "stopper portion" includes the connector holder portion.

The insertion member operating portion 23 is formed in a sleeve shape that extends along the longitudinal direction of the connector holder portion 22 (the direction along the extension of the groove-shaped accommodating recess 22*a*). This insertion member operating portion 23 is divided into two divided operating portions 23A and 23B by the slit 23*a* (refer to FIG. 4) formed in the center portion in the direction of the extension. Specifically, the optical connector tool 2 has a structure in which the plurality of divided operating portions 23A and 23B are provided along the longitudinal direction of the connector holder portion 22. These two divided operating portions 23A and 23B are connected together via the connector holder portion 22.

Note that below, there are cases in which the partitioned operating portion denoted by the reference numeral 23A is explained as a front side operating portion, and the partitioned operating portion denoted by reference numeral 23B is explained as a back side operating portion.

As shown in FIG. 4, the slit 23*a* is formed at a position offset towards the front end side (the left side in FIG. 4; the side of the front side operating portion 23A) of the optical connector tool 2 in the direction of the extension of the insertion member operating portion 23. The size of the front side operating portion 23A in the direction of the extension of the insertion member operating portion 23 is formed so as to be small in comparison to the back side operating portion 23B. In addition, the divided operating portions 23A and 23B each have a movable end portion 24. The insertion members 21 are each provided on the divided operating portions 23A and 23B as projection portions that project from each of the divided operating portions 23A and 23B.

Note that in the optical connector 2 in the illustrated example, the bottom wall 22*e* of the connector holder portion 22 is also divided by the slit 22*f* formed at a position corresponding to the slit 23*a* formed in the insertion member operating portion 23 along the axial direction of the ring-shaped insertion member operating portion 23 (in other words, the direction of the extension or the axial direction of the operating mechanism). However, this slit 23*f* can be omitted.

The insertion members 21 (21A) provided on the front end operating portion 23A and the insertion member 21 (21B) provided on the back side operating portion 23B both extend from the proximal end portion 21*b* connected to the movable end portion 24 towards the bottom wall 22*e* so as to traverse the insertion member operating portion 23. These insertion members 21 (21A and 21B) each have a distal end portion 21*a* that is inserted between the elements at the part that passes through the slit 28 formed in the bottom wall 22*e* and projects outside the insertion member operating portion 23 beyond the bottom wall 22*e*. The plurality of the insertion members 21A and 21B are arranged in the axial direction of the insertion member operating portion 23.

The two divided operating portions 23A and 23B have an identical cross-sectional structure (a cross-sectional shape orthogonal to the direction of the extension of the insertion member operating portion 23), and in the figure, identical structural portions in the cross-sectional structure of the divided operating portions 23A and 23B are denoted by identical reference numerals.

Concretely, the divided operating portions 23A and 23B are structured having a movable end portion 24 and a pair of side portions 25a and 25b (below, referred to as joining wall portions) that connect the space between the movable end portion 24 and the connector holder portion 22. The joining wall portions 25a and 25b have an L shape, and furthermore, the inner angle side of the curved portion of each of the joining wall portions 25a and 25b face so as to oppose each other. Specifically, in the space between the connector holder portion 22 and the movable end portion 24, the curved portion projects out beyond both sides (outside the insertion member operating portion 23), and connects the space between the connector holder portion 22 and the movable end portion 24.

The pair of joining wall portions 25a and 25b extend from both sides of the plate-shaped movable end portion 24, and at the distal end that extends from the movable end portion 24, the side walls 22b and 22c and bottom wall 22e of the connector holder portion 22 are formed. The movable end portion 24 is supported by the pair of joining wall portions 25a and 25b so as to be substantially parallel to the plate-shaped bottom wall 22e of the connector holder portion 22.

Note that in the optical connector tool 2 in the illustrated example, both side walls, 22b and 22c of the connector holder portion 22 include an inside extended portion 221 that extends inside of the ring-shaped insertion member operating portion 23 from the distal end of the pair of joining wall portions 25a and 25b extending from the movable end portion 24 and an outside extended portion 222 that extends outside of the ring-shaped insertion member operating portion 23 from the distal end of the pair of joining wall portions 25a and 25b extending from the movable end portion 24. The bottom wall 22e of the connecting holder portion 22 is a projecting member that projects to the distal end of the inner extended portion 221 of the side walls 22b and 22c projecting from the joining wall portions 25a and 25b. This bottom wall 22e is positioned inside of the ring-shaped insertion member operating portion 23. This is advantageous in that when the optical connector 3 is accommodated in the accommodation recess 22a, the projection of the optical connector 3 into the ring-shaped insertion member operating portion 23 can be restrained as much as possible. For example, in the narrow operating space inside an apparatus such as an optical terminating box or inside the walls of a building, when carrying out the operation of attaching the optical connector to the distal end of an optical fiber using this tool equipped optical connector (or optical connector tool), there is the advantage that it is possible to carry out the insertion of the tool equipped optical connector or the optical connector tool into the working space and the operation inside the working space with high efficiency.

The insertion member operating portion 23 (specifically, the divided operating portions 23A and 23B) and the connector holder body 22 form an operating structure having a substantially ring shape (specifically, a sleeve-shape).

The divided operating portions 23A and 23B specifically have a substantially C-shape projecting from the connector holder body 22. However, in the invention, "ring-shaped", which denotes the shape of the divided operating portions 23A and 23B, may also denote a general shape that extends out beyond the connector holder body 22, such as a circular shape, an elliptical shape, a rhombus shape, or a C-shape. In addition, the operating structure formed by the divided operating portions 23A and 23B and the connector holder body 22 (specifically, the bottom wall 22e) also has a "ring shape", such as a circle, ellipse, rhombus, or C-shape.

However, another possible structure for the insertion member operating portion (and the operating structure) is one in which both side portions (the joining wall portions in the present embodiment) that connect the space between the connector holder body 22 and the movable end portion 24 are formed so as to project out beyond both sides, and both side portions (joining wall portions) are caused to approach each other by applying the pressing force (lateral pressure) from both opposing sides. Thereby, the distance between the connector holder body 22 and the movable end portion 24 increases, and the insertion members 21 move in the direction in which the dimension of the projection towards the accommodating recess 22a decreases (or the projection is eliminated), that is, the direction in which the insertion members 21 are pulled inside.

The connector holder portion 22 is provided so as to be interposed onto a peripheral portion of the ring-shaped operating structure body, and both peripheral ends of the insertion member operating portion 23 connect to both sides of the accommodating recess 22a in the widthwise direction (left to right in FIG. 3). As shown in the example in the illustration, the expression that the connector holder portion 22 "is interposed into a peripheral portion of the ring-shaped operation structure body" denotes a structure in which the ring-shaped operating structure body is formed by the connector holder portion and the insertion member operating portion.

As shown in FIG. 3, the insertion member operating portion 23 in the present embodiment is bilaterally symmetrical with respect to the insertion members 21. In terms of stably maintaining the linear movement of the insertion members 21, both side portions (the joining wall portions 25a and 25b) of the insertion member operating portion 23 may have a symmetrical shape surrounding the insertion members 21. However, in the invention, the insertion member operating portion 23 is not limited to a shape that is bilaterally symmetrical with respect to the insertion members 21.

Note that as an insertion member operating portion 23 and an operation structure body, a structure may be used in which a pressing force (lateral pressure) is applied from both opposing sides to both side portions (the joining wall portion in the present embodiment) that connect the space between the connector holder portion 22 (more exactly, the bottom wall 22e functions as a stopper portion) and the movable end portion 24, causing both side portions (joining wall portions) to approach each other. Thereby, the distance between the connector holder portion 22 and the movable end portion 24 is increased, the insertion members 21 are drawn by the movable end portion 24 and moved in a direction that decreases the size of the projection (or eliminates the projection) into the accommodating recess 22a (in other words, the size of the projection from the stopper portion), that is, the direction in which the insertion members 21 are drawn inside the insertion member operating portion 23. On this point, a long narrow structure that extends along the insertion members 21 may be used, and it is not necessary to use a structure, as shown in the illustrated example, in which both side portions that connect the space between the connector holder portion 22 (more exactly, the bottom wall 22e that functions as a stopper portion) and the movable end portion 24 projects significantly beyond both sides of the insertion members 21.

In addition, as a stopper portion and a stopper wall, any one may be used that restricts the optical connector 3 (more exactly, the clamping portion 32) from following the movement of the insertion members 21 when the insertion members 21 are moved because of both side portions (joining wall portions) approaching each other due to the application of the lateral pressure to the insertion member operating portion from both opposing sides and realizes the release of the insertion members 21 from between the elements of the clamping portion 32. The bottom walls 22e in the illustrated example are not limiting, and for example, pin-shaped projections may be used.

In addition, in the invention, the operating portion structure body itself is treated as an insertion member operating portion. In this case, it can also be said that the stopper portion and the connector holder portion form a portion of the insertion member operating portion.

The divided operating portions 23A and 23B will be concretely explained.

The divided operating portions 23A and 23B are formed by linking in a row the four connecting plate portions 26a to 26d and the movable end portion 24. Among the four connecting plate portions 26a to 26d, the connecting plates denoted by reference symbols 26a and 26b form the one joining wall portion 25a, and the connecting plates denoted by the reference numerals 26c and 26d form the other joining wall portion 25b. Among the connecting plate portions 25a to 25d and the movable end portion 24 connected on a row, the joining wall portions 25a to 25d positioned on both ends are connected to both sides opposite to the connector holder portion 22 (more exactly, the bottom wall 22e). Thereby, a sleeve-shaped operating structure body is formed by the insertion member operating portion 23 and the bottom wall 22e of the connector holder portion 22.

Thin portions 27, which are easily deformable due to being thin in comparison to the joining wall portions 25a to 25d and the movable end portion 24, join the space between the connecting plates 26a and 26d and the connector holder portion 22 (more exactly, the bottom wall 22e), the space between the connecting plates 26a and 26b, the space between the connecting plate 26c and connecting plate 26d, and the space between the connecting plates 26b and 26c and the movable end portion 24. Thereby, the thin portions 27 function like hinges by deforming, and thereby the relative angles between the connecting plates 26a and 26d and the connector holder portion 22 (more exactly, the bottom wall 22e), between the connecting plate 26a and the connecting plate 26b, between the connecting plate 26c and the connecting plate 26d, and between the connecting plates 26b and 26c and the movable end portion 24 can vary.

As described above, in the tool equipped optical connector 1, a plurality of insertion members 21A and 21B of the optical connector tool 2 are wedged between the extended portion 31c and the lid side elements 321 and 322 at a plurality of locations that differ from each other in the axial direction of the clamping portion 32 (the aligning axis of the aligning groove 323), and the space between the extended portion 31c and the lid side elements 321 and 322 is only slightly pushed open due to the elasticity of the spring 322. In the clamping portion 32, in order to wedge the insertion members 21 between the elements 31c and 321, the insertion members insertion recesses 325d, having a shape that is hollowed out from the side portion of the clamping portion 32, are formed a plurality of locations that differ from each other in the axial direction (the alignment axis of the alignment groove 323) of the clamping portion 32 (here, two locations), and concretely, are formed at a position corresponding to the lid side element 321 and a position corresponding to the lid side element 322. The insertion members 21, which are inserted into the insertion openings 34a and 34b of the stop ring 34 of the optical connector 3, are inserted into each of the insertion members insertion recess 325d.

In this manner, while the insertion members 21 are wedged between the elements 31c and 321, the optical fiber 4 (refer to FIG. 10 and FIG. 11) can be inserted into or released from the pair of elements 31c and 321 of the clamping portion 32 from the back end side of the optical connector 3. As shown in the example in FIG. 11, as an optical fiber 4, a single core optical fiber may be used. When the projecting portion 38a, which is the portion of the optical fiber 38 (below, also referred to as the ferrule side optical fiber) that is inserted and fastened in the ferrule 31 and projects from the back end of the ferrule 31, is inserted between the pair of elements 31c and 321 of the clamping portion 32 and the optical fiber 4 is inserted between the pair of elements 31c and 321 from the back end side of the clamping portion 32, it is possible to abutment connect the optical fiber 4 with the optical fiber 38 (more exactly, the projecting portion 38a).

Note that as an optical fiber 38 (the ferrule-side optical fiber), a silica type optical fiber, for example, may be used.

In addition, as an optical fiber (the other optical fiber) inserted between the elements of the clamping portion 32 from the back end side of the optical connector 3, the optical fiber core is not limited. For example, an optical fiber thread or an optical fiber cord or the like may be used. As this optical fiber (the separate optical fiber; more exactly, the bare optical fiber 4a), for example, a silica type optical fiber may be used.

To connect the optical fibers 4 and 38 together in the clamping portion 32 and install the optical connector 3 on the distal end of the optical fiber 4, first the distal end of the optical fiber 4, which is the exposed bare optical fiber 4a, is inserted into the opening portion 34c of the back end portion of the stop ring 34 and then inserted into the grooves 325a and 325b formed in one or both of the abutting surfaces of the clamping portion 32 (here, both the abutting surface 324a of the element 31c and the abutting surface 324b of the element 321b; refer to FIG. 10 and FIG. 12) of the pair of elements 31c and 321, from the back end side thereof. These grooves 325a and 325b are formed between the pair of elements 31c and 321 at exactly facing positions. The grooves 325a and 325b have a shape that enables the covered portion of the optical fiber 4 to be firmly clamped and fastened due to the elasticity (clamping force) of the spring 322 when the covered portion of the optical fiber 4 is accommodated and the insertion members 21 are released from the clamping portion 32 (forming the covered accommodation groove).

The grooves 325a and 325b are formed so as to extend from the opening portion 325c, which opens in the back end portion of the clamping portion 32 towards the ferrule 31, and the end portion on the ferrule 31 side communicates with the alignment groove 323 formed in one or both of the abutment surfaces (here, only the abutment surface 324a of the element 31c) of the pair of elements 31c and 321 of the clamping portion 32. In these alignment grooves 323, the ferrule-side optical fiber 38 (here, the bare optical fiber) is accommodated, and aligned with precision. When the optical fiber 4 that has been pushed into the grooves 325a and 325b is further pushed into the ferrule-side 31, the bare optical fiber 4a of the distal end of the optical fiber 4 can be inserted into the alignment groove 323 from the grooves 325a and 325b. In addition, in the alignment groove 323, it is possible to abutment connect the ferrule-side optical fiber 38 (more exactly, the distal end of the projection 38a) while being precisely positioned and aligned by the alignment precision of the alignment grooves 323. The alignment grooves are V-shaped grooves, but for example, any type of structure such as a U-shaped groove, a round groove (a groove having a semi-circular shape in cross-section), or the like may be used.

When the abutment alignment between the optical fibers 4 and 38 has been completed, the insertion members 21 are extracted from between the elements 31c and 321 of the clamping portion 22 of the optical connector 3 by operating the insertion member operating portion 23, and the optical connector tool 2 is released from the optical connector 3. This release operation may eject the optical connector 3 from the accommodating recess 22a between both side walls 22b and 22c of the optical connector tool 2.

Specifically, when the insertion member operating portion 23 applies a pressing force (lateral force) from both opposing sides to the portion positioned between the movable end portion 24 and the connector holder portion 22, and the joining wall portions 25a and 25b approach on both sides approach each other due to deforming of the whole, the distance between the movable end portion 24 and the connector holder portion 22 increases (refer to the imaginary line in FIG. 3). Thereby, the insertion members 21 are pulled by the movable end portion 24 and moved in a direction that decreases the amount of projection from the bottom wall 22e into the accommodating recess 22a (or the projection from the bottom wall 22e is eliminated), that is, the direction in which the insertion members 21 are drawn into the insertion member operating portion 23, and thereby the insertion members 21 between the elements are extracted from between the elements. At this time, the bottom wall 22e functions as a stopper portion that restricts the optical connector 3 from moving along with the insertion members 12, and thereby a smooth extraction of the insertion members 21 from between the elements is realized.

Figure 13:
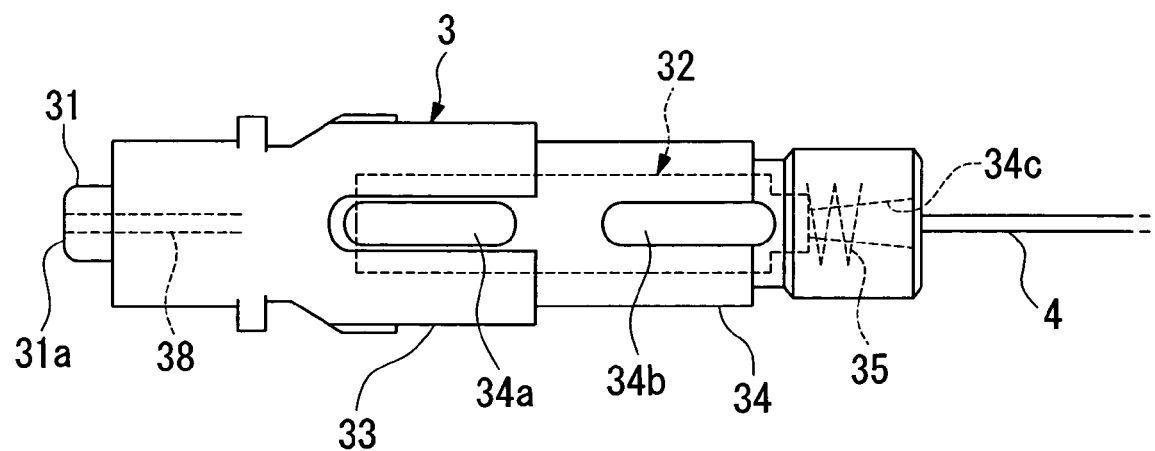
FIG. 13 is a plan view showing the optical connector in FIG. 9.

In addition, in the optical connector 3, the thickness of the portion projecting to the back end side of the plug frame 33 of the stop ring 34, which is inserted into the back end portion (FIG. 10; FIG. 13 right side) of the plug frame 33 and attached to the plug frame 33, becomes narrower than the plug frame 33. In the optical connector 3 that is accommodated in the accommodating recess 22a, the portion projecting to the back end side of the plug frame 33 of the stop ring 34 is mounted on the seat 22d erected on the bottom wall 22e of the connector holder portion 22 at the back end side (FIG. 4, right side; FIG. 5A, right side) of the optical connector tool 2. Thereby, during the extracting operation of the insertion members 21 from between the elements 31c and 321 of the clamping portion 32 of the optical connector 3, the position (direction) of the optical connector 3 is supported, where the center axis (center axis of the alignment groove 323) of the clamping portion 32 is aligned in the direction of the extension of the insertion member operating portion 23. The center axis corresponds to the minute hole 31d (in which the optical fiber is inserted and fastened) that passes through the ferrule 31. As a result, it is possible to prevent reliably the inconvenience in which the axis of the optical connector 3 tilts towards the optical connector tool 2 accompanying the extraction of the insertion members 21 from the clamping portion 32.

The joining wall portions 25a and 25b on both sides of each insertion member operating portion 23 are symmetrical with respect to the space (the inside space S) inside the insertion member operating portion 23. Thereby, when lateral pressure is applied from both opposing sides of the insertion member operating portion 23, due to the function of the plurality of thin portions 27 (functioning as a hinge portion due to deformation), the four joining plate portions 26a through 26d and the movable end portion 24 shift, and the joining wall portions 25a and 25b on both sides deform in the same manner (deforming from the L-shaped curved state in FIG. 3 gradually to the straight line shape shown by the solid line in FIG. 3). Thereby, the insertion members 21 move linearly with respect to the clamping portion 32 of the optical connector 3, which is supported by the connector holder portion 22, to be extracted from between the elements 31 and 321. As a result, there is no concern that the elements 31c and 321 of the clamping portion 32 will be damaged due to the tilting of the insertion members 21 during extraction.

Note that when the lateral pressure is applied to both sides of the insertion member operating portion, the thin portions 27 of the insertion member operating portion 23 deform, but the joining plate portions 26a through 26d and the movable end portion 24 do not deform. In addition, the connector holder portion 22 does not deform.

The movement of the insertion members 21 with respect to the clamping portion 32 is a linear movement along the extension of the interface between the pair of elements 31c and 321, and thus during the extraction of the insertion members 21, the inconvenience in which the insertion members 21 apply a deforming force or the like to the pair of elements 31c and 321 occurs with difficulty. Furthermore, because the inconvenience in which the resistance of the insertion members 21 to extraction from the pair of elements 31c and 321 increases unnecessarily occurs with difficulty, it is difficult to damage the elements 31c and 321, and furthermore, the extraction can be carried out smoothly with a weak force.

In addition, as shown in FIG. 6, the stability of the direction of the optical connector 3 can be secured because the optical connector 3 is pressed against the bottom wall 22e by the retainer 50 installed so as to be releasable on the pair of the outside extended portions 222 that project from the connection holder portion 22 outside of the insertion member operating portion 23. In this case, it is possible to prevent more reliably the inconvenience in which the elements 31c and 321 are damaged due to a change in the direction of the optical connector 3 during extraction of the insertion members 21 from the clamping portion 32 of the optical connector 3.

Figure 7:
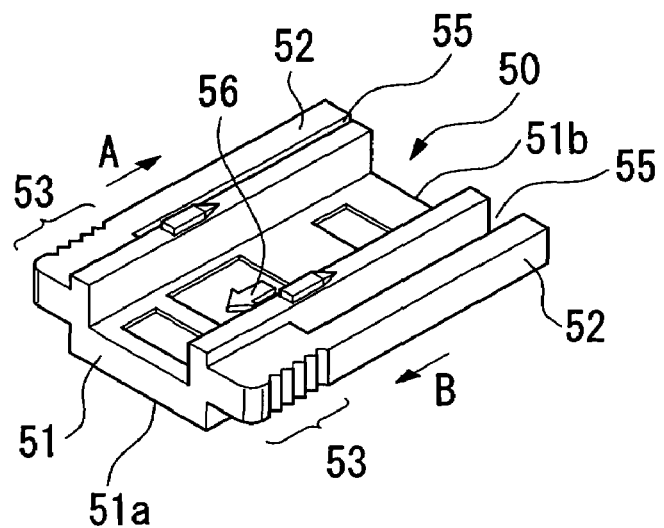
FIG. 7 is a perspective view showing the retainer in FIG. 6.
Figure 8:
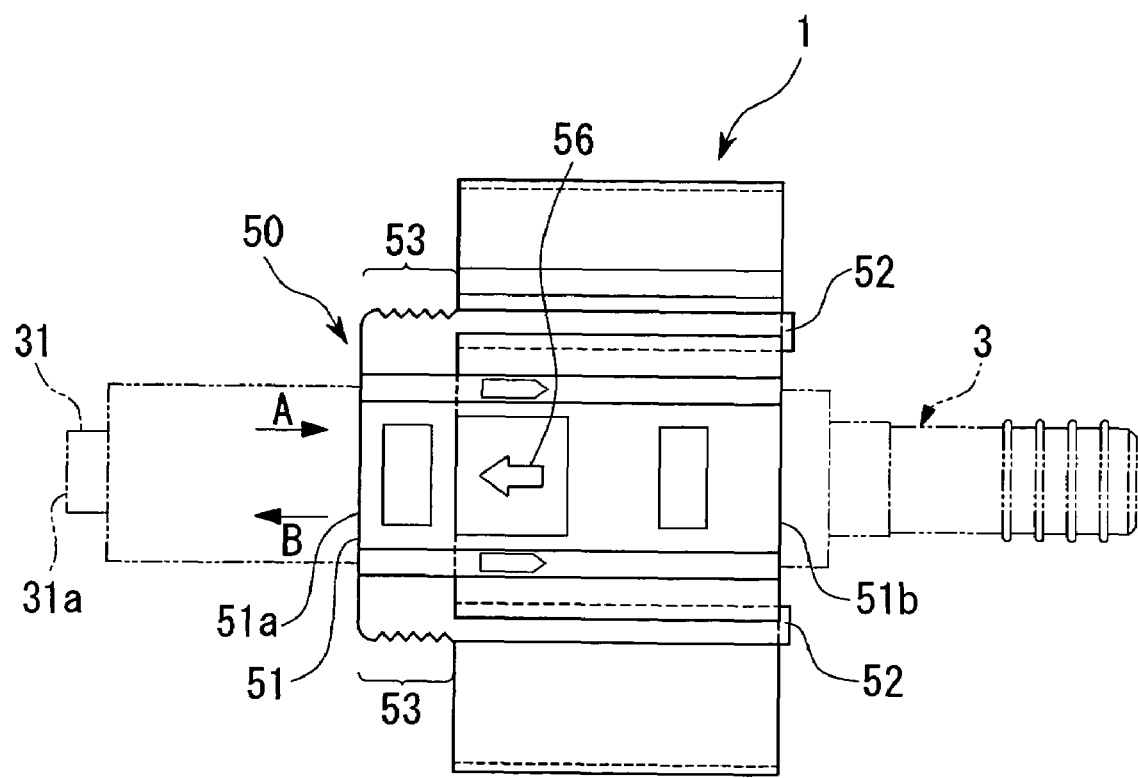
FIG. 8 is a plan view showing the tool equipped optical connector in FIG. 6.

The retainer 50 shown in FIG. 7 and FIG. 8 is an integrally molded member made of resin. This retainer 50 includes a substantially rectangular plate-shaped retainer body 51 and a pair of arms 52 that project on both sides of the retainer body 51. Each of the arms 52 is an elastic member that projects so as to extend along the side portion of the retainer body 51 from both sides of one end portion 51a (the left front side in FIG. 7; left side in FIG. 8) of the retainer body 51 towards the direction of the other end portion 51b on the side opposite to one end portion 51a. In addition, grasping portions 53 formed by a plurality of adjacent small projections are provided on the proximal end portion of each of the arms 52 that projects from the retainer body 51.

On the bottom surface of the retainer body 51, a plurality of projections 54 (three in the illustrated embodiment) is formed.

To install the retainer 50 on the optical connector tool 2, the retainer 50 is inserted between the outside extended portions 222 of the pair of side walls 22b and 22c of the optical connector tool 2 by pressing the retainer 50 from the front end side (left side in FIG. 8) of the optical connector tool 2 (pressing in the direction of the arrow A in FIG. 7 and FIG. 8). In addition, the arms 52 on both sides of the retainer body 51 are inserted into the engaging groove 223 formed in the outer surface side (the surface on the side opposite to the inner surface that faces the accommodating recess 22a between the pair of side walls 22b and 22c) of each of the outer extended portions 222, and on both sides of the retainer body 51, each of the outside extended portions 222 is accommodated within a clearance 55 secured between the arms 52 and the retainer body 51. The dimension of the pair of arms 52 on the retainer 50 and the pair of outside extended portions 222 is adjusted so that the arms 52 are not easily released due to vibration or the like from the engaging grooves 223 of the outside extended portion 222 by interposing the outside extended portions 222 between the arms 52 and the retainer body 51 using the elastic deformation of the arms 52.

The retainer 50 installed on the optical connector 2 is not easily released from the optical connector tool 2 as long as it is not forcibly extracted from the optical connector tool 2 by using the grasping portion 53 or the like. When the retainer 50 is extracted from the optical connector tool 2, the retainer 50 is relatively moved in the direction shown by the release direction mark 56 (the arrow) formed in the retainer body 51, that is, the direction of the arrow B in FIG. 7 and FIG. 8 with respect to the optical connector tool 2.

When the retainer 50 is installed in the optical connector tool 2, the plurality of projections 54 projecting from the bottom surface of the retainer body 51 press the optical connector 3 accommodated in the accommodating recess 22a, towards the bottom wall 22e, which is the accommodation state of the optical connector 3 in the accommodating recess 22a is stably maintained, and thus even when the operation of extracting the insertion members 21 from the clamping portion 32 is carried out, the tilting or shifting of the axis of the optical connector 3 with respect to the optical connector tool 2 does not occur.

The outside extended portion 222 functions as a retainer engaging portion for engaging and mounting the retainer 50 from outside of the insertion member operating portion.

Note that although a synthetic resin is used in this embodiment, the material for the retainer 50 is not limited thereby. In addition, the retainer is not necessarily an integrally molded member, and may be assembled from a plurality of parts.

In addition, by attaching the tool equipped optical connector 1 in advance, the retainer 50 also functions to prevent the release of the optical connector 3 from the optical connector tool 2 while the tool equipped optical connector 1 is being conveyed.

A retainer engaging portion for engaging and mounting the retainer 50 from the outside of the insertion member operating portion is not limited to the outside extended portions 222, which are the portions that extend the side walls 22b and 22c on both sides of the connector holder portion 22 to the outside of the insertion member operating portion. In the connector holder portion, instead of the side walls 22b and 22c, projections separately formed so as to project outside of the insertion member operating portion may be used. In addition, the optical connector tool and the tool equipped optical connector of the invention include structures that do not have a connector holder portion, and in the case that there is no connector holder portion, projections or the like formed so as to project from the stopper portion outside the insertion member operating portion may be used.

When the insertion members 21 are released from the clamping portion 32, the insertion members 21 of the optical connector tool 2 are extracted from between the pair of elements 31c and 321, and due to the elasticity of the spring 322, the optical fibers 4 and 38 are clamped and fastened so as to be interposed between the pair of elements 31c and 321. Thus, the state of the connection between the optical fibers 4 and 38 is stably maintained. Thereby, the optical connector 3 is attached to the distal end of the optical fiber 4.

Note that any type of structure may be used as the insertion member operating portion 23. However, as described above, when the joining wall portions 25a and 25b on both sides are made to approach each other by applying a lateral force (lateral pressure) from both opposing sides to the part positioned between the movable end portion 24 and the connector holder portion 22, a structure may be used in which the joining wall portions 25a and 25b on both sides deform uniformly (the deformation of the joining wall portions on both sides progresses identically (the same degree)), and the insertion members 21 are extracted from between the elements 31c and 321 by moving linearly with respect to the clamping portion 32 of the optical connector 3 supported by the connecting holder portion 22. In addition, because the amount of movement of the movable end portion 24 with respect to the connector holder portion 22 in comparison to the amount of fluctuation in the separation distance due to the joining wall portions 25a and 25b on both sides approaching each other is small (concretely, for example, the amount of fluctuation in the separation distance between the thin portions 27 that connect the space between the joining plates in the joining wall portions 25a and 25b on both sides), as a result, the insertion member operating portion 23 function as an energizing mechanism (torque mechanism) that increases the lateral pressure that causes the insertion members 25a and 25b to approach each other and converts the resulting lateral pressure to an extracting force that extracts the insertion members 21 from between the elements.

As described above, in the optical connector tool 2, the insertion member operating portion 23 is divided into the front side operating portion 23A and the back side operating portion 23B, each of which functions as an independent insertion member operating portion due to the slit 23a. Thereby, in the tool equipped optical connector 1 having the insertion members 21 wedged between the elements 31c and 321 of the clamping portion 32 of the optical connector 3, by selecting one among the front side operating portion 23A and the back side operating portion 23B and deforming the same by applying a lateral pressure from both opposing sides, among the insertion members 21 separately provided in each of the divided operating portions 23A and 23B, it is possible to extract from the clamping portion 32 only the insertion member 21 depending on the insertion member operating portion to which the lateral pressure has been applied.

Furthermore, in the tool equipped optical connector 1 and the optical connector tool 2 in the illustrated example, the front side operating portion 23A can be deformed by a comparatively light force in comparison to the front side operating portion 23B because, as described above, the position of the formation of the slit 23a is biased towards the front end side of the optical connector tool 2 and the dimension of the front side operating portion 23A in the direction of the extension of the insertion member operating portion 23 is small in comparison to the back side operating portion 23B.

As shown in FIG. 1, the tool equipped optical connector 1 and the optical connector tool 2 in the illustrated example can realize the extraction of the insertion members 21 from the clamping portion 32 by the user pressing and deforming the insertion member operating portion 23 from both sides by inserting two fingers of one hand (for example, the thumb and the index finger). In the case that the pressing force from two fingers is applied to both the front side operating portion 23A and the back side operating portion 23B, the front side operating portion 23A, which deforms more easily than the back side operating portion 23B, starts to deform before the back side operating portion 23B, and thereby it is possible to realize the extraction of the insertion member 21 (denoted by the reference numeral 21A in the figures in order to distinguish it) provided in the front side operating portion 23A before the extraction of the insertion member 21 (denoted by the reference numeral 21B in order to distinguish it) provided on the back side operating portion 23B from the clamping portion 32. Thereby, in the clamping portion 32, after closing the elements 31c and 321, in which the connecting point 5 (refer to FIG. 10) between the optical fibers 4 and 38 is clamped, the elements 31c and 321b, which have a position that is farther from the connecting point 5 than the element 321a, are closed. Thus, the insertion member operating portion 23 and the operating portion structure body function as a staggered extraction mechanism.

As described above, because the elements 31c and 321 of the clamping portion 32 are closed from the side near the connecting point 5 between the optical fibers 4 and 38 by the extraction of the insertion members 21, the flexure that occurs on one or both of the pair of optical fibers 4 and 38 due to the abutting force during the abutment connection is released outside the clamping portion 32, along with the clamping of the optical fibers 4 and 38 in the clamping portion 32, due to the extraction of the insertion members 21. Thereby, it is possible to prevent bending of the fibers from remaining in the clamping portion 32. Thus, it is possible to prevent the inconvenience in which the bending and flexure of the optical fiber remaining in the clamping portion 32 influence, for example, the light transmission properties of the optical fibers 4 and 38 and the optical properties of the connection loss and the like between the optical fibers 4 and 38. In addition, it is possible to realize stable maintenance of the optical properties of the optical fibers clamped into the clamping portion, realize stability in the properties such as connection loss, and improve the long term reliability of the optical connector 3.

Note that after the deforming operation of the front side operating portion 23A has been carried out and the insertion member 21, which projects from the movable end portion 24 of the front side operating portion 23A, have been extracted from the clamping portion 32, the deforming operation of the back side operating portion 23B is carried out, and thereby it is possible to carry out the extraction of the insertion member 21 that projects on the movable end portion 24 of the back side operating portion 23B from the clamping portion 32.

According to the invention, the tool equipped optical connector 1 can attach the optical connector 3 to the distal end of the optical fiber 4 without using a conventional dedicated tool. In addition, the optical connector tool 2 has an extremely simple structure, and furthermore, can be fabricated inexpensively. Thus, in comparison to using a dedicated tool, it is possible to realize significant cost reductions.

Furthermore, after the optical connector tool 2 is installed on the optical connector 3 and the optical fiber 4 is inserted into the clamping portion 32, simply by releasing the optical connector tool 2 from the optical connector 3, it is possible to realize the attachment of the optical connector 3 onto the distal end of the optical fiber 4. Thus, an operation in which the optical connector is positioned and supported with high precision so as to fit into the holder portion, which is necessary when using a conventional dedicated tool, becomes unnecessary, and the operation of the attachment to the distal end of the optical fiber is extremely simple.

Because the thin portion 27 used as the hinge portion is elastically deformed by the lateral pressure applied to the insertion member operating portion 23, when the lateral pressure is released and the optical connector is extracted from the connector holder portion, due to the elasticity of the thin portion 27, the insertion member operating portion 23 is restored to the shape before the lateral pressure was applied, that is, the shape shown by the solid line in FIG. 3. Thereby, the insertion member operating portion 23 is easily used again in both installing the optical connector in the connector holder portion and attaching the tool equipped optical connector.

Note that the concrete structure of the optical connector tool and the tool equipped optical connector according to the invention is not limited by the first embodiment described above, and can be variously modified.

The hinge part is not limited to the thin walled portion 27 described above, but for example, a structure that uses a pin or the like may also be used. As an insertion member operating portion, in addition to the structure in which a part of the tool equipped optical connector illustrated in the first embodiment is integrally formed by resin along with the connector holder portion, a structure can be used in which, for example, a plurality of members that include a plurality of plate-shaped members and a pin, which pivotally fits these plate-shaped members together, are assembled in a ring shape.

The number of the insertion members erected on the movable end portion 24 of one insertion member operating portion is not limited to one, but two or more can be used.

In addition, in this case, a structure may be used in which the plurality of insertion members are formed on the distal end of the plate-shaped insertion member body that projects from the movable end portion 24, where the insertion member body projects from the movable end portion 24.

In addition, in the connector holder illustrated in the first embodiment described above, the position of the distal ends of the insertion members 21A and 21B of two divided operating portions 23A and 23B are aligned together (the projection dimensions from the movable end portion) and the insertion depth with respect to the clamping portion of the optical connector supported by the connector holder portion is also the same. However, in the invention this is not limiting, and a structure can be used in which the dimensions of the projection of the plurality of insertion members from the movable end portion differ.

In addition, the plurality of insertion members of the optical connector tool is structured so that the thickness of the portions (distal ends) inserted into the clamping portion of the optical connector are uniformly aligned, but this is not limiting. A structure can be used in which the thickness differs corresponding to the amount of opening of the elements when inserted into the elements. The amount of opening when an insertion member is inserted between the elements corresponds to the thickness of the optical fiber inserted between the elements, and is determined so as to make the insertion of the optical fiber possible. For example, the thickness of the optical fiber may be different at the bare optical fiber 4a exposed by removing the cover of the distal end of the optical fiber 4 illustrated in the first embodiment described above and a portion where the bare optical fiber 4a is not exposed (the covered portion), and thus for the plurality of insertion members, the thickness of the part (distal end) that is inserted into the clamping portion of the optical connector differs corresponding to the thickness of the optical fiber, and thereby it is possible to determine a degree of opening of the elements that corresponds to differences in the thickness of the portions of an optical fiber.

The concrete shape of the distal end of an insertion member is a shape that has a curved surface (in order to make the element difficult to damage), as illustrated in FIG. 3 and the like. However, the distal end can have various types of shape, such as a pointed shape (the insertion members 211 and 212) as illustrated in FIG. 14A and FIG. 14B, a shape in which symmetrically sloped surfaces from the distal end on both sides is formed, or a shape in which a sloped surface from the distal end is formed on one side only can be used.

In addition, an optical connector 3 (optical connector plug) applied to the invention is not limited to a connector for a single core type optical fiber core wire, but a connector for a multiple-core type optical fiber may also be used. In the case of using a connector for a multiple-core type optical fiber, a structure in which there is a plurality of aligning grooves formed on the elements of the clamping portion may be employed.

In the invention, the "optical connector" denotes optical parts generally used in the abutment connection between optical fibers (this is not necessarily limited to a connection in which the end surfaces of the optical fibers are brought into contact, and includes the optical fibers being optically connected together in opposition to each other via a small gap), but is not necessarily limited to using a ferrule. In addition, the optical connector according to the invention has a clamping portion that clamps the optical fibers that have been abutment connected and maintains the connected state, and optical connectors that have such a clamping portion can be referred to as "optical connectors" in the invention.

For example, also included is a mechanical splice having a structure in which, between the half split elements housed inside the sleeve-shaped spring having a C shape or U shape (a U-shape in cross-section in the illustrated example), optical fibers such as optical fiber cables or the like are inserted from both opposing sides and abutment connected between the elements, and the connected state between the optical fibers is maintained by clamping the pair of abutment connected optical fibers between the elements by the elasticity of the spring.

The "clamping portion" also denotes a structure in which the connected state between optical fibers is maintained by clamping a pair of abutment connected optical fibers between half split elements accommodated inside a sleeve-shaped spring, which have a C-shape or a U-shape in cross-section, by the elasticity of the spring. The half split elements are not limited to the structure in which the pieces of the half split elements are divided into a plurality, like the optical connector shown in the examples in FIG. 9 and FIG. 10. A half split structure simply including two parts may be used. However, a clamping portion having elements that have a half split structure including two parts is structured such that an element that can elastically deform (minute flexure) itself (for example, one made of resin) is used as the element, and when the insertion members, which are wedged in at a plurality of positions that differ from each other in the axial direction of the clamping portion, are extracted in order (for example, extracted starting from the insertion members close to the connecting point of the optical fibers and proceeding in sequence to those distant from the connecting point), the elements are closed in sequence starting from the locations from which the insertion members have been extracted.

In the first embodiment described above, an optical connector tool 2 was illustrated having a structure that has an insertion member operating portion 23 consisting of two divided operating portions 23A and 23B. However, in the optical connector tool according to the invention, a structure may be used that has three or more divided operating portions that can operate independently. In this case as well, an insertion member operating portion forms a staggered extraction mechanism that extracts the plurality of insertion members wedged at a plurality of positions that differ from each other in the axial direction of the clamping portion in sequence starting from the insertion members close to the connecting point between the optical fibers.

The staggered extraction mechanism according to the invention is not limited to the insertion member operating portion that includes a plurality of divided operating portions having differing dimensions along the axial direction of the clamping portion of the optical connector. A structure may be used in which, by deforming such that the distance between the stopper portion and the movable end portion increases due to the application of lateral pressure from both sides, the plurality of insertion members wedged between the elements of the clamping portion can be extracted in sequence starting from those close to the connecting point between the optical fibers.

For example, it is possible to use a structure in which a projection or thick portion is provided on both sides of the portion (the portion where the lateral pressure is applied on both sides) of the ring-shaped insertion member operating portion that is closest to the connecting point between the optical fibers in the clamping portion and, in comparison to the other portions, this portion deforms due to the application of the lateral pressure first, or a structure in which the portion closest to the connecting point between the optical fiber in the clamping portion of the ring-shaped insertion member operating portion deforms comparatively easy in comparison to the other portions (for example, a structure in which, in the resin insertion member operating portion illustrated in the first embodiment described above, the hinge portion is made thin at the part closest to the connecting point).

Below, a second exemplary embodiment of the invention will be explained with reference to the drawings.

The retainer 50, the optical connector 3, and the clamping portion mounted ferrule 37 are identical to those of the first embodiment. Refer as appropriate to FIG. 7, FIG. 9, FIG. 10, FIG. 11, FIG. 12, and FIG. 13 that are used to explain the first embodiment.

Figure 15:
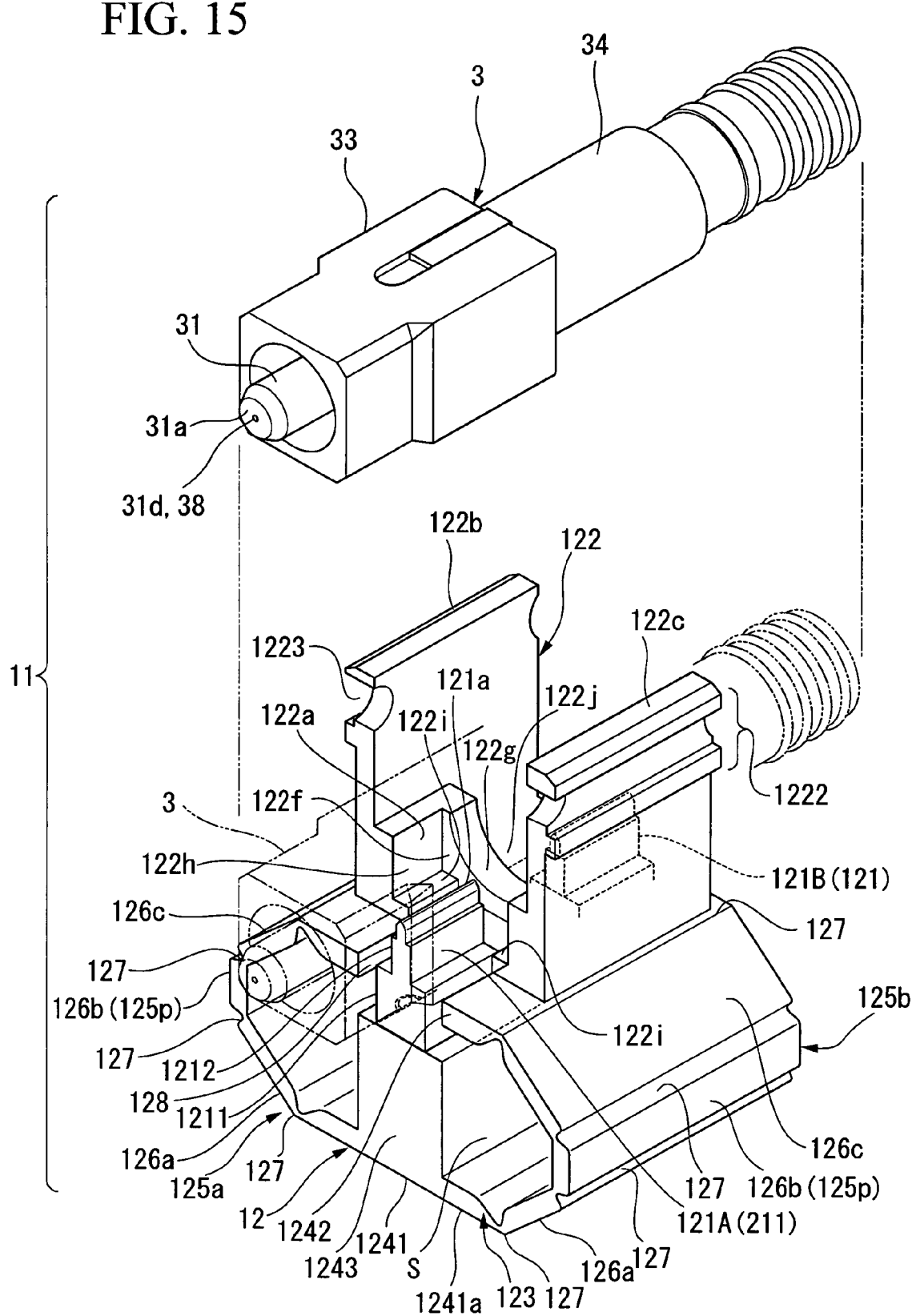
FIG. 15 is an exploded perspective view showing the tool equipped optical connector according to an exemplary embodiment of the invention.
Figure 16:
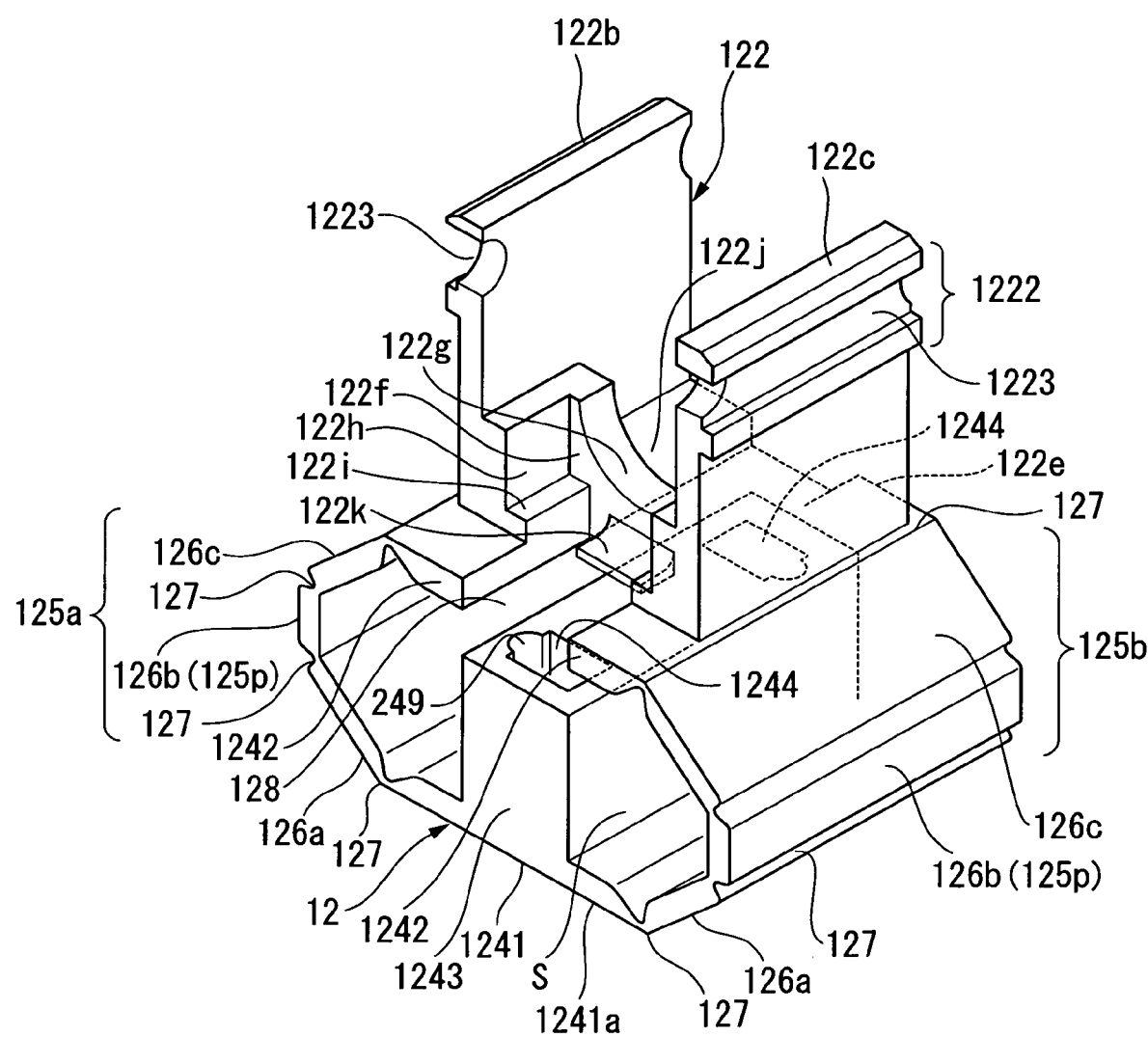
FIG. 16 is a perspective view showing the tool for an optical connector of the tool equipped optical connector in FIG. 15.
Figure 17:
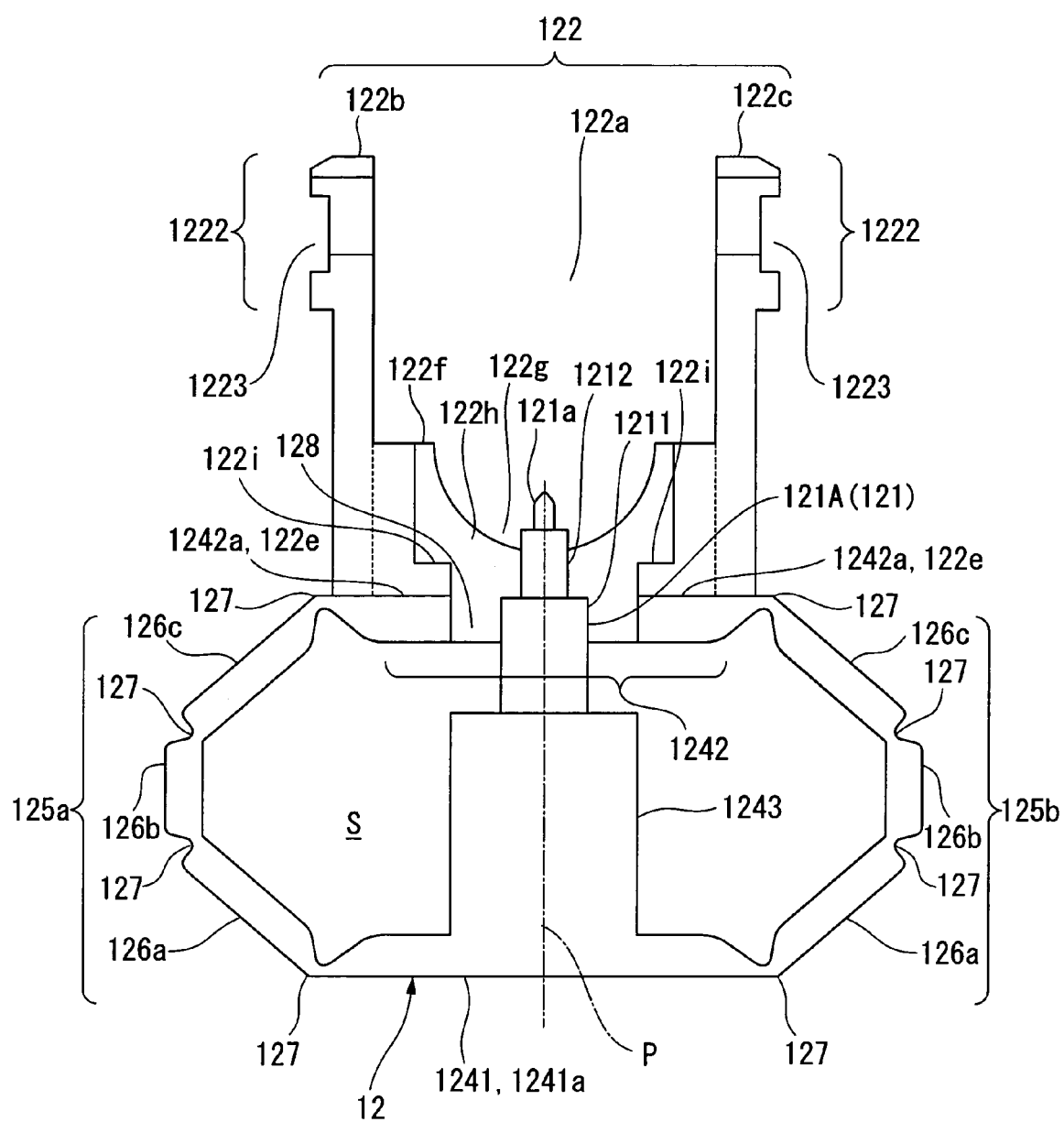
FIG. 17 is a front view showing the tool for an optical connector in FIG. 16.
Figure 18:
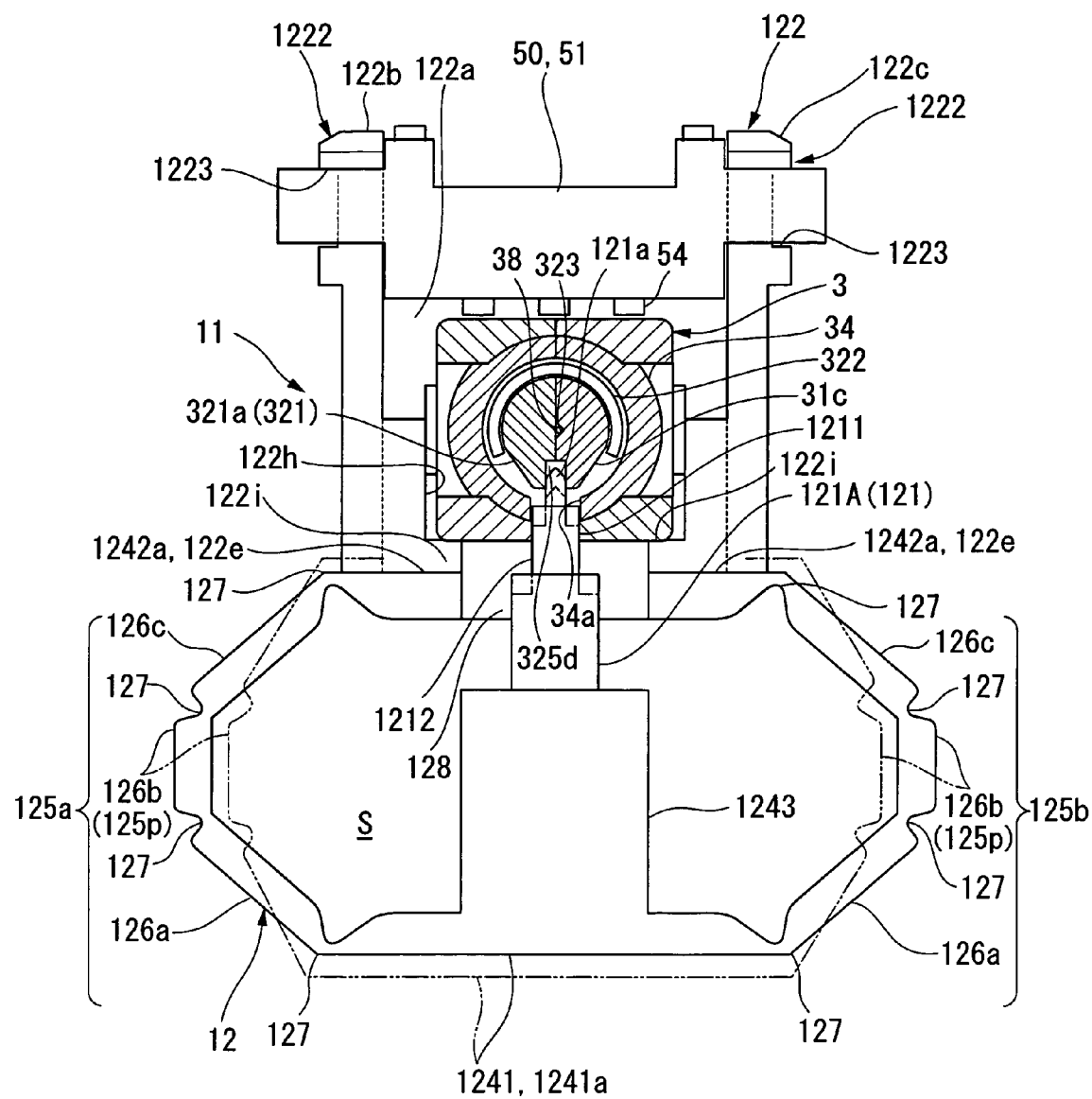
FIG. 18 is a partially exploded front view showing the tool equipped optical connector and the tool for an optical connector.
Figure 19:
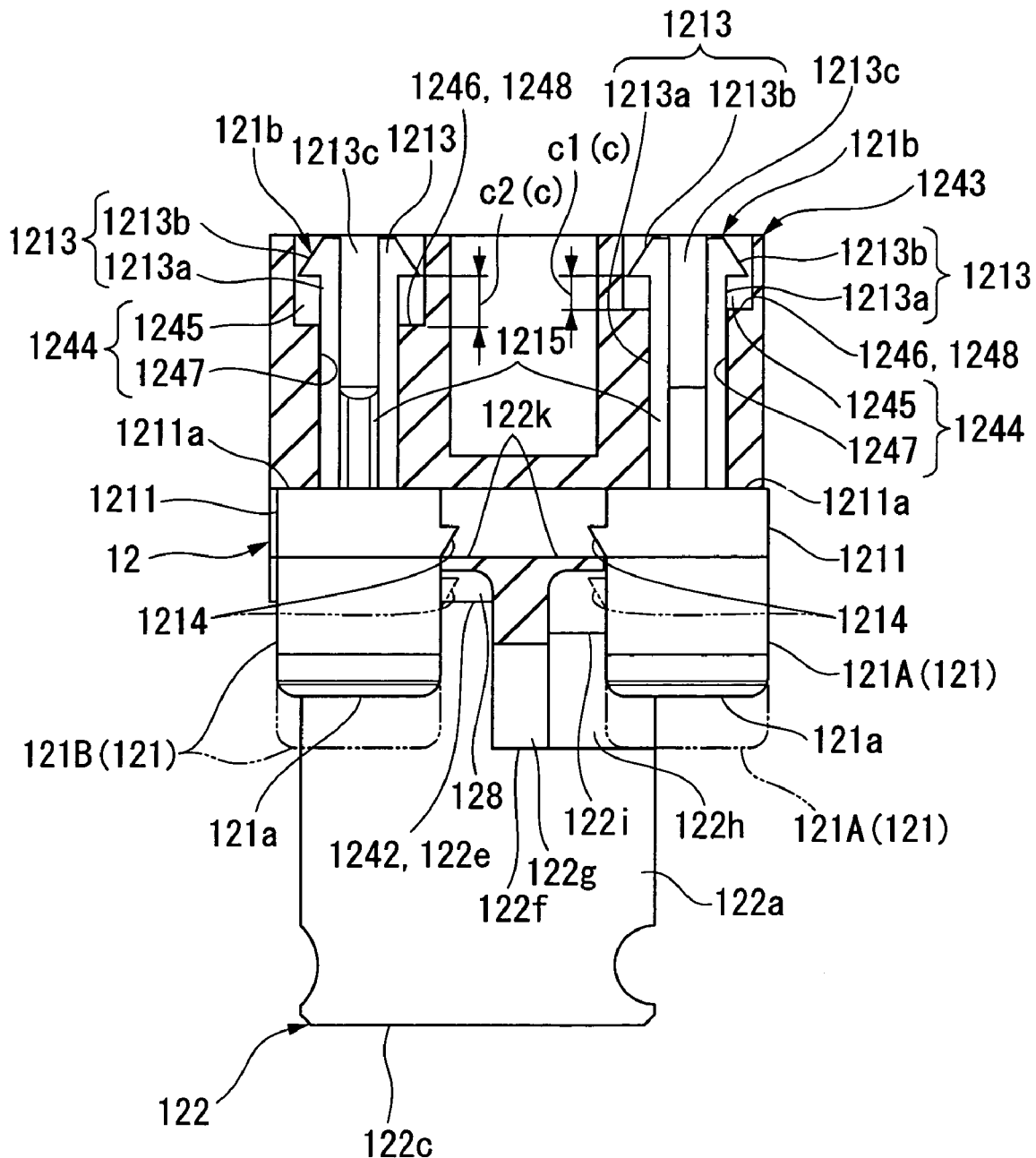
FIG. 19 is a side cross-sectional view showing the relation between the two insertion members of the tool for an optical connector in FIG. 15 and the proximal end portion accommodating portion of the insertion member operating portion.
Figure 20:
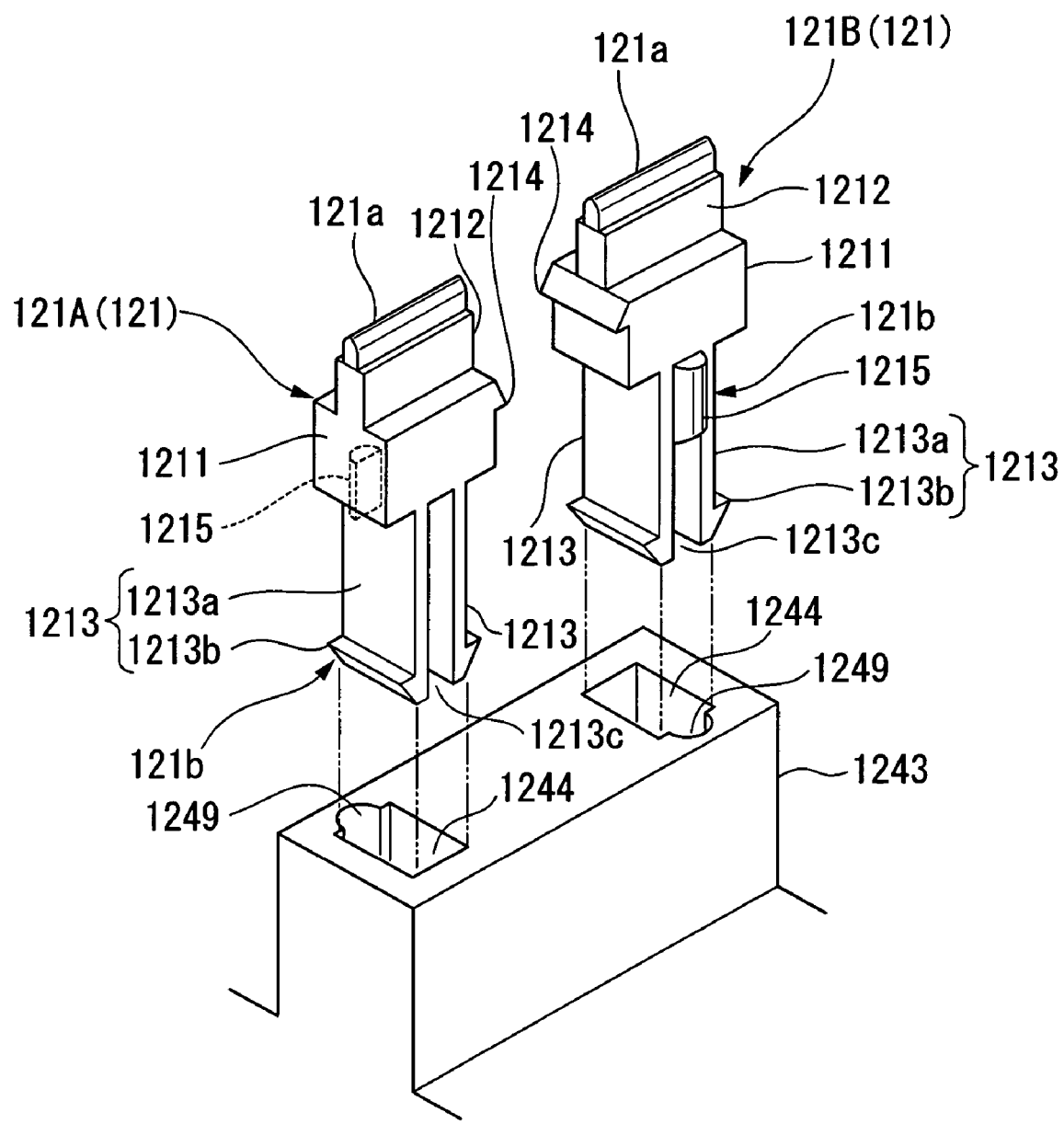
FIG. 20 is a perspective view showing the insertion members of the tool for an optical connector in FIG. 15.

FIG. 15 is a perspective view showing a tool equipped optical connector 11 and optical connector tool 12 according to a second embodiment of the invention; FIG. 16 is a perspective view showing the connector optical connector tool 12; FIG. 17 is a front view showing the optical connector tool 12; and FIG. 18 is a front view showing the tool equipped optical connector 11 in partial cross-section; FIG. 19 is a side cross-sectional view showing the relationship between the two insertion members 121 (121A and 121B) of the optical connector tool 12 and the proximal end portion accommodating portion of the insertion member operating portion 123; FIG. 20 is a perspective view showing the structure of the insertion members 121 of the optical connector tool 12; and FIG. 21A to FIG. 24C are drawings for explaining the extraction of the insertion members 121 from the clamping portion 32 of the optical connector 3 that accompanies the deforming operation of the insertion member operating portion 123 of the tool equipped optical connector 11.

As shown in FIG. 15 to FIG. 18, the tool equipped optical connector 11 is formed by mounting the optical connector tool 12 on the inside of the optical connector 3, which is an optical connector plug.

The optical connector plug 3 in the illustrated example is what is termed SC2 type optical connector. The latch mounted on the outside of the plug frame 33 (refer to FIG. 9 and FIG. 17) of the SC type optical connector is omitted from the SC type optical connector (SC: single fiber coupling optical fiber connector, such as an F04 type optical connector (optical connector plug) defined in the JIS C 5973). Note that the optical connector 3 is not limited to the SC2 type optical connector described above, but various optical connector plugs such as a single core type optical connector plug, a multiple-core type optical connector plug, or the like may be used.

First, the optical connector 3 will be explained.

FIG. 9 and FIG. 10 are drawings showing the structure of the optical connector 3, in particular, FIG. 9 is an exploded perspective view and FIG. 10 is a cross-sectional view. In FIGS. 9 and 10, the optical connector 3 includes a ferrule 31; a clamping portion 32 that is disposed at the back end side opposite to the connection surface end (reference symbol 31*a*; the distal end surface) of the ferrule 31; a sleeve-shaped plug frame 33 that is mounted outside the ferrule 31 so as to accommodate the ferrule 31 while restraining rotation of the ferrule 31 about the axis thereof; a stop ring 34 that is attached by engagement to the back end (right side in FIG. 10) of the plug frame 33 and accommodates the clamping portion 32; and a spring 35 that is housed inside the stop ring 34.

Note that reference symbols 34*a* and 34*b* in FIG. 9 denote the insertion openings in which the insertion members 121 (refer to FIG. 15 FIG. 19) of the optical connector tool 12 are inserted, and reference symbol 36 denotes a boot mounted on the back end of the stop ring 34. However, the boot 36 has the optical fiber 4 passed through in advance when the optical fiber 4 is inserted into the clamping portion 32 from the back end side of the optical connector 3 (the right side in FIG. 10), and is mounted on the stop ring 34 after the insertion of the optical fiber 4 into the clamping portion 32 has completed.

The clamping portion 32 is formed by attaching plural members to an extended portion 31*c* that extends from a flange portion 31*b* of the ferrule 31 towards the back end side of the optical connector 3. Hereinafter, the ferrule 31 to which the clamping portion 32 is attached may be referred to as a "clamping portion equipped ferrule 37".

The clamping portion 32 of the clamping portion equipped ferrule 37 is accommodated in the stop ring 34 while being allowed to move freely in the axial direction of the sleeve-shaped stop ring 34. The spring 35 receives a reaction force from the back end side of the stop ring 34 to press the clamping portion 32 against the distal end side (the left side in FIG. 10) of the optical connector 3, and thereby the entire clamping portion equipped ferrule 37 is urged towards the back end side of the optical connector 3. When, for example, the optical connector 3 is connected to a separate optical connector by being inserted into an optical connector adaptor or the like, the spring 35 functions to impart an abutment force to the ferrule 31 between the optical connector 3 and the optical connector on the connection partnering side.

Note that further movement (the movement relative to the stop ring 34) of the clamping portion equipped ferrule 37 towards the back end side of the optical connector 3 with respect to the stop ring 34 is restrained by the flange portion 31*b* of the ferrule 31 abutting the stopper projection 33*a* that projects in the plug frame 33.

FIG. 11 is a perspective view showing the clamp equipped ferrule 37, and FIG. 12 is a drawing showing abutment surfaces of the two lid side elements 321*a* and 321*b* and the base side element (extended portion 31*c*) that form the clamping portion 32 of the clamping portion equipped ferrule 37.

As shown in FIG. 10 to FIG. 12, the clamping portion 32 is formed by accommodating the extended portion 31*c* that extends from the flange portion 31*b* of the ferrule 31 and the lid side elements 321*a* and 321*b* that are disposed on an abutment surface 324*a* of the extension portion 31*c* inside of the sleeve-shaped spring 322 having a C-shaped cross-section (C-shaped spring). The extended portion 31*c* forms one of the half split elements (hereinafter sometimes referred to as an element 31*a*) that form the clamping portion 32, and the two lid side elements 321*a* and 321*b* form the other (element 321) of the half split elements that form the clamping portion 32. The clamping portion 32 has a structure in which an optical fiber is clamped between the pair of half split elements 31*a* and 321. The two lid side elements 321*a* and 321*b* are arranged along the longitudinal direction of the optical connector 3 (left to right in the FIG. 10) such that one (the element 321*a*) is closer to the ferrule 31 side than the other (the element 321*b*). The spring 322 is divided into two by the slit 322*a* formed in the center portion of the spring 322 in the axial direction. The spring 322 is configured such that elasticity of the spring 322 acts separately on the two lid side elements 321*a* and 321*b* via the slit 322 formed in the spring 322 in proximity to the border between the two lid side elements 321*a* and 321*b*. Accordingly, one set consisting of the lid element 31*a* and the extended portion 31*c* and the other set consisting of lid element 321*b* and the extended portion 31*c* each can function as an independent clamping portion.

Note that any type of shape can be used for the spring 322, such as a spring that is U-shaped in cross-section.

The optical fiber 38 (here, a bare optical fiber; below also referred to as the ferrule-side optical fiber) is inserted and fastened in the ferrule 31. The ferrule-side optical fiber 38 projects from the back end of the ferrule 31. The projecting portion 38*a*, which is the part of the ferrule-side optical fiber 38 that projects from the back end of the ferrule, is inserted between the pair of elements 31*c* and 321 of the clamping portion 32, and is precisely positioned and aligned by being accommodated in the alignment groove 323 that is formed in the abutment face of one or both of the pair of elements 31*c* and 321 of the clamping portion 32 (here, only the abutment face 324*a* of the element 31*c*).

In addition, the grooves 325*a* and 325*b* are formed in the clamping portion 32 to guide the distal end of the optical fiber 4 into the alignment groove 323 (here, as one example, a single core optical fiber), which is inserted between the pair of elements 31*c* and 321 from the back end portion of the clamping portion 32. The grooves 325*a* and 325*b* are formed on one or both of the abutment faces of the pair of elements 31*c* and 321 of the clamping portion 32 at a position offset farther towards the back end portion of the clamping portion 32 than the alignment groove 323. These grooves 325a and 325b have an opening portion 325c that opens in the back end portion of the clamping portion 32, and are formed so as to extend from this opening portion 325c towards the ferrule 31.

The back portion of these grooves 325a and 325b on the ferrule 31 side communicate with the alignment groove 323. In the illustrated example of the optical connector 3, the grooves 325a and 325b are formed on both the abutment surface 324a of the element 31c and the abutment surface 324b of the element 321b (refer to FIG. 10 and FIG. 16). These grooves 325a and 325b are formed at exactly facing positions between the pair of elements 31c and 321 (concretely, the position at which the element 31c and element 321b face each other exactly).

When the pair of elements 31c and 321 of the clamping portion 32 are pressed open due to the resistance to the elasticity of the spring 322 (for example, the state in which the insertion members 121 of the optical connector tool 12 are inserted between the elements 31c and 321) and the distal end of the optical fiber 4, which is the exposed bare optical fiber 4a, is inserted into the opening portion 34c of the back end portion of the stop ring 34, then it is possible to insert the optical fiber 4 from the opening portion 34c into the opening portion 325c (opening portion of the grooves 325a and 325b) that opens in the back end portion of the clamping portion 43. Next, the optical fiber 4 is pressed into the grooves 325a and 325b from the opening portion 325c of the back end portion of the clamping portion 32 because of the pressing towards the ferrule 31 side. By pushing further, the bare optical fiber 4a at the distal end of the optical fiber 4 is pressed into the alignment groove 323 from the grooves 325a and 325b, and thereby abutment connection with the ferrule-side optical fiber 38 is possible. The ferrule-side optical fiber 38 is accommodated within a range from the end portion of the alignment groove 323 on the ferrule 31 side to the center portion in the longitudinal direction, and the bare optical fiber 4a at the distal end of the optical fiber 4 is inserted into the alignment groove 323. Thereby, while precisely positioned and aligned due to the alignment precision of the alignment groove 323, the bare optical fiber 4a can be abutment aligned with the ferrule-side optical fiber 38 (more exactly, the distal end of the projecting portion 38a).

Note that when the bare optical fiber 4a is abutting the ferrule-side optical fiber 38 in the alignment groove 323, due to the setting of the length that the optical fiber 4a is bared, the optical fiber 4 is accommodated substantially along the entire length of the grooves 325a and 325b.

When the widening between the pair of elements 31c and 321 is released while the maintaining of the abutment between the bare optical fiber 4a at the distal end of the optical fiber 4 and the ferrule-side optical fiber 38 (for example, the extraction of the insertion members 121 that are inserted between the elements 31c and 321 from between the elements 31c and 321), the elements 31c and 321 are closed by the elasticity of the spring 322, and the ferrule-side optical fiber 38 and the optical fiber 4 are clamped and fastened between the pair of elements 31c and 321. Thereby, the abutted state between the bare optical fiber 4a at the distal end of the optical fiber 4 and the ferrule-side optical fiber 38 is maintained. In addition, the covered portion of the optical fiber 4 is clamped and fastened in the grooves 325a and 325b, and the extraction of the optical fiber 4 from the clamping portion 32 is restricted.

The grooves 325a and 325b form a covered accommodating groove for accommodating the covered portion of the optical fiber 4 and clamping and fastening the same by the elasticity (clamping force) of the spring 322.

Note that, for example, a silica optical fiber may be used as the optical fiber 38 (the ferrule-side optical fiber).

In addition, an optical fiber core is not limiting as the optical fiber that is inserted between the elements of the clamping portion 32 from the back end portion of the optical connector 3 (a separate optical fiber; as one example, the optical fiber 4 described above, which is a single core optical fiber cable). For example, an optical fiber strand or an optical fiber cord may be used. A silica optical fiber, for example, may be used as this other optical fiber (more exactly, the bare optical fiber 4a).

The alignment groove is a V-shaped groove (refer to FIG. 18), but for example, it is possible to use any structure, such as a U-shaped groove, a round groove (a groove that is semicircular in cross-section), or the like.

Next, the optical connector tool 12 will be explained with reference to FIG. 15 to FIG. 20.

As shown in FIG. 15 to FIG. 20, the optical connector tool 12 includes a ring-shaped insertion member operating portion 123 that has a connector holder portion 122 provided on the peripheral portion thereof a connector holder portion 122, which is attached to the outside of the optical connector 3, and insertion members 121 that are attached to this insertion member operating portion 123. The insertion members 121 further have a distal portion 121a that is inserted between the elements 31c and 321 of the clamping portion 32 of the optical connector 3 at a portion of the insertion member operating portion 123 that projects from the inside to the outside.

In the insertion member operating portion 123, a proximal end portion 121b of an insertion member 121, which is the end portion on the side opposite to the distal end portion 121a of an insertion member 121, is installed on a first movable end portion 1241, which is positioned on the side opposite to that of the connector holder portion 122, via an inner space S inside the insertion member operating portion 123. The distal end portion 121a of the insertion members 121 is provided on a portion that projects outside the insertion member operating portion 123 after passing through the insertion member window 128 formed on the second movable end portion 1242, which is positioned on the side (the side of the connector holder portion 122) opposite to the first movable end portion 1241 via the inner space S in the insertion member operating portion 123.

The insertion members 121 are provided in plurality (here, two) in the insertion member operating portion 123. The disposition position of each of the insertion members 121 (121A and 121B) in the insertion member operating portion 123 are offset in the axial direction of the ring-shaped insertion member operating portion 123.

The insertion member operating portion 123 as a whole is a single integrally formed resin part that includes the connector holder portion 122. However, in the invention, this is not limiting. For example, the insertion member operating portion 123 may be formed by a plurality of pieces, wherein a separate connector holder portion is attached to the insertion member operating portion 123. In addition, the insertion member operating portion 123 itself and the connector holder portion itself are not limited to being formed by one piece. They may be assembled from a plurality of pieces.

In the optical connector tool 121 illustrated in the figures, the connector holder portion 122 is a portion of the insertion member operating portion 123. As shown in FIG. 15 to FIG.

17, this connector holder portion 122 includes a bottom wall 122e that is a portion of the second movable end portion 1242 in the insertion member operating portion 123; a pair of side walls 122b and 122c, which are projecting walls that project from this bottom wall 122e towards the outside of the insertion member operating portion 123; and an accommodating recess 122a that is secured between the pair of side walls 122b and 122c. The connector holder portion 123 is formed in a U-shape in cross-section. The accommodating recess 122a inside the connector holder portion 122 has a groove shape that accommodates the optical connector 3 so that it can be extracted.

In addition, the connector holder portion 122 has a projecting wall-shaped connector receiving stand 122f that projects from the bottom wall 122e into the accommodating recess 122a at a central portion in the direction of the extension of the groove-shaped accommodating recess 122a. A connector engaging groove 122g, which is a concavity into which the stop ring 34 of the optical connector 3 is fit, is formed in this connector receiving stand 122f in a shape that is hollowed out from the distal end of the connector receiving stand 122f that projects from the bottom wall 122e. Note that the direction of the extension of the accommodating recess 122a is aligned along the center axis of the ring-shaped insertion member operating portion 123.

The sleeve-shaped second movable end portion 1242 is divided into two movable end portion divided bodies 1242a by the slit-shaped insertion member window 128 that extends along the center axis of the insertion member operating portion 123. The pair of side walls 122b and 122c of the connector holder portion 122 are projecting walls that project from each of the movable end portion divided bodies 1242a to the outside of the insertion member operating portion 123. In addition, the portion facing the accommodating recess 122a in each of the movable end portion divided bodies 1242a functions as the bottom wall 122e of the connector holder portion 122.

The connector receiving stand 122f functions as a connecting portion that bridges the side walls 122b and 122c on both sides via the accommodating recess 122a.

The accommodating recess 122a is divided in two by the connector receiving stand 122f. Among the areas on both sides of the accommodating recess 122a in the direction of the extension thereof, the area on one side acts as a housing engaging groove 122h into which the plug frame 33 of the optical connector 3 fits. Inside the accommodating recess 122a, the area on the side opposite to the connector receiving stand 122f functions as a connector back end side disposing groove 122j that accommodates the portion of the optical connector 3 that is farther towards the back end side than the plug frame 33.

In the tool equipped optical connector 11, the optical connector tool 12 is attached to the optical connector 3 and forms a portion of the tool equipped optical connector 11 because the optical connector 3 is accommodated in the accommodating recess 122a, and furthermore, the insertion members 121 are wedged between the elements 31c and 321 of the clamping portion 32. The optical connector tool 12 is releasably attached to the optical connector 3 because the connector engaging recess 122g of the connector receiving stand 122f fits into the stop ring 34 and the housing engaging groove 122h fits into the plug frame 33. In addition, because the connector receiving stand 122f abuts the back end surface 33b of the plug frame 33 of the optical connector 3 (refer to FIG. 10; the back end surface of the plug frame 33 present in the vicinity of the stop plug 34), it is possible to realize the positioning of the attachment position of the optical connector tool 12 in the axial direction of the optical connector 3 (the center axial direction of the clamping portion 32; the alignment axis of the alignment groove 323).

Inside the housing engaging groove 122h of the optical connector 12 in the illustrated example, the housing receiving stand 122i that abuts the plug frame 33 of the optical connector 3 projects from both side walls 122b and 122c. The side surface of the plug frame 33 on the side facing the bottom wall 122e presses against this housing receiving stand 122i. The optical connector 3 fits inside the accommodating recess 122a is supported in the desired position with respect to the center axis of the insertion member operating portion 123 due to being abutted by the connector receiving stand 122f and the housing receiving stand 122i. In the optical connector tool 12 in the illustrated example, the directions of the center axis of the clamping portion 32 of the optical connector fit into the accommodating recess 122a and the center axis (the direction of the center axis of the clamping portion 32; the alignment axis of the alignment groove 323) of the insertion member operating portion 123 are aligned.

The housing receiving stand 122i is not absolutely necessary. In addition, depending on the structure of the optical connector 3, the portion in the optical connector 3 that fits into the housing engaging groove 122f is not limited to what is termed a plug frame 33. The portion inside that optical connector 3 that fits into the housing engaging groove 122f may be a housing that differs from what is termed a plug frame. On this point, the optical connector tool 12 may be applied in an optical connector having a structure that does not have what is termed a plug frame or an optical connector that includes a housing that is mounted outside of the plug frame. The connector holder portion 122 may be a structure in which the optical connector 3 is stably supported without play at a desired position with respect to the center axis of the insertion member operating portion 123.

In addition, the positioning of the optical connector tool 12 in the axial direction of the optical connector 3 (the center axis direction of the clamping portion 32; or the alignment axis of the alignment groove 323) is not limited to abutment of the connector receiving stand 122f against the back end surface 33b of the plug frame 33. That is, a positioning abutment portion may be provided on the optical connector tool 12 for realizing the positioning in the axial direction of the optical connector 3 by abutting a projection or recess on the side portion of the optical connector. Various structures besides the connector receiving stand 122f described above may be used as the positioning abutment portion.

As described above, the optical connector tool 12 in the illustrated example includes a plurality of insertion members 121 (here, two, denoted by reference numerals 121A and 121B in order to distinguish them). Each of the insertion members 121 has a distal end portion 121a on the portion that projects into the accommodating recess 122a from the insertion member window 128, which opens in the bottom wall 122e of the connector holder portion 122.

In the tool equipped optical connector 11 according to the invention, the distal end portions 121a of each of the insertion members 121 (121A and 121B) of the optical connector tool 12 (refer to FIG. 15 and FIG. 18) are wedged between a pair of elements 31c and 321 via the insertion openings 34a and 34b (refer to FIG. 9) of the stop ring 123 from outside the optical connector 3. Thereby, in the tool equipped optical connector 11, the space between the pair of elements 31c and 321 is only slightly pushed open by the insertion members 121 due to the resistance of the elasticity of the spring 322. In addition, the two insertion openings 34a and 34b of the stop ring 34 open at positions corresponding to the two clamping portions, which correspond to the two lid side elements 321. The plurality (two) of insertion members 121 (121A and 121B) of the optical connector tool 12 are respectively inserted between the element 31c and 321a and the element 31c and 321b via the two insertion openings 34a and 34b of the stop ring 34.

However, the optical connector tool 12 may be supplied to the workplace separated from the optical connector 3, and as necessary, may be attached to the optical connector 3 and used to attach the optical connector 3 to the distal end of an optical fiber. In addition, the optical connector tool 12 may be attached to an optical connector that is already attached to the distal end of an optical fiber and used in the operation of releasing the optical connector from an optical fiber.

Note the in the optical connector 3 in the illustrated example, in FIG. 9, in the clamping portion equipped ferrule 37, the base side element 31c is incorporated into the optical connector 3 on the top side and the lid side element 321 is incorporated into the optical connector 3 on the bottom side. In FIG. 18, viewed from the ferrule 31 side, the base side element 31c is disposed on the right of the distal end of the insertion members 121 and the lid side element 321 is disposed to the left of the distal end of these insertion members 121, where the insertion members 121 are wedged between the base side element 31c and the lid side element 321. However, the optical connector 3 may have a structure in which the disposition of the pair of elements 31c and 321 shown in FIG. 18 is reversed.

As shown in FIG. 19 and FIG. 20, the insertion members 121 include a block-shaped body portion 1211; a plate-shaped projection 1212 that projects on this body portion 1211; and a pair of elastic catches 1213 that project from the body portion 1211 on the side opposite to the plate-shaped projection 1212.

The distal end (distal end of the insertion members 121) of the plate-shaped projection 1212 that projects from the body portion 1211 serves as the distal end portion 121a (inserted distal end) that is wedged between the pair of elements 31c and 321 of the clamping portion 32 of the optical connector 3. In the insertion members 121 in the illustrated example, the distal end portion 121a (the inserted distal end) has a wedge shape that is formed so as to be thin in comparison to the plate-shaped projection 1212. The distal end portion 121a in the examples shown in FIG. 17 and FIG. 20 have a triangular shape in cross-section, but are not extremely pointed. The vicinity of the peak of the distal end is shaped having a curved surface (the object of which is to make damage to the elements difficult). In addition, the insertion members 121 in the illustrated example are entirely integrally formed, including the distal end 121a, and are made of a synthetic resin. Making the distal end portion 121a from a synthetic resin is also advantageous from the point that damaging the pair of elements 31c and 321 of the clamping portion 32 is made difficult.

Figure 26A:
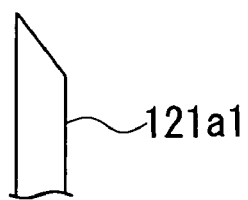
FIGS. 26A and 26B are side views showing another embodiment of the shape of the distal ends of an insertion member.
Figure 26B:
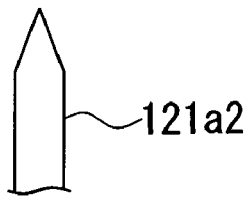

Of course, as illustrated, for example, in FIGS. 26A and 26B, a distal end that has an extremely sharp edge (distal end portions 121a1 and 121a2) may be used.

In addition, the shape of the distal end portion 121a is not limited to the illustrated example. For example, when considering only the extraction from the pair of elements 31c and 321, it is sufficient that the insertion members 121 can maintain the pair of elements 31c and 321 in a only slightly opened state due to the resistance of the elasticity of the spring 322 by being wedged between the pair of elements 31c and 321. On this point, the distal end portion 121a of the insertion members 121 may have other shapes, such as a simple plate shape or a pin shape.

As shown in FIG. 19, the pair of elastic catches 1213 functions as the proximal end portion 121b of the insertion members, which is installed on the first movable end portion 124.

Concretely, the elastic catches 1213 are formed by a long narrow elastic body 1213a that extends from the body portion 1211 and a projection-shaped engagement receiving portion 1213b (a catch portion) that projects from the side portion of the distal end of the elastic body 1213a. The distal end projects from the body portion 1211. On the elastic body 1213a, the engagement receiving portions 1213b of each of the elastic catches 1213 project on the side portion of the side opposite to the gap 1213c, which is secured between the pair of elastic catches 1213 that extends from the body portion 1211.

As shown in FIG. 19 and FIG. 20, the proximal end portions 121b of the insertion members 121, which consist of the pair of elastic catches 1213, are accommodated in proximal end portion accommodating holes 1244, which are bored in the proximal end portion accommodating portion 1243 of the first movable end portion 1241 of the insertion member operating portion 123 that projects to the second movable end portion 1242 side (that is, the inner space S side of the insertion member operating portion 123). The insertion members 121 are installed on the first movable end portion 1241 because the extraction thereof from the proximal end portion accommodating portion 1243 to the second movable end portion 1242 side is restricted due to the engagement between the pair of elastic catches 1213 and the proximal end portion accommodating portion 1243, which is accommodated in the proximal end portion accommodating hole 1244. Note that the proximal end portion accommodating portion 1243 is a projection formed by resin molding in a shape that projects from the plate-shaped base wall portion 1241a of the first movable end portion 1241, and is a portion of the first movable end portion 1241.

The insertion members 121 are provided on the insertion member operating portion 123 so as to traverse the inner space S of the insertion member operating portion 123 while the proximal end portion 121b is installed in the first movable end portion 1241 (more exactly, the proximal end portion accommodating portion 1243).

The engaging structure between the pair of elastic catches 1213 that form the proximal end portion 121b and the proximal end portion accommodating portion 1243 will be concretely explained with reference to FIG. 19.

The engagement receiving portion 1213b of the side portion of each of the elastic catches 1213 accommodated in the proximal end portion accommodating hole 1244 of the proximal end portion accommodating portion 1243 is accommodated in an enlarged hole 1245, which is a portion in which the end portion of the proximal end portion accommodating hole 1244 on the side opposite to the second movable end portion 1242 has been enlarged. The engagement between the elastic catches 1213 and the proximal end portion accommodating portion 1243 is realized by the engagement receiving portions 1213b of the elastic catches 1213 engaging the steps 1246 between the enlarged hole 1245 in the proximal end portion accommodating hole 1244 and the portion not included in the enlarged hole 1245 (the elastic body accommodating hole 1247). The inner wall of the proximal end portion accommodating portion 1243 that forms the steps 1246, that is, the wall portion that forms the inner wall surface of the elastic body accommodating hole 1247, which is narrower than the enlarged hole 1245, forms an extraction engaging portion 1248 that is engaged by the engagement receiving portion 1213*b* of the elastic catches 1213. The engagement receiving portion 1213*b* of the elastic catches 1213 engage the extraction engaging portion 1248 from the side opposite to the second movable end portion 1242. Thereby, the extraction of the proximal end portion 121*b* from the proximal end portion accommodating portion 1243 is restricted.

The proximal end portion accommodating hole 1244 accommodates the proximal end portion 121*b* by allowing movement in the axial direction (the direction along the center axis) of the proximal end portion accommodating hole 1244. The proximal end portion accommodating portion 1243 functions as a guide member that guides the movement of the insertion members 121 while maintaining the position of the insertion members 121 in the axial direction of the proximal end portion accommodating hole 1244. The first movable end portion 1241 and the insertion member window 128 of the second movable end portion 1242 are positioned on the center axis of the proximal end portion accommodating hole 1244 and the extension thereof (below, also referred to as the insertion members movement line). The insertion members movement line (imaginary line P in FIG. 17) passes through the center axis of the ring-shaped insertion member operating portion 123.

The insertion members 121 can shift such that the dimension of the projection thereof from the insertion member window 128 on the second movable end portion 1242 side to the outside of the insertion members movable end portion 123 changes due to the movement along the insertion members movement line. However, during the movement of the insertion members 121 towards the connector holder portion 122 side, the location (engaging position) where the engagement receiving portion 1213*b* of the elastic catches 1213 engages the extraction engaging portion 1248 is the movement boundary position (projection boundary position). In addition, during the movement of insertion members 121 in the direction in which they are pressed towards the first movable end portion 1241 side, the location where the body portion 1221 of the insertion members 121 (concretely, the bottom surface 1211*a* of the body portion 1211; the pair of elastic catches 1213 extend from a portion of the bottom surface 11211*a* of the body portion 1211) abuts the proximal end portion accommodating portion 1243 is the movement boundary position (pressing boundary position). The insertion members 121 can move between the projection boundary position and the pressing boundary position.

The proximal end portion accommodating portion 1243 doubles as a pressing stopper portion that restricts the movement of the insertion members 121 in the pressing direction towards the first movable end portion 1241 side by the body portion 1211 of the insertion members 121 being abutted from the second movable end portion 1242 side. In addition, the body portion 1211 of the insertion members 121 functions as a stopper abutting portion that is abutted by the proximal end portion accommodating portion 1243, which functions as a pressing stopper portion.

The proximal end portion accommodating portion 1243 that is abutted by the stopper abutting portion (the body portion 1211) of the insertion members 121 functions as a pressure receiving member that bears the pressing force when, for example, the distal end portion 121*a* of the insertion members 121 of the optical connector tool 12 is pressed so as to be wedged between the elements 31*c* and 321 of the clamping portion 32 of the optical connector 3, and thereby there is the advantage that the wedging operation can be carried out easily.

In the illustrated example of the optical connector tool 12, the engagement receiving portion 1213*b* of the elastic catches 1213 moves into the enlarged hole 1245 accompanying the movement of the insertion members 121 between the projection boundary position and the pushing boundary position. Even when the insertion members are at the pressing boundary position, the size of the enlarged hole 1245 can accommodate the engagement receiving portion 1213*b* that has separated from the extraction engaging portion 1248 to the side opposite to the second movable end portion 1242. However, this is not limiting, and projection of the insertion members 121 (concretely, the proximal end portion 121*b*) from the enlarged hole 1245, which opens in the outer peripheral surface side of the insertion member operating portion 123, towards the outside of the insertion member operating portion 123 may be permitted.

In addition, in an exemplary embodiment of the optical connector tool 12, the proximal end portion accommodating hole 1244 is a through hole that passes through the proximal end portion accommodating portion 1243, and the enlarged hole 1245 opens in the outer peripheral surface side of the insertion member operating portion 123. However, this is not limiting, and an enlarged hole 1245 that does not open in the outer peripheral surface side of the insertion member operating portion 123 may be used. However, in this case, even when the insertion members 121 are at the pressing boundary position, the enlarged hole 1245 must be large enough to be able to accommodate the engagement receiving portion 1213*b* that has separated from the extraction engaging portion 1248 towards the side opposite to the second movable end portion 1242.

Note that the stopper abutting portion that is abutted by the proximal end portion accommodating portion 1243 does not necessarily have to be the body portion 1211 of the insertion members 121 itself, and for example, may be a small projection that projects on the side portion of the insertion members 121. In addition, the pressing stopper member is not limited to a structure in which the proximal end portion accommodating portion doubles as the pressing stopper member. For example, the pressing stopper member may be a projecting member or the like that projects on the first movable end portion 1241 separately from the proximal end portion accommodating portion. The pressing stopper portion may be a projection or the like that projects into the proximal end portion accommodating hole of the proximal end portion accommodating portion.

In addition, the proximal end portion accommodating portion is not limited a projecting shape that projects from the first movable end portion 1241 to the inner space S side of the insertion member operating portion 123. The proximal end portion accommodating hole may be a through hole that opens in the plate-shaped first movable end portion 1241, and may use a structure in which the first movable end portion itself functions as a proximal end portion accommodating portion.

In addition, in the illustrated example of the optical connector tool 12, two proximal end portion accommodating holes 1244 are formed in one proximal end portion accommodating hole 1243, and can handle the attachment of two insertion members 121A and 121B. However, this is not limiting, and it is possible to provide a separate proximal end portion accommodating portion in the first movable end portion for each proximal end portion accommodating hole.

In the structure in which the proximal end portion 121*b* is formed by a plurality of elastic catches 1213, there is the advantage that simply by pressing the proximal end portion 121*b* into the proximal end portion accommodating hole 1244 of the proximal end portion accommodating portion 1243 from the second movable end portion 1242 side, the insertion members 121 are simply installed in the proximal end portion accommodating portion 1243. In addition, there is the advantage that the structure of the insertion members 121 is extremely simple and thereby cost reductions are possible.

During the pressing of the proximal end portion 121b including the plurality of elastic catches 1213 into the proximal end portion accommodating hole 1244, the proximal end portion 121b is pressed into the proximal end portion accommodating hole 1244 from the opening portion of the proximal end portion accommodating hole 1244 in the end portion of the proximal end portion accommodating portion 1243 in the second movable end portion 1242 side (specifically, the distal end of the proximal end portion accommodating portion 1243 that projects from the first movable end portion 1241). The plurality of elastic catches 1213 are pressed into the elastic body accommodating hole 1247 of the proximal end portion accommodating hole 1244 while the elastic catches 1213 are elastically deformed so as to approach each other. Then at the location where the engagement receiving portion 1213b of the distal end reaches the enlarged hole 1245, the elastic catches 1213 are elastically restored so as to open a gap therebetween, and the engagement receiving portion 1213b enters the enlarged hole 1245. The engagement receiving portion 1213b that has entered the enlarged hole 1245 is pressed into the enlarged hole 1245 due to the elasticity of the elastic catches 1213, and thereby separation from the enlarged hole 1245 is prevented.

That is, in this optical connector tool 12, simply by the pressing of the proximal end portion 121b into the proximal end portion accommodating hole 1244, the insertion members 121 are attached to the insertion member operating portion 123, and thereby simple assembly is possible. In addition, the size and shape of the insertion members 121 are appropriately selected so as to conform to the structure of the clamping portion 123 of the optical connector 3, the attachment to the insertion member operating portion 123 can be simply carried out, and thereby an optical connector tool 12 having a structure conforming to the structure of the optical connector 3 can be easily obtained.

Note that in the illustrated example of the insertion members 121, a proximal end portion 121b including two elastic catches 1213 was illustrated, but a structure including three or more elastic catches 1213 may be used as the proximal end portion 121b.

In the optical connector tool 12 according to the invention, when the body portion 1211 of the insertion members 121 is abutted by the proximal end portion accommodating portion 1243, a clearance (separation distance; refer to the dimension c in FIG. 19) between the engagement receiving portion 1213b of the insertion members 121 and the extraction engaging portion 1248 is secured, but the size of this clearance (separation distance) is different for each of the insertion members 121. In the illustrated example of the optical connector tool 12, when the body portion 1211 of each of the insertion members 121A and 121B is abutted by the proximal end portion accommodating portion 1243, the clearance c2 between the engagement receiving portion 1213b of the insertion member 121B and the extraction engaging portion 1248 is larger than the clearance c1 between the engagement receiving portion 1213b of the insertion member 121A and the extraction engaging portion 1248. The distal end 121a of the engagement receiving portion 1213b of the insertion member 121A is disposed in the housing engaging groove 122h, and the distal end 121a of the insertion member 121B is disposed in the groove 122j disposed at the back end side of the connector on the side opposite to the housing engaging groove 122h via the connector receiving stand 122f in the accommodating recess 122a.

Note that in the optical connector 3 positioned and accommodated in the connector holder portion 122 by the connector receiving stand 122f and the housing engaging groove 122h, the vicinity of the interface between the two elements 321a and 321b of the clamping portion 32 on the lid side is positioned at the connector receiving stand 122f, and the element 321a on the ferrule 31 side inside the two elements 321a and 321b on the lid side are disposed in the housing engaging groove 122h. Thereby, the two insertion members 121A and 121B are disposed such that the distances from the connecting point 5, where the ferrule-side optical fiber 38 abutment connects the bare optical fiber 4a at the distal end of the optical fiber 4 in the clamping portion 32, are different. The relationship between the insertion members 121A and 121B is that the insertion member 121A disposed on the housing engaging groove 122h side is the insertion member 121 disposed by being aligned with the connecting point 5, and in comparison to this insertion member 121A, the insertion member 121B, which is far from the connecting point 5, has a large clearance.

The insertion members 121 have a distal end portion 121a that extends from the distal end portion 121b connected to the first movable end portion 1241 towards the bottom wall 122e so as to traverse the insertion member operating portion 123, passes through the slit-shaped insertion member window 128 formed in the bottom wall 122e, and is inserted between the elements 31c and 321 at the portion that projects outside the insertion member operating portion 123 beyond the bottom wall 122e, that is, at the portion that projects inside the accommodating recess 122a of the connector holder portion 122. The distal end portion 121a projects into the accommodating recess 122a via the insertion member window 128. However, the structure (insertion member window) for making the insertion members 121 project into the accommodating recess 122a from the insertion member operating portion 123 is not limited to a slit-shaped insertion member window 128 that divides the bottom wall 122e into two parts. For example, small holes bored into the bottom wall 122e, which is a structure for connecting both side walls 122b and 122c of the connector holder portion 122, may be used. The insertion member window 128 should secure a size that does not hinder the movement of the insertion members 121 that accompanies the deformation of the insertion member operating portion 123 described below.

When the insertion members 121 are extracted from the clamping portion 32 of the optical connector 3, the connector receiving stand 122f and the housing receiving stand 122i of the connector holder portion 122 functions as a stopper portion or stopper wall pressed against the optical connector 3 (more exactly, the housing; more concretely, the plug frame 33). The connector receiving stand 122f and the housing receiving stand 122i can also be referred to as a "stopper portion".

The "stopper portion" according to the invention prevents the optical connector from following the insertion members when the insertion members are extracted from between the elements of the clamping portion of the optical connector by operating the insertion member operating portion (deforming the insertion member operating portion such that the distance between the stopper portion and the first movable end portion increases by applying lateral pressure from both sides), and thereby functions to realize the smooth extraction of the insertion members from the elements. It is sufficient that the stopper portion realize this function, and is not limited to the connector receiving stand 122f and the housing receiving stand 122i in the illustrated example.

The "connector holder portion" according to the invention functions as a whole similarly to the stopper portion described above on the point of having a connector receiving stand 122f and a housing receiving stand 122i that are pressed against by the optical connector when the insertion members are extracted from the clamping portion of the optical connector. In the present specification, the term "stopper portion" includes the connector holder portion.

The insertion member operating portion 123 has a sleeve shape that extends along the longitudinal direction (the direction extending along the groove-shaped accommodating recess 122a) of the connector holder portion 122.

Concretely, the insertion member operating portion 123 is formed by a first movable end portion 1241, a second movable end portion 1242, and a pair of side portions 125a and 125b (below, referred to as joining wall portions) that connect the space between the first movable end portion 1241 (concretely, the base wall portion 1241a) and the second movable end portion 1242.

As shown in FIG. 17, concretely each of the joining wall portions 125a and 125b are formed so as to connect in a row the three connecting plate portions 126a to 126c. The space between the adjacent connecting plates is connected via the hinges 127. The pair of joining wall portions 125a and 125b extend from both sides of the plate-shaped base wall portion 1241a of the first movable end portion 1241, and a pair of movable end portion partitioning bodies 1242a of the second movable end portion 1242 are each formed on the distal end that extends from the first movable end portion 1241. The space between the connecting plate portion 126a and the first movable end portion 1241 positioned at one end of each of the joining wall portions 125a and 125b and the space between the connecting plate portion 126c and the second movable end portion 1242 positioned at the other end portion of each of the joining wall portions 125a and 125b are connected by hinge portions 127.

The insertion member operating portion 123 has an octagonal structure formed by the six connecting plate portions that form each of the joining wall portions 125a and 125b, the first movable end portion 1241, and the plate-shaped second movable end portion 1242 having a structure divided into two by the slit-shaped insertion member window 128 (however, connected by the connector receiving stand 122f of the connector holder portion 122).

The joining wall portions 125a and 125b are disposed in opposition with respect to the inner space S on both sides. Each of the joining wall portions 125a and 125b has a substantially L shape where, among the three connecting plate portions 126a to 126c, the center connecting plate 126b serves as the apex. In addition, the inner angle sides of the substantially L-shaped curved portions are provided so as to face each other, that is, the curved portion projects beyond both sides (outside the insertion member operating portion 123) at the space between the connector holder portion 122 and the first movable end portion 1241.

The base wall portion 1241a of the first movable end portion 1241 is supported so as to be parallel to the pair of movable end portion partitioning bodies 1242a that form the second movable end portion 1242 of the insertion member operating portion 123 by the pair of joining wall portions 125a and 125b.

As already described, the insertion member operating portion 123 of the optical connector tool 12 in the illustrated example is made of a synthetic resin and integrally formed with the connector holder portion 122. Concretely, the hinge portions 127, which connect together the adjacent connecting plates that form the joining wall portions 125a and 125b, are easily deformable thin portions that are made thin in comparison to the connecting plates 126a to 126d, the first movable end portion 1241, and the second movable end portion 1242. In addition, the hinge portion 127 that connects the space between the connecting plate portion 126a, which is positioned at one end portion of each of the joining wall portions 125a and 125b, and the first movable end portion 1241, and the hinge portion 127 that connects the space between the connecting plate portion 126c, positioned at the other end portion of each of the joining wall portions 125a and 125b, and the second movable end portion 1242, are also thin portions.

The hinge portions 127 connect the space between the adjacent connecting plate portions, the space between the connecting plate portion 126a and the first movable end portion 1241, and the space between the connecting plate portion 126c and the second movable end portion 1242 by enabling the rotation of each around axes that are aligned in the direction of the center axis of the insertion member operating portion 123. The thin portions, which are the hinges 127, respectively connect the space between adjacent connecting plates, the space between the connecting plate portion 126a and the first movable end portion 1241, and the space between the connecting plate portion 126c and the second movable end portion 1242, by enabling rotation by deforming the respective thin portion.

The term "ring-shaped" that indicates the shape (cross-sectional shape) of the insertion member operating portion 123 includes shapes such as a circle, ellipse, polygons such as a pentagon or hexagon, a rhombus or the like. In addition, shapes having a discontinuous section such as a C-shape are included.

The connector holder portion does not necessarily need to function as a stopper portion. The stopper portion may be provided on the second movable end portion separately from the connector holder portion. It is sufficient that the connector holder portion at least functions to accommodate the optical connector so that it can be extracted.

Between the first movable end portion 1241 and the second movable end portion 1242, the insertion member operating portion 123 applies a pressing force (lateral pressure) from both opposing sides to the joining wall portions 125a and 125b, which are provided so as to project beyond both sides with respect to the inner space S of the insertion member operating portion 123. By causing the joining wall portions 125a and 125b to approach each other, the distance between the first movable end portion 1241 and the second movable end portion 1242 is increased. Thereby, the extraction engaging portion 1248 (refer to FIG. 19) of the proximal end portion accommodating portion 1243 of the insertion member operating portion 123 is engaged in the engagement receiving portion 1213b of the insertion members 121 from the second movable end portion 1242 side, and the insertion members 121 are anchored to the first movable end portion 1241. Thereby, the insertion members 121 are moved relative to the second movable end portion 1241 in a direction in which the dimension of the projection into the accommodating recess 122a decreases (or the projection is eliminated), that is, the direction in which the insertion members 121 are drawn inside.

In the joining wall portions 125a and 125b, the parts where the bilateral projection of the insertion member operating portion 123 with respect to the inner space S is largest (the connecting plate portion 126b in the insertion member operating portion 123 in the illustrated example) functions as a lateral pressure applying portions 125p for applying a lateral pressure that deforms the insertion member operating portion 123. The insertion member operating portion 123 is formed bilaterally symmetrical, and the lateral pressure applying portions 125p of the joining wall portions 125a and 125b on both sides are at opposing positions with respect to the inner space S of the insertion member operating portion 123.

When lateral pressure is applied to the lateral pressure applying portions 125p on both the left and right sides of the insertion member operating portion 123 and the lateral pressure applying portions 125p approach each other, the distance between the first movable end portion 1241 and the second movable end portion 1242 increases due to the first movable end portion 1241 and the second movable end portion 1242 moving along the insertion members movement line P so as to separate from the cross-sectional center portion (the center position of the pair of lateral pressure applying portions 125p) of the insertion member operating portion 123. The first movable end portion 1241 is moved in a direction in which the dimension of the projection into the accommodation recess 122a decreases (or the projection is eliminated), that is, the direction in which the insertion members 121 are drawn inside by pulling the insertion members 121 due to the engagement between the proximal end portion accommodating portion 1243 provided on the first movable end portion 1241 (more exactly, the extracting engaging portion 1248) and the insertion members 121. In contrast, the second movable end portion 1242 decreases the dimension of the projection (or eliminates the projection) of the insertion members 121 into the accommodating recess 122a by changing position relative to the insertion members 121 by shifting in the direction of separation from the cross-sectional center portion of the insertion member operating portion 123. Moving the insertion members in the direction in which the dimension of the projection from the insertion member window outside of the insertion member operating portion decreases by the deforming of the insertion member operating portion 123 by applying the lateral pressure from both sides is realized by both the movement of the insertion members 121 accompanying the shift in the first movable end portion 1241 and the movement of the second movable end portion 1242 relative to the insertion members 121.

The insertion member operating portion 123 is not necessarily limited to being formed so as to be bilaterally symmetrical. However, as shown in FIG. 17, a structure in which the insertion member operating portion 123 is formed so as to be bilaterally symmetrical (in particular, on both sides; the joining wall portions 125a and 125b are bilaterally symmetrical) has the advantage that the linear movement of the insertion members 121 that accompanies the deformation of the insertion member operating portion 123 can be stably maintained.

It is sufficient that a structure is used in which the insertion member operating portion 123 deforms so that the dimension in the vertical direction increases when the lateral pressure is applied from both the left and right sides. For example, an elongated structure that extends along the insertion members 121 may be used. It is not necessary to use a structure in which, as shown in the illustrated example, both sides that connect the space between the connector holder portion 122 (more exactly, the bottom wall 122e that functions as a stopper portion) and the first movable end portion 1241 project significantly beyond both sides of the insertion members 121.

The insertion members 121 and the insertion member operating portion 123 may be made of different materials.

While the insertion members 121 are inserted between the pair of elements 31c and 321 of the clamping portion 32, that is, while lateral pressure has already been applied to the distal end portions 121a thereof, when the insertion members 121 are exposed repeatedly to temperature change, the shape of the distal end portions 121a deforms due to the creep phenomenon, and the thickness decreases. Thus, when the thickness of the distal end portion 121a decreases in this manner, the space between the element 31c and element 321, which are pushed open by the insertion members 121, becomes narrow, and it becomes difficult to insert the optical fibers 4 and 38 into the clamping portion 32. As a result, there is the concern that the function in which the optical fibers 4 and 38 are connected in the clamping portion 32 will be hindered. Thus, when the entire optical connector tool 12 is formed from a hard material that makes the occurrence of the creep phenomenon difficult, the insertion member operating portion elastically deforms with difficulty, and there is the concern that the function in which the insertion members 121 are extracted from the clamping portion 32 will be hindered.

In consideration of the above, the material of the insertion members 121 may be both harder than the material of the insertion member operating portion 123 and resistant to the creep phenomenon. In contrast, the material of the insertion member operating portion 123 is a soft material that elastically deforms easily.

The material for the insertion members 121 and the material for the insertion member operating portion 123 are not particularly limited, and any type of metal, resin, or the like may be used if they satisfy both of the relationships described above. In addition, a resin may be appropriately used as the material for the insertion members 121 and the material for the insertion member operating portion 123 because a resin is easily molded. However, in this case, the insertion members 121 and the insertion member operating portion 123 are formed by differing resins. Furthermore, in the case that the insertion members 121 and the insertion member operating portion 123 are formed by different resins, a polycarbonate is an example of the material that can be used as the material for the insertion members 121 and polyacetal is an example of the material for the insertion member operating portion 123.

In the tool equipped optical connector 11, as shown in FIG. 18 or the like, the plurality of insertion members 121A and 121B of the optical connector tool 12 are wedged between the pair of elements 31c and 321 of the clamping portion 32 of the optical connector 3 accommodated in the connector holder portion 122. Among the two insertion members 121A and 121B, the insertion member 121A on the housing engaging groove 122g side of the optical connector tool 12 is inserted between the extended portion 31c of the clamping portion 32 and the lid side element 321a on the ferrule 31 side. The insertion member 121B on the connector back end portion disposition groove 122j side is inserted between the extended portion 31c of the clamping portion 32 and the lid side element 321b on the side away from the ferrule 31. The space between the extended portion 31c and the lid side element 321 is only slightly pushed open by the insertion members 121A and 121B due to the resistance to the elasticity of the spring 322.

The insertion members 121 are inserted into the insertion members insertion recesses 325*d* (only illustrated in FIG. 18), which open in the side portion of the clamping portion 32. The insertion members insertion recesses 325*d* are each formed at the interface between the pair of elements 31*c* and 321. Concretely, the insertion members insertion recesses 325*d* are each formed at positions corresponding to the two lid side elements 321*a* and 321*b* (refer to FIG. 10) on the lid side. The location of the formation of each of the insertion members insertion recess 325*d* corresponds to the locations of the insertion openings 34*a* and 23*b* of the stop ring 34 of the optical connector 3. The distal end portions 121*a* of the insertion members 121 that have passed through the insertion openings 34*a* and 34*b* of the stop ring 123 of the optical connector 3 are inserted into each of the insertion members insertion recesses 325*d*.

As shown in FIG. 18, while the insertion members 121 are wedged between the elements 31*c* and 321, the optical fiber 4 (refer to FIG. 10 and FIG. 11) in the space between the pair of elements 31*c* and 321 of the clamping portion 32 can be inserted into and released from the back end side of the optical connector 3.

To install the optical connector 3 on the distal end of the optical fiber 4 (here, a mode single optical fiber) after connecting the optical fibers 4 and 38 together inside the clamping portion 32, first, the distal end of the optical fiber 4 is inserted into the grooves 325*a* and 325*b* between the elements 31*c* and 321 of the clamping portion 32 from the back end side of the optical connector 3, and then pressed into the alignment groove 323. Due to this pressing, the bare optical fiber 4*a* of the optical fiber 4 is abutment connected with the ferrule-side optical fiber 38 in the alignment groove 323 inside the clamping portion 32. The covered portion of the optical fiber 4 is accommodated in the grooves 325*a* and 325*b*.

Next, while maintaining the abutment connection between the optical fiber 4 and the ferrule-side optical fiber 38, lateral pressure is applied from both the left and right sides to the insertion member operating portion 123 of the optical connector tool 12, and the insertion member operating portion 123 is deformed. Thereby, the dimension of the projection of the insertion members 121 to the outside of the insertion member operating portion 123 decreases (the dimension of the projection into the accommodating recess 122*a* of the connector holder portion 122), and the insertion members 121 are extracted from the clamping portion 32 of the optical connector 3. At this time, the extraction of the insertion members 121 from between the elements 31*c* and 321 is smoothly realized because the connector receiving stand 122*f* and the housing receiving stand 122*i* provided on the second movable end portion 1242 function as stopper portions that restrict the optical connector 3 from moving along with the insertion members 121.

When the insertion members 121 have been extracted from the clamping portion 32, the optical fiber 4 and the ferrule-side optical fiber 38 are clamped between the pair of elements 31*c* and 321 due to the elasticity of the spring 322 of the clamping portion 32, and the abutment connection between the optical fiber 4 and the ferrule-side optical fiber 38 is maintained. While the covered portion of the optical fiber 4 is accommodated in the grooves 325*a* and 325*b*, the extraction of the optical fiber 4 from the clamping portion 32 is restricted because the covered portion of the optical fiber 4 is securely clamped and fastened between the pair of elements 31*c* and 321. Thereby, the attachment of the optical connector 3 to the distal end of the optical fiber 4 is completed.

As described above, in the optical connector tool 12 in the illustrated example, among the two insertion members 121A and 121B, the clearance c of the insertion member 121B, whose distal end portion 121*a* is disposed in the connector back end side disposition groove 122*j*, between the engagement receiving stand 1213*b* of the insertion members 121 and the extraction engaging portion 1248 of the proximal end portion accommodating portion 1243, is large in comparison to the insertion member 121A, whose distal end portion 121*a* is disposed in the housing engaging groove 122*h* (refer to FIG. 19). Thereby, when the insertion member operating portion 123 is deformed by the lateral pressure from both opposing sides in order to extract the insertion members 121 from the clamping portion 32 of the optical connector 3, the insertion member 121A, which is positioned corresponding to the connecting point 5 (refer to FIG. 10) of the optical fibers 4 and 38 in the clamping portion 32, is extracted from the clamping portion 32 before the insertion member 121B. After the insertion member 121A has been extracted from the clamping portion 32, the insertion member 121B is extracted from the clamping portion 32 (staggered extraction). This means that due to the difference in the sizes of the clearance c, the timing of the engagement between the engagement receiving portion 1213*b* of the insertion members 121A and 121B is different from that of the extraction engaging portion 1248 of the proximal end accommodating portion 1243. Thereby, the extraction of the plurality of insertion members 121 from the clamping portion 32 is realized in sequence starting from the side close to the connecting point 5 between the optical fibers 4 and 38 because the engagement between the engagement receiving portion 1213*b* and the extraction engaging portion 1248 is realized for the insertion members in sequence starting from the insertion members that are close to the contacting point 5 between the optical fibers 4 and 39 and proceeding to the ones that are distant from the connecting point 5.

The insertion member operating portion 123 and the insertion members 121 form a staggered extraction mechanism that realizes the extraction of the plurality of insertion members 121 inserted into the clamping portion 32 from the clamping portion 32 in sequence starting from the side close to the connecting point between the optical fibers 4 and 38.

Below, the staggered extraction of the two insertion members 121 will be explained with reference to FIG. 21A to FIG. 24C for the case in which the insertion member operating portion 123 is deformed by lateral pressure from both opposing sides.

FIG. 21A to 21C show the state before the deforming operation on the insertion member operating portion 123. FIG. 22A to 22C, FIG. 23A to 23C, and FIG. 24A to 24C show the states in which, starting from the state shown in FIG. 21A to 21C, the two insertion members 121A and 121B of the optical connector tool 12 are extracted in sequence starting from the clamping portion 32 of the optical connector 3 accompanying the progress in the deformation of the insertion member operating portion 123. From the state shown in FIG. 21A to 21C, the extraction of the insertion members 121A and 121B from the clamping portion 32 of the optical connector 3 proceeds in the sequence shown in FIG. 22A to 22C, FIG. 23A to 23C, and FIG. 24A to 24C, accompanying the progress in the deformation of the insertion member operating portion 123.

Note that in FIG. 21A to FIG. 24C, an example is shown in which the tool equipped optical connector 11 is handled with the optical connector 3 facing down (the bottom side of the figure) and the insertion member operating portion 123 facing up (the top side of the figure).

Of course, when the operation of attaching the optical connector 3 to the distal end of the optical fiber 4 is carried out, before carrying out the operation in which the insertion member operating portion 123 is deformed by applying lateral pressure from both sides thereof, the optical fiber 4 is inserted between the pair of elements 31c and 321 of the optical connector 3, and the bare optical fiber 4a of the optical fiber 4 is abutment connected with the ferrule-side optical fiber 38.

FIG. 21A is a drawing that schematically shows, among the two insertion members 121A and 121B of the optical connector tool 12, the relationship between the insertion member 121B, which is distant from the connecting point 5 (refer to FIG. 10) between the ferrule-side optical fiber 38 and the other optical fiber 4 and the clamping portion 32 of the optical connector 3; FIG. 21B is a drawing that shows the relationship between the two insertion members 121A and 121B of the optical connector tool 12 and the proximal end portion accommodating portion 1243 of the insertion member operating portion 123; and FIG. 21C is a drawing that schematically shows, among the two insertion members 121A and 121B of the optical connector tool 12, the relationship between insertion member 121A, which is close to the connecting point 5 between the ferrule-side optical fiber 38 and the other optical fiber 4 and the clamping portion 32 of the optical connector 3. In addition, A to C in FIGS. 22A to 22C, FIGS. 23A to 23C, and FIGS. 24A to 24C correspond to A to C in FIGS. 21A to 21C.

Figures 22A, 22B, 22C:
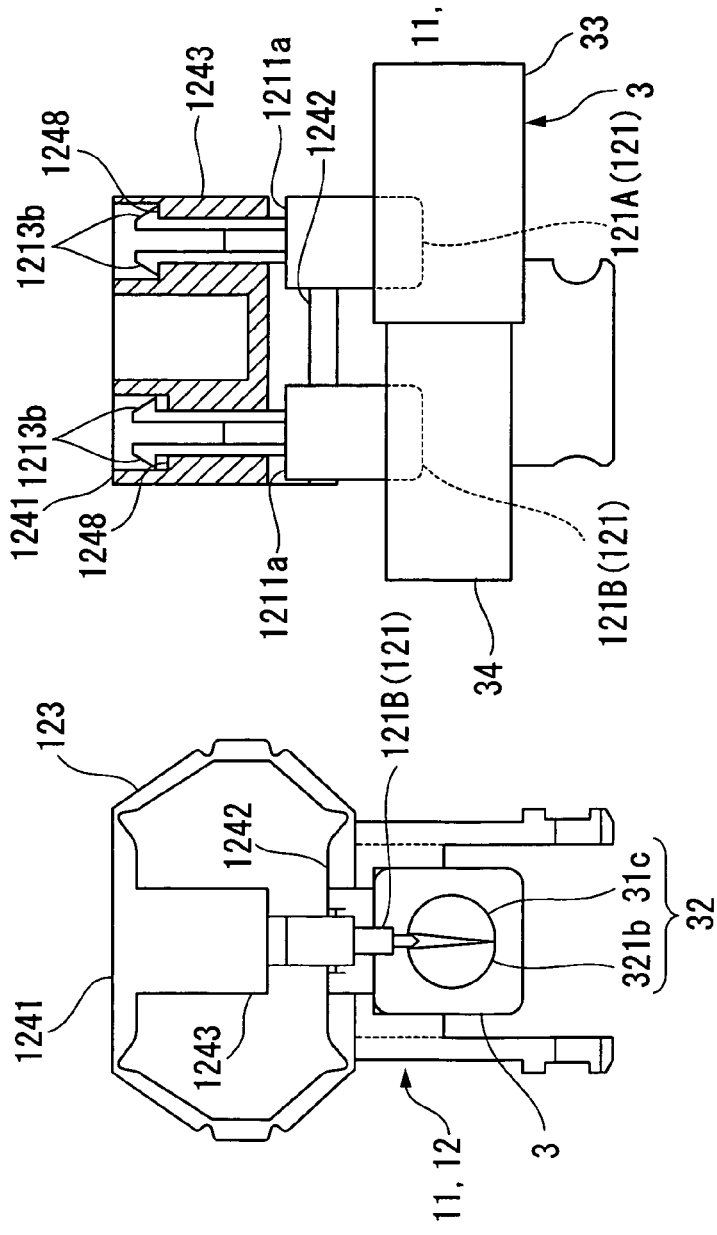
FIGS. 22A to 22C are drawings that show, among the two insertion members of the tool for an optical connector, the state in which the extraction engaging portion of the proximal end portion accommodating portion of the insertion member operating portion is engaged to the engagement receiving portion of the insertion member on the side close to the connecting point between the ferrule-side optical fiber and the other optical fiber due to the deforming operation on the insertion member operating portion of the optical fiber tool of the tool equipped optical connector.

When the insertion member operating portion 123 of the tool equipped optical connector 11 in FIGS. 21A to 21C is deformed by lateral pressure from both opposing sides, the clearance c between the engagement receiving portions 1213b of the insertion members 121A and 121B and the extraction engaging portion 1248 of the proximal end portion accommodating portion 1243 decreases, and as shown in particular in FIG. 22B, among the two insertion members 121, first the extraction engaging portion 1248 of the proximal end portion accommodating portion 1243 abuts (engages) the engagement receiving portion 1213b of the insertion member 121A. Then, accompanying the progress of the deformation of the insertion member operating portion 123, the movement of the insertion member 121A relative to the second movable end portion 1242 of the insertion member operating portion 123 commences in the direction of being pulled into the inner space S of the insertion member operating portion 123, that is, movement in the direction in which the dimension of the projection outside the insertion member operating portion 123 decreases (or the projection is eliminated), (FIGS. 22A to 22C show the state of the commencement of the extraction of the insertion member 121A), and the insertion member 121A is extracted from between the elements 31c and 321 of the clamping portion 32 (refer to FIGS. 23A to 23C).

Note that as shown in FIGS. 22A to 22C and FIGS. 23A to 23C to FIG. 23C, when the deforming of the insertion members 123 by using lateral pressure applied from both sides commences and the deformation progresses, the optical connector 3 separates from the first movable end portion 1241 accompanying the separation of the stopper portion (the connector receiving stand 122f and the housing receiving stand 122i) of the optical connector tool 12 on the second movable end portion 1242 side from the first movable end portion 1241. Accompanying this, the insertion members 121A and 121B, which are wedged between the elements 31c and 321 of the clamping portion 32, move along with the optical connector 3 while clamped between the elements 31c and 321. Thereby, the body portion 1211 of each of the insertion members 121A and 121B are separated from the proximal end portion accommodating portion 1243.

The movement in which the insertion member 121A follows the optical connector 3 is restricted at the location (the step in FIGS. 22A to 22C) where the extraction engaging portion 1248 of the proximal end portion accommodating portion 1243 engages the engagement receiving portion 1213b of the insertion member 121B. The movement in which the insertion member 121A follows the optical connector 3 continues until the extraction engaging portion 1248 of the proximal end portion accommodating portion 1243 engages the engagement receiving portion 1213b of the insertion member 121A. When the extraction engaging portion 1248 of the proximal end portion accommodating portion 1243 has engaged the engagement receiving portion 1213b of the insertion member 121A, the insertion member 121A is gradually extracted from the clamping portion 32 accompanying the progress of the deformation of the insertion member operating portion 123.

In contrast, the movement in which the insertion member 121B follows the optical connector 3 continues until the extraction engaging portion 1248 of the proximal end portion accommodating portion 1243 engages the engagement receiving portion 1213b of the insertion member 121B (the step in FIG. 23A to 23C). The extraction of the insertion member 121B from the clamping portion 32 does not commence until the extraction engaging portion 1248 of the proximal end portion accommodating portion 1243 engages the engagement receiving portion 1213b. Because the clearance c of the insertion member 121B is larger than that of the insertion member 121A, the timing in which the extraction engaging portion 1248 of the proximal end portion accommodating portion 1243 engages the engagement receiving portion 1213b is later than that of the insertion member 121A.

As shown in FIG. 23A to FIG. 23C, when the extraction engaging portion 1248 of the proximal end portion accommodating portion 1243 engages the engagement receiving portion 1213b of the insertion member 121B, the extraction of the insertion member 121B from the clamping portion 32 commences (FIG. 23A to FIG. 23C show the state in which the extraction of the insertion member 121B has commenced). Then, due to the progress of the deformation of the insertion member operating portion 123, as shown in FIG. 24A to FIG. 24C, the insertion member 121B is extracted from the clamping portion 32.

Note that the commencement of the extraction of the insertion member 121B does not necessarily have to be simultaneous with the completion of the extraction of the insertion member 121A from the clamping portion 32.

Due to the connector receiving stand 122f of the connector holder portion 122, the housing receiving stand 122i, and both side walls 122b and 122c, the optical connector 3 is firmly held so that its position does not shift. Thus, even during the operation of extracting the insertion members 121 from between the elements 31c and 321 of the clamping portion 32, the position (direction) of the optical connector 3 does not change and is stably maintained. During the operation of extracting the insertion members 121 from the clamping portion 32, the inconvenience in which the axis of the optical connector 3 tilts with respect to the optical connector tool 12 is reliably prevented.

In the tool equipped optical connector 11 in the illustrated example, the center axis of the clamping portion 32 of the optical connector 3 (the alignment axis of the alignment groove 323; here aligned with the small hole 31d that passes through the ferrule 31 (into which the optical fiber 38 is inserted and fastened)) is stably maintained along the center axis of the ring-shaped insertion member operating portion 123.

Note that the insertion member operating portion 123 of the optical connector tool 12 in the illustrated example is formed having a size that can be held in one of the operator's hands. In addition, by grasping the insertion member operating portion 123 using one of the operator's hands, the insertion member operating portion 123 is deformed due to the application of a lateral pressure from both the left and right sides to the insertion member operating portion 123, and thereby, the extraction of the insertion members 121 from the optical connector 3 is realized. Thus, the optical connector tool 12 has a superior operability, and it is possible to carry out the extraction of the insertion members 121 comfortably even in the case that a comparatively strong force is necessary to extract the insertion members 121 from between the elements 31c and 321 of the clamping portion 32 of the optical connector 3.

In addition, the insertion member operating portion 123 of the optical connector tool 12 in the illustrated example is structured such that the amount of the increase in the distance of separation between the first movable end portion 1241 and the second movable end portion 1242 is small with respect to the amount of change in the distance of the separation between the lateral pressure applying portions 125p on both the left and right sides due to the lateral pressure from both sides. This structure is realized by adjusting the dimensions of the first and second movable end portions 1241 and 1242 and each of the connecting plate portions 126a to 126c of the joining wall portions 125a and 125b on both sides, which together form the insertion member operating portion 123. Thereby, the insertion member operating portion 123 functions as an energizing mechanism (torque mechanism) that increases the lateral pressure from both sides and converts the resulting lateral pressure to an extracting force that extracts the insertion members 121 from between the elements. Thus, the operation of extracting the insertion members 121 can be carried out with a light force. It is sufficient that the lateral pressure required in the operation of extracting the insertion members 121 is a weak force, and when the lateral pressure is applied to the insertion member operating portion 123 by hand, the operation of extracting the insertion members 121 is carried out comfortably with a light force.

Any structure may be used for the insertion member operating portion 123. However, an insertion member operating portion 123 should be used that forms an energizing mechanism (torque mechanism) that increases the lateral pressure from both sides and converts this resulting lateral pressure to a force that extracts the insertion members 121 from between the elements. For example, a link mechanism that accomplishes this effect (the insertion member operating portion in the illustrated example is also a type of link mechanism) may be used.

In the case of the insertion member operating portion 123 in the illustrated example, when the lateral pressure is applied from both opposing sides, the joining wall portions 125a and 125b on both sides gradually approximate a linear form, as shown in FIG. 18, from the L-shaped curved state shown in FIG. 18, due to the plurality of hinge portions 127.

Because each of the joining wall portions 125a and 125b on both sides of the insertion member operating portion 123 are bilaterally symmetrical with respect to the insertion members 121, the joining wall portions 125a and 125b on both sides deform identically in response to the lateral pressure applied from both opposing sides. Thereby, the insertion members 121 move linearly with respect to the clamping portion 32 of the optical connector 3, which is supported by the connector holder portion 122, and thereby the insertion members 121 are extracted from between the elements 31c and 321. The approach between the lateral pressure applying portion 125p on both the left and right sides is converted to a change of the angle of inclination of the connecting plates 126a and 126c at both ends of each of the joining wall portions 125a and 125b (the angle of inclination of the insertion member operating portion 123 in the vertical direction gradually becomes small), and the distance of the separation between the first movable end portion 1241 and the second movable end portion 1242 increases.

Note that when the lateral pressure is applied from both sides, the thin portion of the insertion member operating portion 123, which is the hinge portion 127, deforms, but the connecting plates 126a to 126c and the first and second movable end portions 1241 and 1242 do not deform. In addition, the connector holder portion 122 does not deform.

The movement of the insertion members 121 with respect to the clamping portion 32 is linear movement on the extension of the interface between the pair of elements 31c and 321, and thus during the extraction of the insertion members 121, the inconvenience in which the insertion members 121 apply a deforming force to the pair of elements 31c and 321 occurs with difficulty. Furthermore, the inconvenience in which the extraction resistance of the insertion members 121 from the pair of elements 31c and 321 increases unnecessarily occurs with difficulty.

As described above, according to the tool equipped optical connector 11 of the invention, after the insertion member 121A is extracted from the clamping portion 32, the insertion member 121B is extracted from the clamping portion 32. Thereby, after the elements 31c and 321a that clamp the connecting point 5 (refer to FIG. 10) between the optical fibers 4 and 39 in the clamping portion 32 are closed, the elements 31c and 321b, whose positions are farther from the connecting point 5 than the element 321a, are closed. This means that the elements 31c and 321 of the clamping portion 32 are closed from the side near the connecting point 5 of the optical fibers 4 and 38 due to the extraction of the insertion members 121. In this case, there is the advantage that the flexure that occurs in one or both of the pair of optical fibers 4 and 38 due to the abutment force during abutment connection is discharged outside of the clamping portion 32 accompanying the clamping of the optical fibers 4 and 38 in the clamping portion 32, due to the extraction of the insertion members 121, and thus the flexure can be prevented from remaining in the clamping portion 32. Thereby, it is possible to prevent the inconvenience in which the bending and flexure of the optical fibers remaining in the clamping portion 32 influence the optical transmission characteristics of the optical fibers 4 and 38 or the optical properties such as connection loss between the optical fibers 4 and 38. In addition, it is possible to realize stable maintenance of the optical fibers clamped in the clamping portion and the stability of properties such as transmission loss, and thereby it is possible to increase the long-term reliability of the optical connector 3.

According to the invention, in the tool equipped optical connector 11, it is possible to attach the optical connector 3 onto the distal end of the optical fiber 4 without using a conventional dedicated tool. In addition, the structure of the optical connector tool 12 is extremely simple, and furthermore, because the optical connector tool 12 can be manufactured inexpensively, it is possible to realize significant cost reductions in comparison to the case of using a dedicated tool. Because downsizing is easy, for example, it is advantageous for use in a narrow work space such as inside a machine.

Furthermore, after the optical connector tool 12 has been attached to the optical connector 3 and the optical fiber 4 has been inserted into the clamping portion 32, simply by extracting the insertion members 121 from the clamping portion 32 by operating the optical connector tool 12, it is possible to realize the attachment of the optical connector 3 onto the distal end of the optical fiber 4 extremely simply. In addition, the precision positioning and support operation in which the optical connector is fit into the holder portion, which is necessary when using the conventional dedicated tool, becomes unnecessary.

Because the thin portion used as a hinge portion 127 is elastically deformed by the lateral pressure applied to the insertion member operating portion 123, when the lateral pressure is released, the shape before the insertion member operating portion 123 has had the lateral pressure applied, that is, the shape shown by the solid line in FIG. 18, is restored. Therefore, use in attaching the optical connector to the connector holder portion and attaching the tool equipped optical connector can be easily repeated.

In addition, as shown in FIG. 18, because the optical connector 3 is pressed against the bottom wall 122e of the connector holder portion 123 due to the retainer 50 that is releasably installed on the connector holder portion 122, it is possible to secure the stability of the direction of the optical connector 3. In this case, during the operation of extracting the insertion members 121 from the clamping portion 32 of the optical connector 3, it is possible to prevent reliably the inconvenience in which the elements 31c and 321 are damaged due to the shifting of the direction of the optical connector 3.

Figure 25:
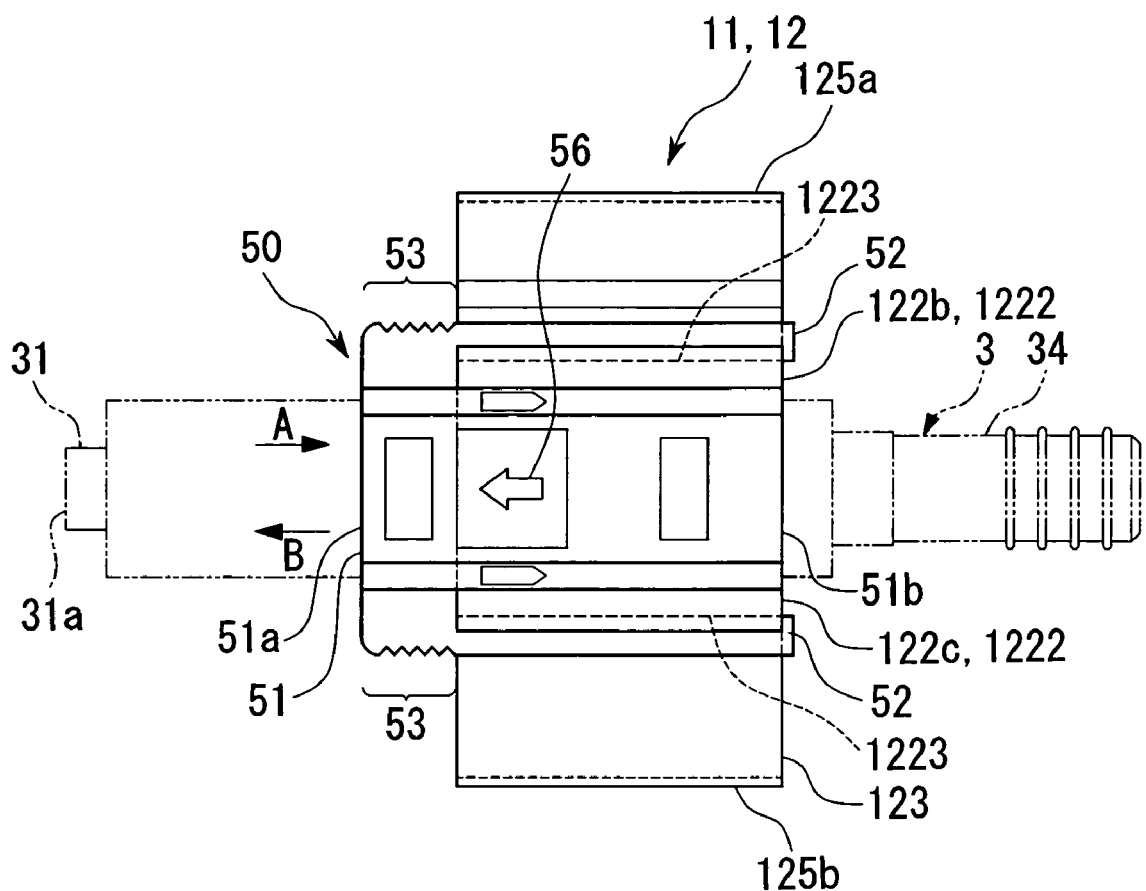
FIG. 25 is a plan view showing the tool equipped optical connector in which the retainer in FIG. 7 has been installed.

FIG. 7 and FIG. 25 are examples of the retainer 50.

The retainer 50 in the example in FIG. 7 and FIG. 25 is an integrally molded resin part. This retainer 50 includes a substantially rectangular-shaped retainer body 51 and a pair of arms 52 that project from both sides of the retainer body 51. Each of the arms 52 is an elastic member that projects so as to extend along the side portion of the retainer body 51 from both sides of one end portion 51a (the left front side in FIG. 7; left side in FIG. 25) of the retainer body 51 towards the direction of the other end portion 51b on the side opposite to one end portion 51a. On both sides of the retainer body 51, a clearance 55 is secured between the arms 52 and the retainer body 51. In addition, grasping portions 53 formed by a plurality of adjacent small projections are provided on the proximal end portion of each of the arms 52 that projects from the retainer body 51.

A plurality (three shown in the figure) of projections 54 (refer to FIG. 18) that are abutted by the optical connector 3 are formed on the bottom surface of the retainer body 51.

The retainer 50 can be attached by being pressed (pressed in the direction of the arrow A in FIG. 7 and FIG. 25) from the front end side of the optical connector tool 12 (the left side in FIG. 25) into the pair of retainer engaging portions 1222, which are the distal end portions of the pair of side walls 122b and 122c of the optical connector tool 12 that project outside the insertion member operating portion 123.

In the attachment of the retainer 50 onto the connector holder portion 122, the other end portion 51b side of the retainer body 51, which serves as the front side in the pressing direction, is pressed into the pair of retainer engaging portions 1222. Due to this pressing, the retainer body 51 is inserted between the pair of retainer engaging bodies 1222. In addition, the arms 52 on both sides of the retainer body 51 are inserted into the engaging grooves 1223 formed on the outside surface side of each of the retainer engaging portions 1222 (the surface opposite to the inner surface that faces the accommodating recess 122a between the pair of side walls 122b and 122c), and the retainer engaging portions 1222 are each accommodated in the clearance 55 between the retainer body 51 and the arms 52 on both sides thereof. The retainer 50 is not easily separated from the engaging groove 1223 of the retainer engaging portion 1222 due to vibration of the arms 52 or the like because the retainer engaging portion 1222 is interposed between the arms 52 and the retainer body 51 by using the elastic deformation of the arms 52 enabled by the adjustment of the dimension of the clearance 55.

The retainer 50 that has been attached to the optical connector tool 12 is not easily separated from the optical connector tool 12 as long as it is not forcibly extracted from the optical connector tool 12 by using the grasping portion 53 or the like. In the extraction of the retainer 50 from the optical connector tool 12, the retainer 50 is moved relatively in the direction indicated by the separation direction mark 56 (arrow) formed on the retainer body 51, that is, the direction of the arrow B in FIG. 7 and FIG. 25, with respect to the optical connector tool 12.

When the retainer 50 is installed on the optical connector tool 12, the retainer body 51 presses the optical connector 3, which is accommodated in the accommodating recess 122a, against the bottom wall 122e, and thereby the accommodation state of the optical connector 3 in the accommodating recess 122a is stably maintained. Thereby, even when the operation of extracting the insertion members 121 from the clamping portion 32 is carried out, tilting and shifting of the axis of the optical connector 3 with respect to the optical connector tool 12 does not occur.

Note that although a synthetic resin is used in this embodiment, the material for the retainer 50 is not limited thereby. In addition, the retainer need not necessarily be an integrally molded member, and may be assembled from a plurality of parts.

In addition, by attaching the tool equipped optical connector 11 in advance, the retainer 50 also functions to prevent release of the optical connector 3 from the optical connector tool 12 while the tool equipped optical connector 11 is being conveyed.

A retainer engaging portion for engaging and mounting the retainer 50 from the outside of the insertion member operating portion is not limited to the retainer engaging portions 1222 on the side walls 122b and 122c on both sides of the connector holder portion 122. For example, in the connector holder portion, instead of the side walls 122b and 122c, projections separately formed so as to project outside of the insertion member operating portion may be used. In addition, the optical connector tool and the tool equipped optical connector of the invention include structures that do not have a connector holder portion, and in the case that there is no connector holder portion, projections or the like formed so as to project from the second movable end portion 1242 outside the insertion member operating portion may be used as a retainer engaging portion.

As shown in FIG. 19, an elastic member 122k projects on the side surface of the connector receiving stand 122f. This elastic member 122k emits a detection signal that indicates that the insertion members 121 have reached the extraction position from between the elements 31c and 321 of the clamping portion 32 of the optical connector 3 (the position where the extraction is completed; below, also referred to as the extraction position) when the insertion members 121 that have moved due to the deformation of the insertion member operating portion 123 caused by the lateral pressure applied from both sides.

The elastic member 122k emits a sound both when the insertion members 121 are moved by the deformation of the insertion member operating portion 123 due to the application of lateral pressure from both sides (movement relative to the second movable end portion 1242; movement in the direction in which the dimension of the projection outside the insertion member operating portion 123 decreases (or the projection is eliminated)) and when the insertion members 121 are elastically deformed by being pressed towards the outside of the insertion member operating portion 123 by the contact projection 1214 provided on the side portion of the body portion 1221 of the insertion members 121 and elastically restored due to the contact with the contact projection 1214 being released because of the further movement of the insertion members 121. The contact release between the elastic member 122k and the contact projection 1214 occurs when the insertion members 121 reach the position at which they are extracted from the elements 31c and 321 of the clamping portion 32 of the optical connector 3 depending on the projection position of the elastic member 122k in the connector receiving stand 122f, the projection position of the contact projection 1214 in the insertion members 121, the dimension of the distal end portion 121a of the insertion members 121, and the like. Thereby, the sound that is produced by the release of the contact between the elastic member 122k and the contact projection 1214 functions as a detection signal that indicates that the insertion members 121 have reached the extraction position.

The elastic member 122k functions as a contact member that contacts the contact projection 1214 of the insertion members 121.

Due to the sound described above, the user of the optical connector tool 12 can know that the extraction of the insertion members 121 from the clamping portion 32 has completed. Thereby, the user of the optical connector tool 12 can reliably complete the operation of extracting the insertion members 121 from the clamping portion 32 by continuing the extraction operation, in which the insertion member operating portion 123 is deformed by the lateral pressure applied from both sides, until the completion of the extraction of the insertion members 121 from the clamping portion 32 has been confirmed due to the sound described above.

As shown by the solid line in FIG. 19, in the tool equipped optical connector 11, before the operation of extracting the insertion members 121 from the clamping portion 32 of the optical connector 3, the insertion members 121 are disposed such that the contact projection 1214 is on the side closer to the first movable end portion 1241 than the elastic member 122k. In the example shown in FIG. 19, the contact projection 1214 of the insertion members 121 is disposed at the side closer to the movable end portion 1241 than the elastic member 122k due to the bottom wall 1211a of the body portion 1211 of the insertion members 121 abutting against the proximal end portion accommodating portion 1243. The insertion member operating portion 123 is deformed by the lateral pressure applied from both sides, the operation of extracting the insertion members 121 from the clamping portion 32 of the optical connector 3 commences, and the engagement receiving portion 1213b of the insertion members 121 and the extraction engaging portion 1248 of the proximal end portion accommodating portion 1243 are engaged. Thereby, as shown by the imaginary line (the two dot line) in FIG. 19, when the movement of the insertion member operating portion 123 relative to the second movable end portion 1242 of the insertion member operating portion 123 commences (movement in the direction in which the dimension of the projection outside the insertion member operating portion 123 decreases (or the projection is eliminated)), the contact projection 1214 that projects on the side portion of the body portion 1211 of the insertion members 121 presses the elastic member 122k, and the elastic member 122k elastically deforms. When the insertion members 121 are further moved and reach the extraction position described above, the contact between the elastic member 122k and the contact projection 1214 is released. When the elastic member 122k is elastically restored due to this contact release, a sound that serves as a detection signal is produced.

As has already been described above, in the insertion member 121A on the housing engaging groove 122h side and the insertion member 121B on the connector back end portion disposition groove 122j side, the timing of the commencement of the extraction from the clamping portion 32 is different. As shown in FIG. 21A to 21C, the extraction of the insertion member 121A from the clamping portion 32 commences before that of the insertion member 121B. With regards to the timing in which the extraction of the insertion members 121 is completed (that is, the timing at which the extraction position is reached), the insertion member 121A completes the extraction before the insertion member 121B. Thereby, in the tool equipped optical connector 11 and the optical connector tool 12 in the illustrated example, by confirming the sound produced when the insertion member 121A has reached the extraction position and then the sound produced when the insertion member 121B has reached the extraction position, that is, by confirming that or two sounds have been produced, it is possible to understand that the extraction of the two insertion members 121 from the clamping portion 32 of the optical connector 3 has completed. By confirming the two sounds, it is possible to complete the extraction of the two insertion members 121 from the clamping portion 32 of the optical connector 3 reliably.

In the optical connector tool 12 in the illustrated example, as shown in FIG. 20, when the proximal end portion 121b of the insertion members 121 is pressed into the proximal end portion accommodating hole 1244 of the proximal end portion accommodating portion 1243 from the second movable end portion 1242 side and the insertion members 121 are attached inside the insertion member operating portion 123 (more exactly, the proximal end portion 121b of the insertion members 121 is inserted into the proximal end portion accommodating portion 1243 on the first movable end portion 1241 side), the projection-shaped key 1215, which extends from the side portion of the body portion 1211 of the insertion members 121 to the side portion of the proximal end portion 121b, is inserted into the key groove 1249, which is an elongation of a portion of the proximal end portion accommodating hole 1244 of the proximal end portion accommodating portion 1243. The proximal end portion 121b of the insertion members 121A and 121B can be pushed into the proximal end portion accommodating hole 1244 of the proximal end portion accommodating portion 1243 only in the direction in which the contact projection 1214 contacts the elastic member 122k (refer to FIG. 16 and FIG. 19). Thereby, it is possible to attach the insertion members 121A and 121B into the insertion member operating portion 123 in the direction in which the contact projection 1214 contacts the elastic member 122k.

Note that the motion detecting mechanism, which produces a sound as a detection signal in order to confirm the completion of the extraction of the insertion members 121 from the clamping portion 32 of the optical connector 3, is not limited to the structure illustrated, for example, in FIG. 19. A structure may be used in which, for example, the contact projection 1214 of the insertion members 121 serves as an elastic member, and the contact member on the insertion member operating portion 123 side (the projecting member in contact with the contact projection 1214) is a projection that does not elastically deform even when in contact with the contact projection. Another structure may be used in which both the contact projection 1214 on the insertion members 121 side and the contact member of the second movable end portion 1242 of the insertion member operating portion 123 serve as elastic members (the "contact member of the second movable end portion 1242" is not limited to the contact member projecting on the second movable end portion 1242, and also includes the contact member projecting on the projecting portion of the connector receiving stand 122$f$ projecting on the second movable end portion 1242 or the like). In addition, the position where the contact member of the insertion member operating portion 123 is set is not limited to the connector receiving stand 122$f$. For example, the contact member may project directly from the second movable end portion 1242 of the insertion member operating portion 123.

The motion detecting mechanism that enables confirmation that the extraction of the insertion members 121 from the clamping portion 32 of the optical connector 3 has completed is not limited to a sound produced as a detection signal due to the release of contact between a contact projection and a contact member after they have made contact. For example, a mark that can be visually confirmed may be produced as a detection signal. On this point, the motion detecting mechanism is not limited to a structure that includes a contact projection and a contact member. For example, a structure may be used in which a indication member may be provided that shifts due to being linked to the shifting of the detection member (the shifting of the indication member functions as a visual detection signal) when the detection member projecting on the second movable end portion 1242 of the insertion member operating portion 123 (including an elastic member projecting on the projecting portion of the connector receiving stand 122$f$ projecting on the second movable end portion 1242) contacts the projection on the side portion of the insertion members 121 or shifts due to progressing into the recess on the side portion of the insertion members 121. In addition, the motion detecting mechanism may use a structure which includes, for example, a detection signal output device that is activated by an electrical current and outputs a detection signal such as a sound or light and an electrical circuit that is turned ON by the shifting of a contact member, where the contact member described above serves as a switch, and activates a detection signal output device.

The detection member is not necessarily limited to being provided on the insertion member operating portion. The detection member may be provided on the insertion members, and shift due to contact with a projection on the insertion member operating portion side or progressing into a recess.

Note that the concrete structures of the optical connector tool and the tool equipped optical connector according to the invention are not limited to the embodiment described above, and may be variously modified.

The optical connector tool and the tool equipped optical connector according to the invention include those that do not have a retainer or a motion detecting mechanism, and includes those having only one among the retainer and motion detecting mechanism.

The hinge portion 127 is not limited to the thin portion described above. For example, a structure that uses a pin or the like may be used. In addition to a structure in which the insertion member operating portion is integrally formed from a resin along with the connector holder portion as a portion of the tool equipped optical connector 11 illustrated in the second embodiment, for example, a structure may be used that is assembled into a ring shape by a plurality of members that include a plurality of plate-shaped members that function as connecting plate portions and pins that connect these plate-shaped members together so as to pivot.

The number of insertion members provided on one insertion member operating portion is not limited to two, and three or more may also be used. However, in this case, the extraction of the insertion members from the clamping portion 32 is realized in sequence from the insertion member that is close to the connecting point 5 because the engagement between the engagement receiving portion 1213$b$ of each of the insertion members and the extraction engaging portion 1248 of the proximal end portion accommodating portion 1243 is realized in sequence starting from the insertion member that is close to the connecting point 5 between the ferrule-side optical fiber 38 and the optical fiber 4, which is inserted from the back end side of the separate clamping portion 32, and proceeding to the insertion members that are far from the connecting point 5.

The staggered extraction mechanism, the which the extraction of the insertion members from the clamping portion 32 is realized in sequence starting from the insertion member close to the connecting point 5 is not limited to the one shown in the example in FIG. 19.

For example, a structure may be used in which the engagement between the first movable end portion 1241 and the insertion members 121 is realized by inserting a pushing member, which is provided on the first movable end portion 1241 of the insertion member operating portion 123 and which urges the rod-shaped proximal end portion side surface, into a recess that opens in the proximal end portion side surface of the insertion members. Another structure may be used in which the engagement between the first movable end portion 1241 and the insertion members 121 is realized by inserting a pushing member, which is provided on the insertion members and urges the inner surface of the proximal end portion accommodating hole, into a recess in the inner surface of the proximal end portion accommodating hole. That is, by adjusting the positions of the pushing member and the recess, the staggered extraction may be realized by adjusting the engagement timing such that the engagement between the first movable end portion 1241 and the insertion members 121 due to the pushing member entering the recess is realized in sequence from the insertion member close to the connecting point 5.

In addition, the plurality of insertion members of the optical connector tool is not limited to a structure in which the thickness of the portion (distal end) inserted into the clamping portion of the optical connector is uniform. A structure may be used in which the thickness differs depending on the degree of openness of the elements when the insertion members are inserted therebetween. The degree of openness of the elements when the insertion members are inserted in the elements may be determined such that the insertion of an optical fiber is possible according to the thickness of the optical fiber inserted between the elements. For example, for the bare optical fiber 4a, which is exposed after the cover of the distal end of the optical fiber 4 in the example of the second embodiment described above has been removed, and the part (covered portion) in which the bare optical fiber 4a is not exposed, for the plurality of insertion members, it is possible to determine the degree of openness of the elements depending on the difference in the local thickness of the optical fiber by varying the thickness of the portion (distal end) inserted into the clamping portion of the optical connector depending on the thickness of the optical fiber because the thickness of the optical fibers is different.

In addition, the optical connector 3 (optical connector plug) applied in the invention is not limited to a single core optical fiber, and a multi-core optical fiber may be used. In the case of a multi-core optical fiber, a structure may be used in which the aligning grooves formed in the elements of the clamping portion are formed in plurality.

In the invention, the term "optical connector" indicates a general optical part that is used in an abutment connection between optical fibers (this is not necessarily limited to a connection in which the end surfaces of the optical fibers contact each other, and includes an optical connection in which the optical fibers face each other via a small gap), and is not necessarily limited to using a ferrule. The optical connector of the invention has a clamp portion that maintains the connected state by clamping abutment connected optical fibers, and if there is such a clamping portion, then the term "optical connector" according to the invention can be applied.

For example, what is termed a mechanical splicer or the like, are included in the optical connector according to the invention, which has a structure that accommodates half split elements that clamp optical fibers due to the elasticity of the spring on the inside of a sleeve-shaped spring having a C-shape or a U-shape in cross-section. This mechanical splice type optical connector has positioning grooves formed on the abutment faces of the half split elements, and can abutment connect optical fibers inserted between the opposing elements from both sides while precision positioned by a positioning groove. In addition, the pair of abutment connected optical fibers are maintained in a connected state by being clamped between the elements by the elasticity of a spring. This type of optical connector may be one that omits the ferrule from the optical connector illustrated in FIG. 9 and FIG. 10, that is, a mechanism similar to the clamping portion 32.

The mechanical splicer type optical connector may be one in which the clamping portion itself functions as the optical connector, where the clamping portion is formed by a sleeve-shaped spring that has a C-shape or a U-shape in cross-section and half split elements accommodated inside this spring. The half split elements are not limited to a structure in which each of the half split elements are partitioned into a plurality, like the clamping portion of the optical connector illustrated in FIG. 9 and FIG. 10. A half split structure consisting simply of two parts may be used. However, a clamping portion that has elements having a half split structure consisting of two parts has a structure in which the elements are closed in sequence from the location where the insertion members are extracted when elements are used that enable the elastic deformation (small flexure) of the elements themselves and the insertion members that are wedged at a plurality of positions differing from each other in the axial direction of the clamping portion are closed in sequence (for example, extracted in sequence starting from those close to the connecting point between the optical fibers and proceeding to those far from the connecting point).

Note that in the invention, the idea that the insertion members 121 and the insertion member operating portion 123 have differing materials includes not only the case in which the insertion members 121 and the insertion member operating portion 123 are separately formed, but also the case in which the insertion members 121 and the insertion member operating portion 123 are integrally formed.

Below, the invention will be explained concretely by using experimental examples, but the invention is not limited by these experimental examples.

As shown in Table 1, four types of optical connector tool were fabricated by changing the material of the insertion members 121 and the insertion member operating portion 123. In addition, Table 2 shows the load flex temperature (° C.) of the resin used in Examples 1 to 4, the fracture point elongation (%), the flexural strength (MPa), and the flexural modulus (MPa). Note that in the case that each of the numerical values is within a particular range, the materials are considered advantageous. The load flex temperature is the property serving an index for a creep phenomenon, and the fracture point elongation (%), the flexural strength (MPa), and the flexural modulus (MPa) are properties serving as indexes for the ease of the insertion and extraction of the insertion members 121 into the clamping portion 32 by the insertion member operating portion 123.

TABLE 1

| | Insertion member material | Insertion members operating portion material |
|---|---|---|
| Example 1 | Polystyrene | Polystryene |
| Example 2 | polybutylene terephthalate | polybutylene terephthalate |
| Example 3 | Polycarbonate | Polycarbonate |
| Example 4 | Polycarbonate | polyacetal |

TABLE 2

| Material | | Load flex temperature (° C.) | Fracture point elongation (%) | Flexural strength (MPa) | Flexural modulus (MPa) |
|---|---|---|---|---|---|
| | Relation to function | Creep phenomenon | Insertion/ extraction | Insertion/ extraction | Insertion/ extraction |
| | Range | 90-200 | 100-300 | 10-50 | 500-2000 |
| Polystyrene | | 75 | 25 | 59 | 2450 |

TABLE 2-continued

| Material | Load flex temperature (° C.) | Fracture point elongation (%) | Flexural strength (MPa) | Flexural modulus (MPa) |
|---|---|---|---|---|
| Polybutylene terephthalate | 80 | 20 | 85 | 2500 |
| Polycarbonate | 124 | 119 | 93 | 2300 |
| Polyacetal | 76 | >100 | 48 | 1400 |

As shown in Table 1 and Table 2, a structure in which the creep phenomenon occurs with difficulty in the insertion members 121 and the insertion member operating portion 123 easily inserts and extracts the insertion members 121 into the clamping portion 32 can be confirmed in Example 4, where the material of the insertion members 121 is polycarbonate and the material of the insertion member operating portion 123 is polyacetal.

It is possible to apply the invention to any type of optical connector with the object of carrying out the connecting of the optical connector to the distal end of an optical fiber easily and quickly. In addition, the invention can be applied to an optical connector that is incorporated into an apparatus or a device.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A tool for an optical connector comprising a clamping portion for clamping an optical fiber between clamping elements, the tool comprising:

first and second insertion members, respectively comprising separately extractable first and second distal ends, wherein the first and second distal ends maintain the clamping elements in an open state by being wedged therebetween from outside the clamping portion, so that the optical fiber is movable between the clamping elements;

first and second insertion member operating portions, respectively separately connected to proximal ends of the first and second insertion members, that individually extract the first and second distal ends of the first and second insertion members from between the clamping elements; and a stopper portion against which the optical connector is pressed when the first and second insertion members are extracted from between the clamping elements.

2. A tool for an optical connector according to claim 1, wherein the first and second distal ends are separated in an axial direction of the optical connector.

3. A tool for an optical connector according to claim 1, wherein:

the first and second insertion member operating portions respectively comprise first and second movable end portions respectively supporting the first and second insertion members;

the first and second movable end portions are positioned on a side of the stopper portion opposite to the optical connector; and the first and second insertion member operating portions are deformable by applying pressure thereto so that the distance between the stopper portion and the movable end portion increases, which provides the individual extraction of the first and second distal ends of the first and second insertion members from the clamping members.

4. A tool for an optical connector according to claim 3, wherein the stopper member comprises at least one insertion member window through which the first and/or second insertion members extend.

5. A tool for an optical connector according to claim 3, wherein the first and second insertion members extend in a radial direction of the optical connector.

6. A tool for an optical connector according to claim 1, wherein the second insertion member operating portion is wider in the axial direction of the optical connector than the first insertion member operating portion.

7. A tool for an optical connector according to claim 1, wherein:

the optical connector comprises a connection point at which the optical fiber is abutted to another optical fiber or element therein;

the first distal end of the first insertion member is wedged between the clamping elements at the connection point; and the second distal end of the second insertion member is wedged between the clamping elements at a second point spaced apart from the connection point in the axial direction of the optical fiber and connector.

8. A tool for an optical connector according to claim 1, wherein:

the optical connector further comprises a ferrule comprising a distal end surface;

the clamping portion is attached to the ferrule at a second end opposite to the distal end surface, and comprises a spring portion; and the clamping portion maintains an abutment connection between the optical fiber and a second optical fiber that is housed and fastened therein by using elasticity of the spring portion, when the first and second distal ends of the first and second insertion members are extracted from between the clamping elements.

9. A tool for an optical connector according to claim 1, wherein:

the clamping elements comprise, on one half, a base side element, and on an opposing half, first and second lid side elements, which sandwich the optical fiber with the base side element;

the first distal end of the first insertion member is wedged between the base side element and the first lid side element; and the second distal end of the second insertion member is wedged between base side element and the second lid side element.

10. An optical connector tool according to claim 1, wherein the first and second insertion member operating portions respectively comprise:
   first and second movable end portions respectively supporting the first and second insertion members;
   first and second pairs of deformable joining wall portions connected between the stopper portion and the respective first and second movable end portions.

11. An optical connector tool according to claim 10, wherein when either the first or second pairs of deformable joining wall portions are deformed, the respective first or second insertion members are moved away from the optical connector so that the first or second distal ends of the first or second insertion members are extracted from between the clamping elements.

12. An optical connector tool according to claim 10, wherein:
   the first and second pairs of deformable joining wall portions each comprise two connecting plates joined by a hinge portion; and
   the first and second pairs of deformable joining wall portions have a symmetrical shape with respect to the first and second insertion members.

13. An optical connector tool according to claim 10, wherein:
   the first and second pairs of deformable joining wall portions each comprise three connecting plates joined by two hinge portions; and
   the first and second pairs of deformable joining wall portions have a symmetrical shape with respect to the first and second insertion members.

14. An optical connector tool according to claim 1, further comprising:
   a groove-shaped accommodating recess, extending in the axial direction of the optical connector, that accommodates the optical connector; and
   a connector holder portion that forms the stopper portion.

15. An optical connector tool according to claim 1, further comprising a retainer engaging portion, to which a removable retainer is mounted to hold the optical connector between the stopper portion and the retainer.

16. A tool for an optical connector according to claim 1, wherein the first and second insertion member operating portions form a staggered extraction mechanism, so that the first insertion member can be individually extracted before the second insertion member.

17. A tool for an optical connector according to claim 3, wherein:
   the first and second insertion members respectively comprise first and second proximal end portions with respective first and second elastic portions and respective first and second catch portions;
   the first and second movable end portions respectively comprise first and second proximal end portion accommodating portions with first and second proximal end portion accommodating holes therein; and
   the first and second proximal end portion accommodating holes respectively comprise a first and second enlarged hole that respectively engage with the first and second catch portions on the first and second proximal end portions of the first and second insertion members.

18. A tool for an optical connector according to claim 17, wherein:
   the first and second catch portions project from the sides of the first and second proximal end portions of the first and second insertion members;
   the first and second proximal end portion accommodating holes comprise first and second extraction engaging portions forming a first and second step between the first and second proximal end portion accommodating holes and the first and second enlarged holes;
   the first and second catch portions have respective first and second clearances to the first and second extraction engaging portions; and
   when the first and second distal ends of the first and second insertion members are wedged between the clamping elements, the first clearance is larger than the second clearance.

19. A tool for an optical connector according to claim 1, further comprising a motion detecting mechanism that detects positions of the first and second insertion members, relative to preset positions, and produces a detection signal.

20. A tool for an optical connector according to claim 19, wherein the motion detecting mechanism comprises:
   first and second contact projection that respectively project from side portions of the first and second insertion members; and
   a contact member, formed on the tool and projecting therefrom releasably contacts the first and second contact projections; and
   the first and second contact projections, and/or contact member, is an elastic member that produces a sound that serves as a detection signal when the releasable contact therebetween has been released after the first and second contact projections and/or contact member have elastically deformed due to contacting each other because of the movement of the first and second insertion members.

21. A tool for an optical connector according to claim 19, wherein the detection signal is produced when the first or second insertion member is extracted from between the clamping elements.

22. A tool for an optical connector according to claim 1, wherein the first and second distal ends of the first and second insertion members are formed of a different material than other portions of the first and second insertion members.

23. A tool for an optical connector according to claim 3, wherein the first and second distal ends of the first and second insertion members are formed of a different material than the first and second movable end portions.

24. A tool for an optical connector according to claim 1, wherein the first distal end of the first insertion member is rounded.

25. A tool for an optical connector according to claim 1, wherein the first distal end of the first insertion member is triangular.

26. A tool for an optical connector according to claim 1, wherein the first distal end of the first insertion member is chamfered.

27. A tool for an optical connector according to claim 1, wherein the first distal end of the first insertion member is removably attached to the first insertion member.

* * * * *